US011328265B1

(12) United States Patent
Givoly

(10) Patent No.: US 11,328,265 B1
(45) Date of Patent: May 10, 2022

(54) SYSTEM, METHOD, AND COMPUTER PROGRAM PRODUCT FOR ALLOCATING TIME TO ACHIEVE OBJECTIVES

(71) Applicant: Givoly Inventions, LLC, Dover, DE (US)

(72) Inventor: Tal Givoly, Dover, DE (US)

(73) Assignee: Givoly Inventions, LLC, Dover, DE (US)

( * ) Notice: Subject to any disclaimer, the term of this patent is extended or adjusted under 35 U.S.C. 154(b) by 0 days.

(21) Appl. No.: 16/244,077

(22) Filed: Jan. 9, 2019

Related U.S. Application Data

(63) Continuation of application No. 16/115,386, filed on Aug. 28, 2018, now abandoned, which is a continuation of application No. 13/462,804, filed on May 2, 2012, now abandoned.

(60) Provisional application No. 61/481,722, filed on May 2, 2011.

(51) Int. Cl.
G06Q 10/10 (2012.01)
G08B 21/24 (2006.01)
H04W 4/20 (2018.01)
G06Q 10/06 (2012.01)

(52) U.S. Cl.
CPC ......... G06Q 10/1097 (2013.01); G08B 21/24 (2013.01); G06Q 10/0633 (2013.01); H04W 4/20 (2013.01)

(58) Field of Classification Search
CPC combination set(s) only.
See application file for complete search history.

(56) References Cited

U.S. PATENT DOCUMENTS

2002/0120705 A1* 8/2002 Schiavone .............. H04L 51/12
709/207
2003/0177190 A1* 9/2003 Moody ................ G06Q 10/107
709/206
(Continued)

FOREIGN PATENT DOCUMENTS

CA 2637868 A1 * 8/2007 ............. H04L 51/12

OTHER PUBLICATIONS

Chakravarthy, Sharma et al. "A graph-based approach for multi-folder email classification." 2010 IEEE International Conference on Data Mining. IEEE, 2010 [Online], [retrieved Aug. 3, 2021]. Retrieved from the internet <URL:https://ieeexplore.ieee.org/stamp/stamp.jsp?tp=&arnumber=5693961> (Year: 2010).*

Primary Examiner — Jerry O'Connor
Assistant Examiner — Michael R Koester
(74) Attorney, Agent, or Firm — Patrick E. Caldwell, Esq.; The Caldwell Firm, LLC

(57) ABSTRACT

A system, method, and computer program product are provided to allow a user to define a list of user-defined important senders; receive an e-mail; identify information associated with the sender of the e-mail, in response to the receipt of the e-mail; perform a comparison, utilizing one or more processors, involving the information associated with the sender of the e-mail, and the list of user-defined important senders, to determine whether the information associated with the sender of the e-mail is on the list of user-defined important senders; and organize the e-mail in a single user-defined important sender(s) folder, based on the comparison.

30 Claims, 27 Drawing Sheets

(56) References Cited

U.S. PATENT DOCUMENTS

| | | | |
|---|---|---|---|
| 2008/0126951 A1* | 5/2008 | Sood | G06Q 10/107 715/752 |
| 2010/0211644 A1* | 8/2010 | Lavoie | G06Q 10/107 709/206 |
| 2011/0099291 A1* | 4/2011 | O'Reirdan | G06Q 10/107 709/238 |

* cited by examiner

2400

| Calendar<br>1 2 3 4 5 6 7<br>8 9 10 11 12 13 14<br>15 16 17 18 19 20 21<br>22 23 24 25 26 27 28<br>29 30 31 | ALERT: from virtual personal assistant: Task 1 due date scheduled for TODAY – IMPORTANT!!! <br><br>Alert Info \| Task Info \| Dismiss | Today's Date<br>03/12/2015 |

Figure 24

SYSTEM, METHOD, AND COMPUTER PROGRAM PRODUCT FOR ALLOCATING TIME TO ACHIEVE OBJECTIVES

RELATED APPLICATIONS

The present application is a continuation of and claims priority to U.S. patent application Ser. No. 16/115,386, entitled "SYSTEM, METHOD, AND COMPUTER PROGRAM PRODUCT FOR ALLOCATING TIME TO ACHIEVE OBJECTIVES," filed Aug. 28, 2018 which, in turn, is a continuation of and claims priority to U.S. patent application Ser. No. 13/462,804, entitled "SYSTEM, METHOD, AND COMPUTER PROGRAM PRODUCT FOR ALLOCATING TIME TO ACHIEVE OBJECTIVES," filed May 2, 2012, which claims priority to U.S. Provisional Application No. 61/481,722, entitled "SYSTEM, METHOD, AND COMPUTER PROGRAM PRODUCT FOR ALLOCATING TIME TO ACHIEVE OBJECTIVES," filed May 2, 2011, all of which are incorporated herein by reference in their entirety for all purposes.

BACKGROUND AND FIELD OF THE INVENTION

The present invention relates to the management of electronic mail.

SUMMARY

A system, method, and computer program product are provided to allow a user to define a list of user-defined important senders; receive an e-mail; identify information associated with the sender of the e-mail, in response to the receipt of the e-mail; perform a comparison, utilizing one or more processors, involving the information associated with the sender of the e-mail, and the list of user-defined important senders, to determine whether the information associated with the sender of the e-mail is on the list of user-defined important senders; organize the e-mail in a single user-defined important sender(s) folder, based on the comparison such that, if the information associated with the sender of the e-mail is on the list of user-defined important senders, the e-mail is organized in the single user-defined important sender(s) folder, and if the information associated with the sender of the e-mail is not on the list of user-defined important senders, the e-mail is not organized in the single user-defined important sender(s) folder, where the single user-defined important sender(s) folder is equipped to include e-mails from a plurality of the user-defined important senders for display utilizing a mobile device interface in the form of an inbox from which the e-mails from the plurality of the user-defined important senders are accessible to a recipient of the e-mails for being read; and display a single user-defined important sender(s) folder-related alert utilizing the mobile device interface after the comparison such that, if the information associated with the sender of the e-mail is on the list of user-defined important senders, the e-mail is organized in the single user-defined important sender(s) folder and the single user-defined important sender(s) folder-related alert is displayed for the e-mail utilizing the mobile device interface, and if the information associated with the sender of the e-mail is not on the list of user-defined important senders, the e-mail is not organized in the single user-defined important sender(s) folder and the single user-defined important sender(s) folder-related alert is not displayed for the e-mail utilizing the mobile device interface.

BRIEF DESCRIPTION OF THE DRAWINGS

FIG. 24 shows an interface for displaying objective alerts, in accordance with another embodiment.

DETAILED DESCRIPTION

Figure 1:
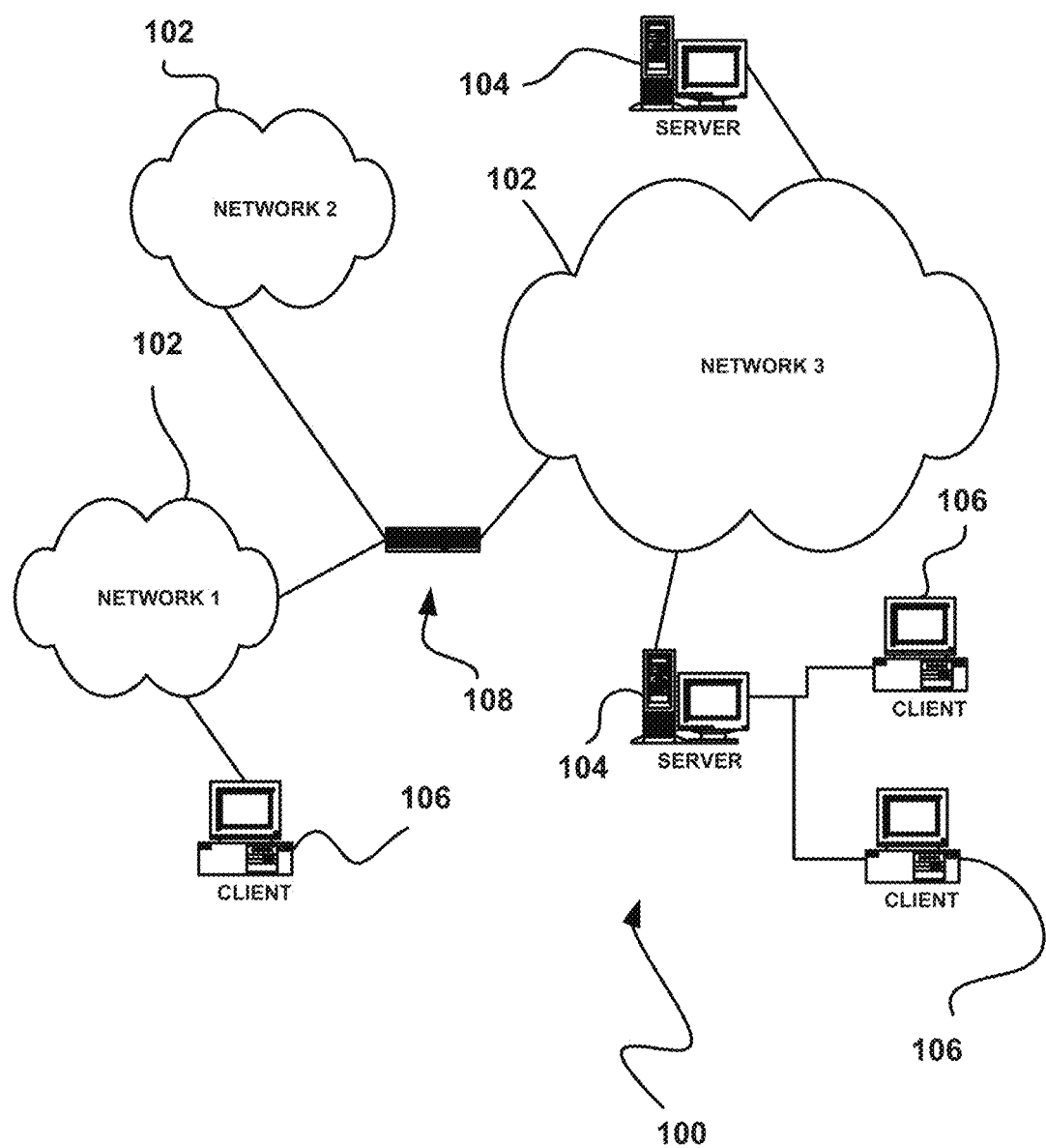
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, handheld computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
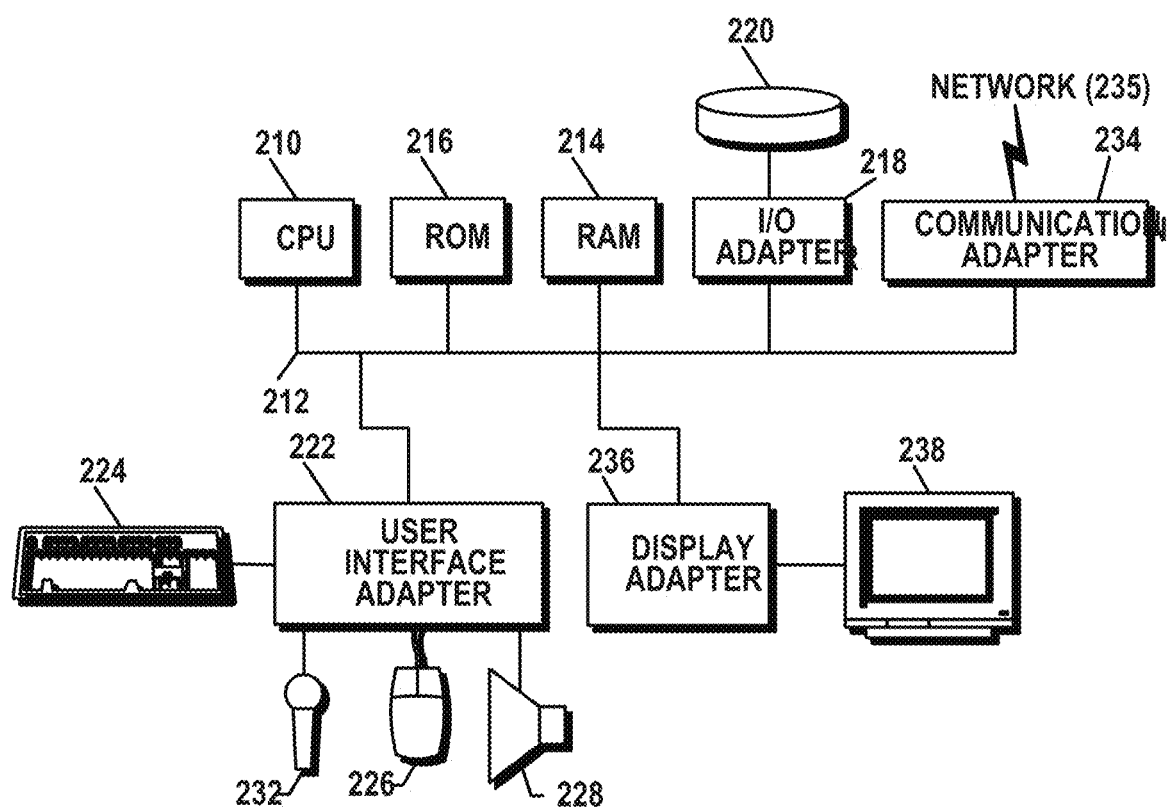
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, any of the various embodiments set forth herein may be implemented utilizing hardware, software, or any desired combination thereof, for causing any of the functionality, methods, techniques, etc. disclosed herein. For that matter, any type of logic may be utilized which is capable of implementing the various functionality set forth herein.

Figure 3:
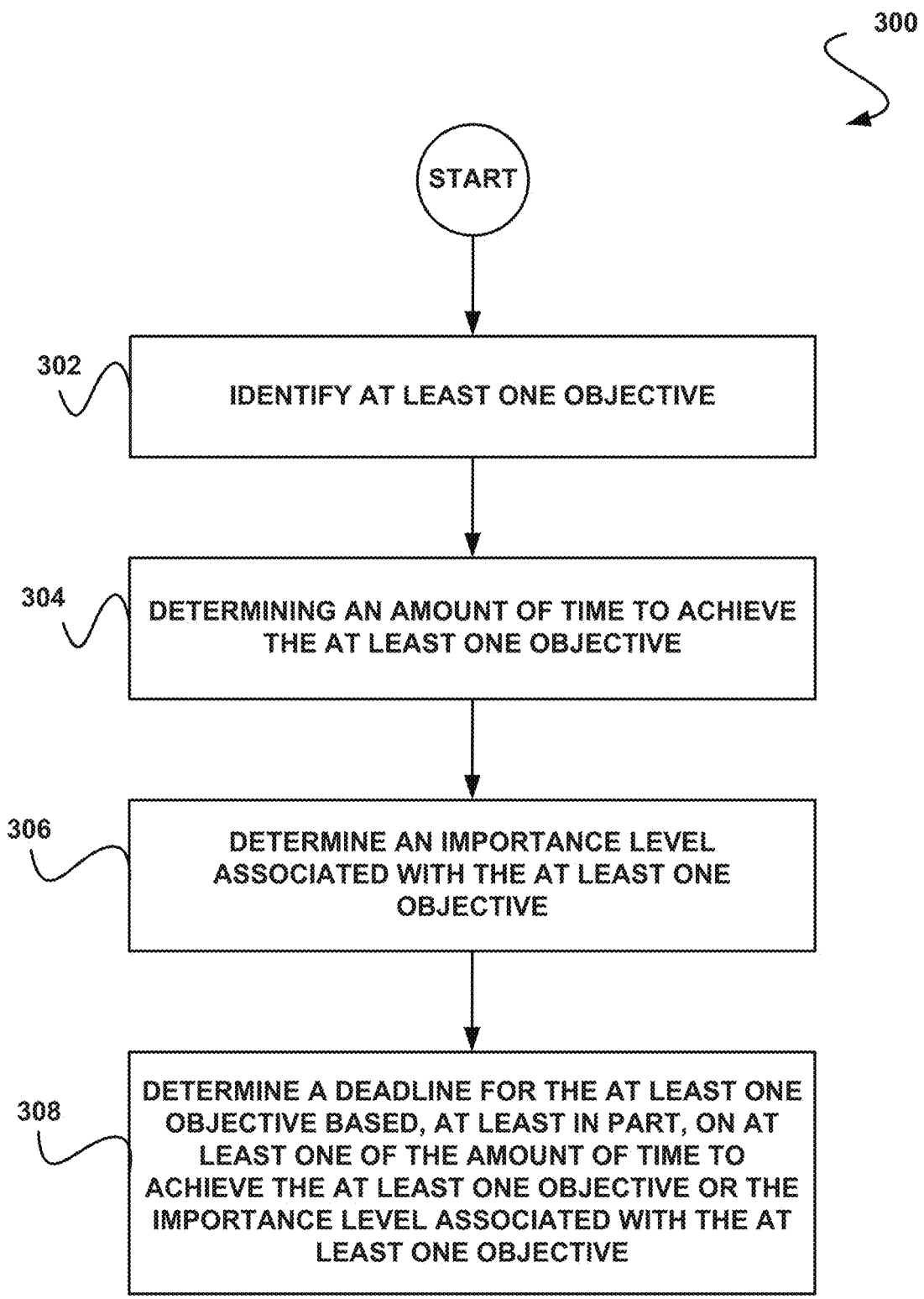
FIG. 3 shows a method for determining a deadline for at least one objective, in accordance with one embodiment.

FIG. 3 shows a method 300 for determining a deadline for at least one objective, in accordance with one embodiment. As an option, the method 300 may be implemented in the context of the architecture and environment of FIGS. 1 and/or 2. Of course, however, the method 300 may be carried out in any desired environment.

As shown, at least one objective is identified. See operation 302. In the context of the present description, an objective refers to anything that requires any amount of time to achieve. For example, in various embodiments, the objective may include, but is not limited to, a task, a goal, a meeting, a project, any work, a personal matter or event, an appointment, a leisure/social event, intention to take advantage of a promotion or advertised deal, and/or any other objective that meets the above definition.

In one embodiment, identifying the objective may include receiving the objective. For example, the objective may be received from/by a user via a user interface. As another example, the objective may be received in a message (e.g. an email message, a text message, an instant message, an on-line post, a phone message, etc.). As another example, the objective may be received as part of a request (e.g. a task request, a meeting request, an appointment request, an action request, an assignment of a task or the like, an advertisement, etc.).

In another embodiment, identifying the objective may include identifying the objective in text. For example, the objective may be identified in text of an email. As another example, the text may be identified in text of a memorandum. As another example, the objective may be identified in text of a text message (e.g. an SMS text message, an MMS text message, a message posted on-line, an instant message, etc.).

In another embodiment, identifying the objective may include identifying the objective in a calendar. For example, an objective may be present in a calendar (e.g. a group accessible calendar, a personal calendar, etc.) such that the objective may be identified. In one embodiment, the objective may be identified based on a previous objective. For example, an objective may be identified from an objective that is known to occur annually (e.g. a birthday, a conference, a medical exam, taxes, etc.). Of course, in various embodiments, the objective may be identified from an objective that is known to occur daily, weekly, monthly, or periodically in any other manner.

In yet another embodiment, the objective may be identified automatically based on multiple data sources. For example, in one embodiment, a user action and incoming data (e.g. email text, downloaded information, web browsing data, etc.) may be utilized to automatically identify an objective. As one example, a user may begin working on a paper in a word processing application and may repeatedly access the Internet to search for information to insert in the paper. In one embodiment, the user activity and/or the search terms and/or results may be utilized to identify the objective of generating a paper on a specific topic. In still another embodiment, the objective may result from a collaboration of multiple people.

As is now apparent in view of the above embodiments, the objective may be gleaned from text, document or any other type of content, and/or be provided in a more structured way (e.g. an objective object, etc. that has a predefined format, etc.). In the case of former, the objective may be automatically gleaned from content using language parsing, semantic learning, etc. such that the objective may be identified from content that takes on an unstructured format (e.g. an email that dictates an objective using natural language, etc.). As an option, an originating author of the content may tag, annotate, select an option, etc. in connection with the content so as to trigger any automatic objective-gleaning analysis, when the content is received. On the other hand, a file or object may be predefined to outline various predetermined parameters, etc. associated with an objective. Of course, such file or objective may include certain fields that are adapted to include freeform notes in addition to parameters that are entered in a predetermined format, or chosen via various menu-related techniques, etc.

Once the objective has been identified, an amount of time to achieve the at least one objective is determined. See operation 304. In one embodiment, the amount of time to achieve the at least one objective may include an estimated amount of time to achieve the at least one objective.

In another embodiment, the amount of time to achieve the at least one objective may include an actual amount of time to achieve the at least one objective. For example, the objective may include a meeting that takes an hour. In this case, the amount of time to achieve the objective may include an hour. As another example, the objective may include completing a one hundred page paper. In this case, the time to achieve the objective may include an estimate of the time required to achieve the paper (e.g. based on the number of words typed per minute, based on a previous paper, etc.).

In one embodiment, the time to achieve the objective may be determined manually. For example, a user may determine the time to achieve the objective. In one embodiment, the time to achieve the objective may be received utilizing a user interface. In another embodiment, the time to achieve the objective may be received by an audible utterance from a user.

In one embodiment, the time to achieve the objective may be determined automatically. Additionally, in one embodiment, the time to achieve the at least one objective may be determined based on the objective. For example, the objective may be an objective such that the time to achieve the objective is known (e.g. a one hour meeting, an appointment, a regular task, a specific length paper, a timed game, a timed event, etc.). Thus, the time to achieve the objective may be determined automatically based on the known time to achieve the objective.

In another embodiment, the time to achieve the objective may be determined automatically based on a previous time to achieve the same or a related objective. For example, a similar objective may have been achieved in the past and the time required to achieve the objective may have been stored. Using the stored time, the time to achieve the current objective may be determined.

This may be accomplished, in different embodiments, by first identifying a comparable objective in any of a variety of ways. For example, the user may be allowed to select such previous objective so that it can be analyzed to determine such time to achieve (e.g. by reviewing an edit history, timestamps, etc.). In another embodiment, the comparable objective may be automatically identified by analyzing similar documentation (e.g. with similar word/page counts, situated in a same category/folder, etc.).

In another embodiment, the time to achieve the objective may be determined based, at least in part, on a typing speed of a user. In another embodiment, the time to achieve the objective may be determined based, at least in part, on a schedule of a user. In another embodiment, the time to achieve the objective may be determined based, at least in part, on an amount of upcoming work days and/or personal days the user has available. In another embodiment, the time to achieve the objective may be determined based, at least in part, on a deadline associated with the objective. For example, the objective may have an upcoming deadline that limits the amount of time to achieve the objective.

In another embodiment, the time to achieve the objective may be determined based, at least in part, on resource availability. For example, the completion of the objective may require specific resources (e.g. people, location resources, tools, computers, etc.). Accordingly, the time to achieve the objective may be associated with the availability of these resources.

In addition to determining the time to achieve the objective, an importance level associated with the at least one objective is determined. See operation 306. In the context of the present description, an importance level refers to any type of indication of a priority attributable to the objective. In various embodiments, the importance level may be based on a personal importance (e.g. to a user, etc.), an organizational importance (e.g. to a company, etc.), a functional importance (e.g. based on completion order requirements, etc.), a monetary goal or requirement, and/or any other perspective. Additionally, in various embodiments, any number of values or indicators may be utilized to indicate the importance level, such as a number scale, keywords (e.g. high, medium, low, etc.), colors, and symbols or indicators (e.g. !, !!, etc.), etc.

In one embodiment, the importance level associated with the objective may be determined manually. For example, a user may determine the importance level associated with the objective. In one embodiment, the importance level associated with the objective may be received utilizing a user interface. In another embodiment, the importance level associated with the objective may be received by an audible utterance from a user.

In one embodiment, the importance level associated with the objective may be determined automatically. Additionally, in one embodiment, the importance level associated with the objective may be determined based on the objective. For example, the objective may be an objective such that the importance level associated with the objective is known (e.g. based on an associated party, an objective name, a time frame to achieve, an indicator associated with the objective, etc.). Thus, the importance level associated with the objective may be determined automatically based on the known importance level associated with the objective.

In another embodiment, the importance level associated with the objective may be determined automatically based on an importance level associated with the same or a related previous objective. For example, a similar objective may have been achieved or scheduled in the past and the importance level associated with the objective may have been stored. Using the importance level associated with the previous objective, the importance level associated with the current objective may be determined.

In another embodiment, the importance level may be determined based on an indicator associated with the objective. For example, the objective may be received and may include an indicator indicating an importance level. In one embodiment, the importance level may be determined based on a sender who sent the objective. For example, the sender of an email, text, or other message, which includes information associated with the objective, may be a person or organization associated with a high importance level (e.g. a boss, a husband, a wife, a hospital, etc.). Thus, the importance level associated with the objective may be determined based on the sender.

Additionally, in one embodiment, an email or other message (e.g. a text message, a phone message, etc.) may be utilized to determine the importance level of the objective. For example, a message may be automatically examined for keywords or content to determine an importance level of an objective. In one embodiment, the message may be a message including the objective. In another embodiment, the importance level may be determined based on how quickly a user begins to work on the objective. For example, if a user begins to achieve an objective immediately after the objective is identified, a high importance level may be associated with the objective.

In another embodiment, the importance level may be determined based, at least in part, on a schedule of a user. In another embodiment, the importance level may be determined based, at least in part, on an amount of upcoming work days and/or personal days. In another embodiment, the importance level may be determined based, at least in part, on a deadline associated with the objective. In another embodiment, the importance level may be determined based, at least in part, on resource availability.

Once the importance level associated with the objective and the time to complete the objective are determined, a deadline for the at least one objective is determined, based, at least in part, on at least one of the amount of time to achieve the objective or the importance level associated with the objective. See operation 308. In one embodiment, both the amount of time to achieve the objective and the importance level associated with the objective may be utilized to determine the deadline. In another embodiment, only the amount of time to achieve the objective or the importance level associated with the objective may be utilized to determine the deadline.

In the context of the present description, a deadline may refer to any hard or soft time and/or date by which an objective is to be achieved. For example, the deadline may include a personal deadline. In this case, the deadline may not necessarily be a completion deadline scheduled by an organization, but rather an internal deadline that is associated with a completion time goal. In one embodiment, the deadline may include an expected time (e.g. time of day, date, etc.) of completion of the objective. In another embodiment, the deadline may include an expiration time and/or date associated with the objective. For example, the expiration time or/date may indicate a time/date when the objective becomes obsolete.

In one embodiment, the deadline may be scheduled. For example, the deadline may be inserted in a calendar. In one embodiment, the deadline may be inserted in a calendar associated with a user (e.g. a personal calendar, etc.) or an organization (e.g. a group calendar, etc.). Additionally, in one embodiment, the amount of time to achieve the objective may be inserted and/or blocked off in the calendar.

More illustrative information will now be set forth regarding various optional architectures and features with which the foregoing techniques discussed in the context of any of the present or previous figure(s) may or may not be implemented, per the desires of the user. For instance, various optional examples and/or options associated with the identifying of operation 302, the determining of operation 304, the importance level of operation 306, the deadline of operation 308, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 4:
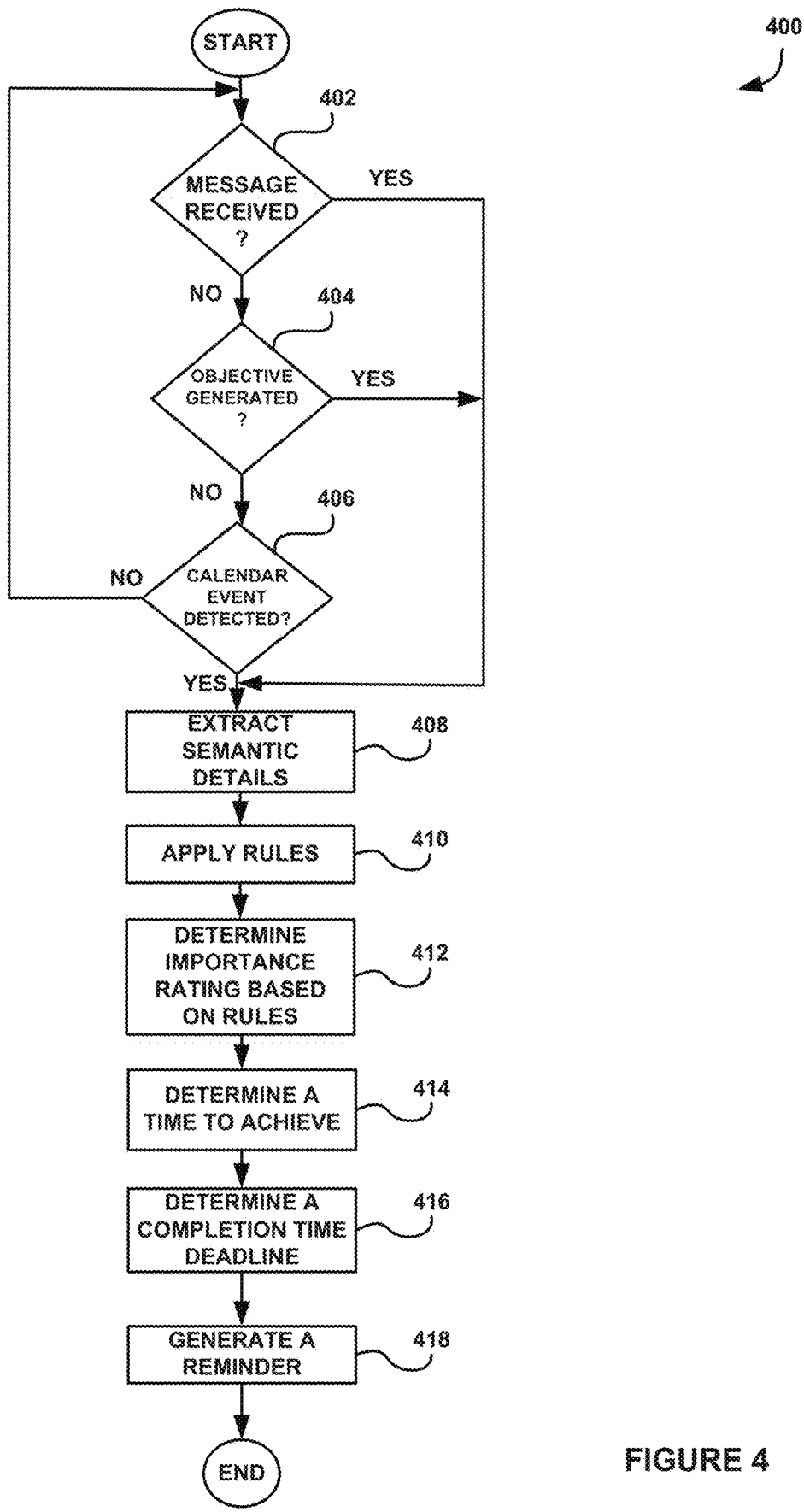
FIG. 4 shows a method for generating a reminder associated with an objective, in accordance with another embodiment.

FIG. 4 shows a method 400 for generating a reminder associated with an objective, in accordance with another embodiment. As an option, the method 400 may be implemented in the context of the architecture and environment of FIGS. 1-3 or any subsequent Figure(s). Of course, however, the method 400 may be carried out in any desired environment. It should also be noted that the aforementioned definitions may apply during the present description.

As shown, it is determined whether a message including an objective is received. See operation 402. The message may include any type of message, such as an email, an SMS text message, an MMS text message, an instant message, a message posted on-line, and/or various other messages. Additionally, the message may include any objective, such as a task request, a meeting request, or any other objective. In one embodiment, the message may be automatically scanned or searched to identify the objective. In another embodiment, a subject header of the message may identify the objective. In another embodiment, the message may explicitly state the objective.

Additionally, and potentially coincidently with determining whether a message is received, it may be determined whether an objective is generated. See operation 404. In one embodiment, determining whether an objective is generated may include determining whether a user generates an objective using a user interface. For example, a user may utilize a user interface to generate an objective, such as a task to complete, a meeting, a personal time activity, etc. In one embodiment, the user interface for generating the objective may be part of a calendar program. Of course, the objective may be generated utilizing any of the techniques disclosed in the context of operation 302 of FIG. 3, or any other context, for that matter.

Further, it may be determined whether a calendar event including an objective is detected. See operation 406. In the context of the present description, a calendar event refers to any event associated with a software-based calendar, such as a calendar time request (e.g. a meeting request, etc.), a calendar entry (e.g. a task entry, etc.), a time blockage, and/or any other calendar event. For example, a time block request associated with a calendar may be received. As another example, a user may utilize a calendar interface to input an objective or to block off time to complete an objective.

If it is determined that a message including an objective is received, an objective is generated, or a calendar event is generated, semantic details are extracted from the message, generated task, or generated calendar event. See operation 408. The semantic details may include any number of details such as objective information, time frame information, importance information, sender information, keywords, time information, and/or other information. Other semantic details may include who is copied, categorization information, follow up flagging, attachment information, transmission protocol with which a communication was received, presence of a predetermined file or object, etc.

One or more rules are then applied, based on the extracted semantic details. See operation 410. For example, in one embodiment, the semantic details may include information about a sender of an email including the objective. A rule associated with importance information may be applied, based on the sender. In another embodiment, the semantic details may include subject information associated with the objective. A rule associated with importance information and/or necessary completion time information may be applied, based on the subject information to determine an importance level and/or an expected number of hours, etc. to achieve the objective. Of course, any number of rules may be applied utilizing any of the extracted information. In various embodiments, the rules may be user defines rules, default rules, automatically inferred rules (e.g. based on user action or inaction, etc.), and/or any number of other rules.

Regardless of the amount of extracted semantic details, an importance rating for the objective may be determined based on the semantic details. See operation 412. The importance rating may include any rating indicating an importance of the objective. In one embodiment, the importance rating may be the same as an importance level. In another embodiment, the importance rating may be utilized to assign an importance level to an objective. For example, in one embodiment, the importance rating may include a numerical rating that may correlate with an importance level of low, medium, or high. In another embodiment, the importance rating may include an importance level such as low, medium, or high, etc. Regardless, the importance rating may include any indicator of an importance of an objective.

The importance rating may be determined in a variety of ways, utilizing the rules. For example, in one embodiment, information may be extracted or analyzed indicating a specific priority or importance level, such as a word "important," or phrase "This is very important!" Accordingly, there may be a rule indicating that if an explicit importance level or rating is indicated, the importance rating or level is set according to that rating.

In another embodiment, the importance rating may be determined by a rule associated with a sender or assigner of the objective. For example, a boss may send an employee an email including an objective. Semantic details may be extracted, including the sender information, and a rule may be applied that causes a high importance rating or level to be assigned to the objective because the objective was sent directly from the boss.

In another embodiment, the importance rating may be determined by a rule associated with a subject corresponding to the objective. For example, a message including the objective may include keywords or phrases corresponding to a subject of the objective (e.g. "complete a 100 page technology paper," "staff meeting," "dinner and movie," "drinks tonight," etc.). A rule associated with objective subjects or corresponding activities may be applied to determine an importance rating of the objective, based on the subject of the objective.

In one embodiment, a rule may be automatically generated based on a previous action of a user. For example, on one or more occasions a user may have assigned a high priority to an objective received in a message from a certain person. Accordingly, a rule may be automatically generated to automatically assign a high priority to an objective designated by the specific person. Similarly, on one or more occasions a user may have assigned a high priority to an objective associated with a specific subject (e.g. manager staff meeting, etc.). Accordingly, a rule may be automatically generated to automatically assign a high priority to an objective associated with that subject. Of course, in various embodiments, rules for assigning a variety of priorities may be automatically generated. Furthermore, in various embodiments, one or multiple rules may be applied.

In addition to determining an importance rating, an amount of time to achieve the objective is determined. See operation 414. In one embodiment, the amount of time to achieve the objective may include an amount of time required to complete a task. In another embodiment, the amount of time to achieve the objective may include an estimated amount of time required to achieve the objective.

In various embodiments, determining the amount of time to achieve the objective may be accomplished using different techniques. In one embodiment, the amount of time to achieve the objective may be determined by estimating. For example, the objective may include completing a paper and determining the amount of time to complete the paper may include estimating a number of minutes/hours based on a typing speed of a user and the number of pages to complete.

As another example, the objective may include reading one or more emails and/or responding to the emails and determining the amount of time to read and/or respond to the emails may include estimating a number of minutes/hours based on a previously determined rate of a user and the number of emails present.

In another embodiment, the amount of time to achieve the objective may be determined from the extracted semantic details. For example, a message may indicate that only a certain amount of time is to be spent on achieving the objective. The amount of time may then be determined, based on the message. As another example, the semantic details may be used to determine the type of objective and the time to achieve the objective may be determined based on the time it took to achieve the same (or a similar) objective in the past. In another embodiment, the amount of time to achieve the objective may be determined from the extracted semantic details and an application of one or more of the rules.

In one embodiment, a user may have the option to input the amount of time to achieve the objective. For example, a user may be presented with a user interface that allows the user to indicate the amount of time to achieve the objective. In one embodiment, this may include inputting a value in minutes and/or hours, etc. In another embodiment, this may include blocking off a period of time.

As shown further in FIG. 4, a completion time deadline may also be determined. See operation 416. In one embodiment, the completion time deadline may be a hard deadline set by an external source. For example, the completion time deadline may include a deadline set by a supervisor. In one embodiment, the deadline may be extracted from a message associated with the objective (e.g. sent by the supervisor, etc.). In another embodiment, a user may know the hard deadline and set the hard deadline utilizing a user interface.

In another embodiment, the deadline may be determined based on necessity. For example, a particular date may at least partially be utilized to determine a deadline (e.g. a birthday, a holiday, a weekend, a court date, etc.). In another embodiment, the deadline may be determined based on available time. For example, a user may only have up until a certain point to achieve an objective because of future obligations.

Once a deadline is established, a reminder may be generated. See operation 418. The reminder may include any information associated with the objective. For example, in various embodiments, the reminder may include a subject of the objective, an objective name, deadline information, resource requirement information, time remaining to achieve the objective, suggestions, importance rating information, and/or any other information.

In one embodiment, the reminder may include a visual reminder that is present in a calendar application. As an option, the reminder may be displayed to the user when viewing the calendar. In another embodiment, the reminder may include a pop-up reminder. For example, the reminder may be configured to be presented (e.g. pop-up, etc.) a certain time before expiration of an objective (e.g. before the deadline, etc.). As another example, the reminder may be configured to be presented during a completion time period (e.g. the determined completion time period, etc.).

In one embodiment, the timing of the reminder display and/or the frequency of the display of the reminder, may be based on the importance level or rating associated with the objective. For example, in one embodiment, a high importance level or rating associated with the objective may correspond to a higher frequency of reminder display. In one embodiment, the frequency of display of the reminder may be determined automatically. In another embodiment, the frequency of display of the reminder may be determined manually (e.g. set utilizing a user interface, etc.). In yet another embodiment, the time of day or days of the week a reminder is presented to the user may be based on availability of the user and/or an inferred best time/day, based on previous user actions.

Figure 5:
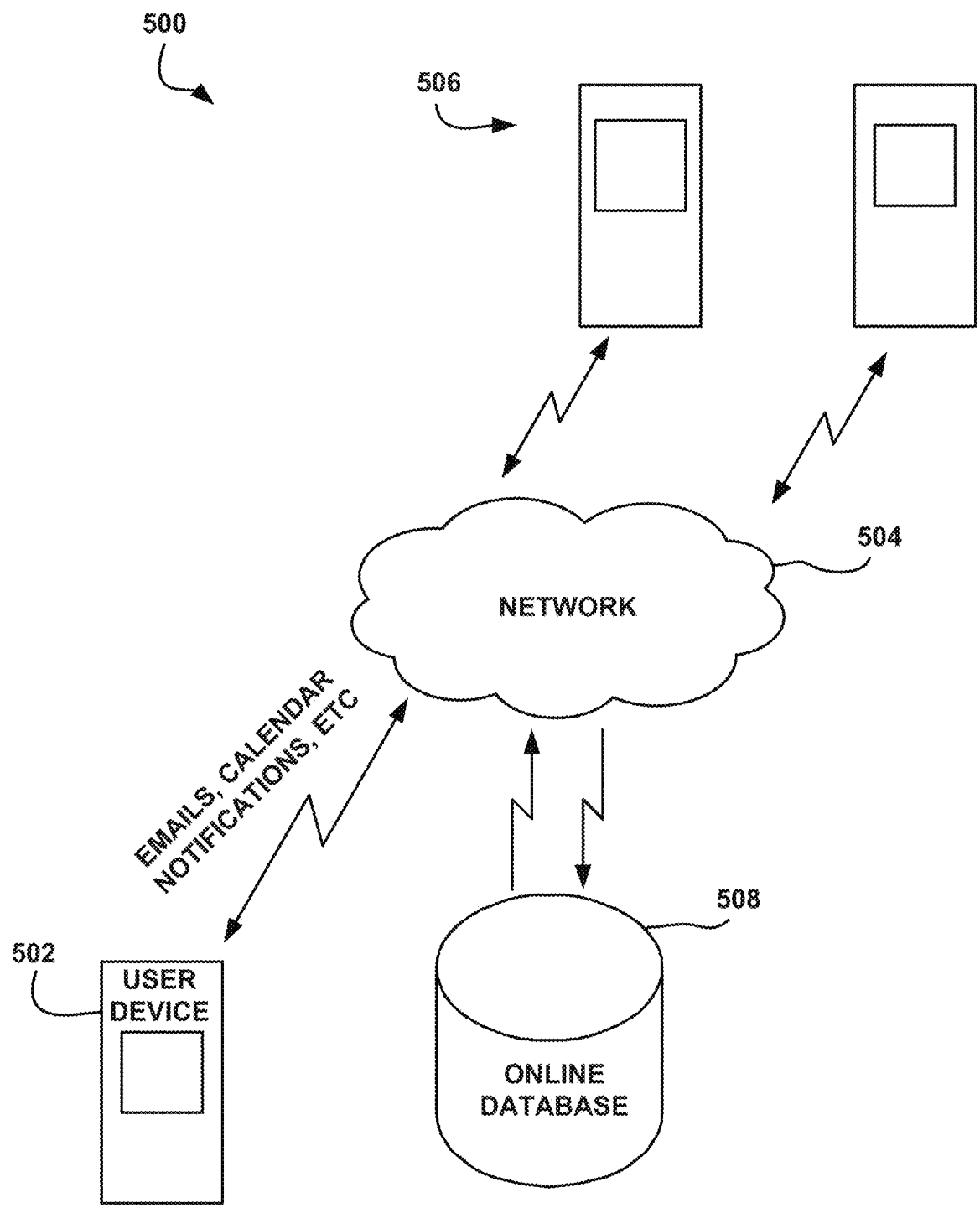
FIG. 5 shows a system for determining a deadline for at least one objective, in accordance with another embodiment.

FIG. 5 shows a system 500 for determining a deadline for at least one objective, in accordance with another embodiment. As an option, the system 500 may be implemented in the context of the architecture and environment of FIGS. 1-4 or any subsequent Figure(s). Of course, however, the system 500 may be implemented in any desired environment. It should also be noted that the aforementioned definitions may apply during the present description.

As shown, a user device 502 is provided. The user device 502 may be capable of communicating with multiple other devices 506 over one or more networks 504. Furthermore, the user device 502 and the devices 506 may be capable of communicating with one or more online databases 508. The user device 502 and the devices 506 may include any type of device including a mobile device (e.g. a mobile phone, a PDA, a laptop computer, a handheld computer, a tablet computer, etc.) or a desktop device (e.g. a television, a computer, etc.). Furthermore, the communication may be wired or wireless communication.

In one embodiment, the user device 502 or the devices 506 may include computer code for identifying at least one objective (e.g. a task, a meeting, lunch, dinner, movies, a vacation, a conference, etc.), determining an amount of time to achieve the at least one objective, determining an importance level associated with the at least one objective, and determining a completion date/time or deadline for the at least one objective, or an estimated achievement date for the at least one objective.

In one embodiment, identifying the objective may include receiving a user input indicating the objective. For example, a user of the user device 502 may input the objective utilizing an interface associated with the user device 502. As another example, a user of one of the devices 506 may input the objective utilizing an interface associated with one of the devices 506.

In another embodiment, identifying the objective may include identifying the objective from at least one message. In one embodiment, identifying the objective from the message may include parsing text included in the message. In another embodiment, identifying the objective from the message may include identifying keywords included in the message. The message may include any type of message, such as an email, a text message (e.g. SMS, MMS, etc.), an instant message, an on-line post, a phone message, a Voice over IP (VoIP) phone message, etc.

Additionally, in one embodiment, determining the amount of time to achieve the objective may include receiving a user input indicating the amount of time to achieve the objective. For example, a user of the user device 502 may input the amount of time to achieve the objective utilizing an interface associated with the user device 502. As another example, a user of one of the devices 506 may input the amount of time to achieve the objective utilizing an interface associated with one of the devices 506.

In another embodiment, determining the amount of time to achieve the objective may include determining the amount of time to achieve the objective from a message. In one embodiment, determining the amount of time to achieve the objective from the message may include parsing text included in the message. In another embodiment, determining the amount of time to achieve the objective from the message may include identifying keywords included in the message.

In another embodiment, determining the amount of time to achieve the objective may include determining the amount of time to achieve the objective based on at least one rule. In yet another embodiment, determining the amount of time to achieve the objective may include estimating the amount of time to achieve the objective based on information associated with another objective. In one embodiment, the information associated with the other objective may include a time taken to achieve the other objective.

In another embodiment, the information associated with the other objective may include a time determined to achieve the other objective. In one embodiment, the other objective may include a previously achieved objective. In various embodiments, the previously achieved objective may include an objective similar to, the same as, or related to, the current objective.

Further, in one embodiment, determining the importance level associated with the objective may include receiving a user input indicating the importance level associated with the at least one objective (e.g. from an interface on the user device 502 or devices 506, etc.). In another embodiment, determining the importance level associated with the objective may include determining the importance level associated with the objective from a message. In another, embodiment determining the importance level associated with the objective may include determining the importance level associated with the objective based on at least one rule.

In another embodiment, determining the importance level associated with the objective may include determining the importance level associated with the objective based on information associated with another objective. In one embodiment, the information associated with the other objective may include an importance level associated with a previous objective, a related objective, a similar objective, etc.

As an option, an alert associated with the objective and/or the determined deadline may be generated, based at least in part on the determined deadline or a determined completion time or date. In one embodiment, the alert may include a reminder. In another embodiment, the alert may include an update associated with the objective. In another embodiment, the alert may include a status associated with the achievement of the objective. In another embodiment, the alert may include an indicator indicating the amount of time remaining to achieve the objective. In another embodiment, the alert may include an indicator indicating a status of the objective (e.g. pending, complete, expired, etc.).

In one embodiment, time to work on an objective may be automatically scheduled. For example, time to work on the at least one objective may be allocated in a calendar. In one embodiment, the time allocated may be associated with the determined amount of time to complete the objective and a deadline. In another embodiment, the time allocated may be associated with the importance level. For example, as an option, extra time may be allocated for an objective associated with a high importance level.

Figure 6:
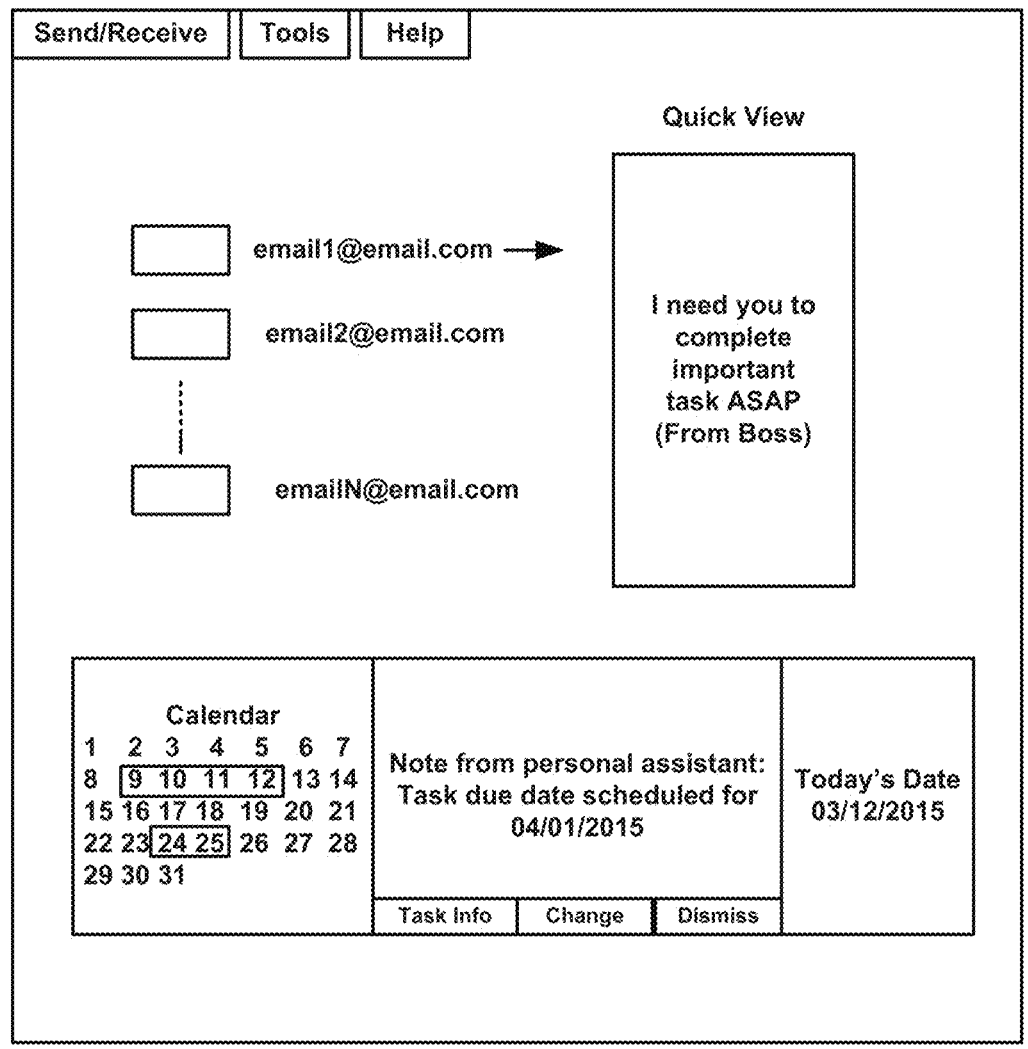
FIG. 6 shows an interface for scheduling time associated with an objective, in accordance with another embodiment.

FIG. 6 shows an interface 600 for scheduling time associated with an objective, in accordance with another embodiment. As an option, the interface 600 may be implemented in the context of the architecture and environment of FIGS. 1-5 or any subsequent Figure(s). Of course, however, the interface 600 may be implemented in any desired environment. It should also be noted that the aforementioned definitions may apply during the present description.

In operation, the interface 600 may be utilized to send, receive, and/or read email messages (or any other type of messages, for that matter). In one embodiment, an email may be received by an application associated with the interface 600 and the email may be automatically examined to determine if an objective is defined in the email. For example, the email may include a task assignment from a supervisor.

In one embodiment, once the objective is identified from the email, an importance or priority level may automatically be assigned to the objective (e.g. based on one or more rules, etc.). For example, if an email with a task assignment is from a supervisor, a priority level of "High" may be associated with the objective. As another example, if an email with an objective assignment is from a supervisor to a large group of recipients, a lower priority (e.g. "Low," or "Medium," etc.) may be assigned to the objective. Of course, the priority or importance level may be ascertained from the message in a variety of ways (e.g. by identifying keywords/phrases, etc.).

Additionally, in one embodiment, once the objective is identified from the email, an amount of time required (or estimated to be required) to achieve the objective may automatically be determined (e.g. based on one or more rules, etc.). This amount of time may include any measurement of time including seconds, minutes, hours, days, and years, etc.

In one embodiment, once the amount of time required to achieve the objective is determined and the importance level is determined, the amount of time may automatically be allocated, or blocked off, in a calendar. In various embodiments, the block of time may be allocated in a variety of different slots, based on the importance level, the amount of time required to achieve the objective, and/or the availability indicated in the calendar, etc.

In another embodiment, any updating/modification of the calendar may be first presented to the user as an optional/proposed recommendation which must be accepted, before actually becoming an actual part of the calendar. Further, such calendar-related recommendation may be presented in an interface that is displayed simultaneously (e.g. in the same GUI portion, i.e. pane, window, etc.) as the original message. Still yet, it is contemplated that multiple recommendations may exist and thus may be presented simultaneously together (e.g. side-by-side) or in serial. Further, in connection with a serial presentation, a most highly-recommended proposal may be presented first, with less highly-recommended proposal(s) being presented only if requested or if the most highly-recommended proposal is rejected, etc.

Furthermore, in one embodiment, an objective due date may also be assigned, based on the importance level, the amount of time required to achieve the objective, and/or the availability indicated in the calendar, etc. In another embodiment, the objective due date may be assigned based on a hard or soft date indicated in an email, by a user, or explicitly indicated in any other manner.

Still yet, in one embodiment, an alert or notification may be generated that includes information associated with the objective. For example, in one embodiment, the alert or notification may include information associated with the due date, a snapshot of a relevant portion of a calendar, time available to achieve the objective, resources available to achieve the objective, and/or a variety of other information. In one embodiment, the alert or notification may be displayed periodically. In another embodiment, the alert or notification may be capable of being displayed constantly.

In one embodiment, the alert or notification may be displayed in the same window as an email application window. In another embodiment, the alert or notification may be displayed in a window separate from an email application window. In one embodiment, the alert or notification may be displayed in the same window as a calendar application window. In another embodiment, the alert or notification may be displayed in a window separate from a calendar application window.

Figure 7:
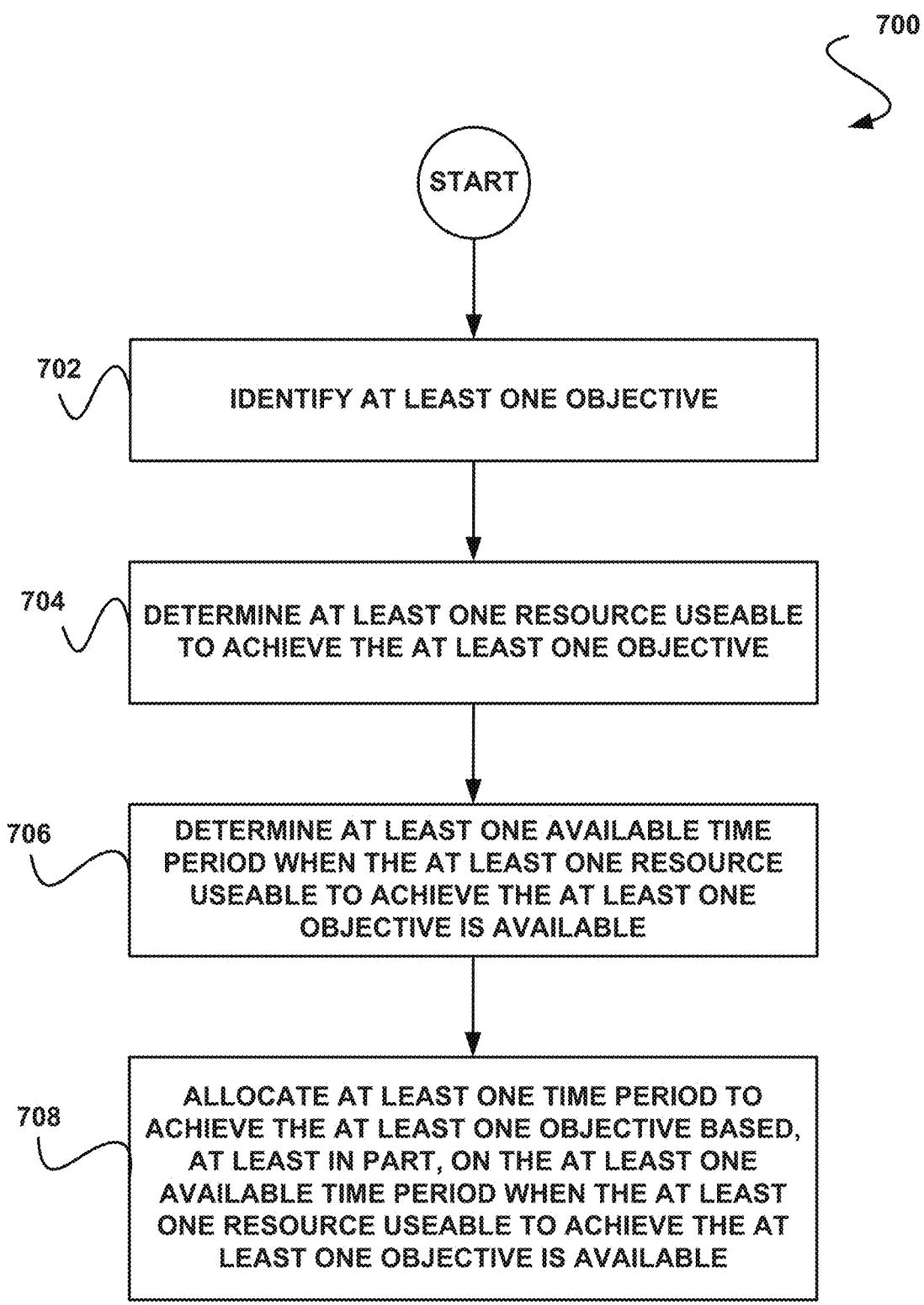
FIG. 7 shows a method for allocating at least one time period to achieve at least one objective, in accordance with another embodiment.

FIG. 7 shows a method 700 for allocating at least one time period to achieve at least one objective, in accordance with another embodiment. As an option, the method 700 may be implemented in the context of the architecture and environment of FIGS. 1-6 or any subsequent Figure(s). Of course, however, the method 700 may be carried out in any desired environment. It should also be noted that the aforementioned definitions may apply during the present description.

As shown, at least one objective is identified. See operation 702. Additionally, at least one resource useable to achieve the at least one objective is determined. See operation 704.

In the context of the present description, a resource refers to any person, place, or thing that is capable of being used to achieve the objective. For example, in various embodiments, the resources may include one or more people (e.g. people with technical knowledge, people required for a specific event, people with particular equipment, etc.), a desired or required location (e.g. an office, a recreational location, a lab, etc.), and desired or required equipment (e.g. computers, tools, vehicles, media devices [e.g. television, DVD player, music player, etc.], etc.), and any other resource that fits the above description. In one embodiment, the useable resource may include a resource required to achieve the objective. In this case, at least one resource required to achieve the objective may be determined.

As shown further, at least one available time period when the at least one resource useable to achieve the at least one objective is available is determined. See operation 706. Additionally, at least one time period to achieve the at least one objective is allocated based, at least in part, on the at least one available time period when the at least one resource useable to achieve the at least one objective is available. See operation 708.

In one embodiment, more than one time period may be allocated to achieve the objective. For example, in one embodiment, the time periods to achieve the object may be allocated in different time slots based on user availability. In one embodiment, the user availability may be illustrated in a calendar.

In one embodiment, allocating the at least one time period to achieve the objective may be further based, at least in part, on an importance level associated with the at least one objective. For example, in one embodiment, if an importance level associated with the objective is high, the time period to achieve the objective may be allocated during a time period that indicates the high importance (e.g. first, etc.). In one embodiment, other scheduled time periods associated with objectives may be moved or canceled, based on the importance level. For example, in one embodiment, a time period allocated to complete a low priority objective may be moved and a time period allocated to complete a high or medium priority objective may be placed in that spot or a portion of thereof.

Additionally, in one embodiment, allocating the time period to achieve the objective may be further based, at least in part, on an amount of time to achieve the objective. For example, the amount of time to achieve the objective may be three days. For any number of reasons (e.g. convenience, resource availability, etc.), it may be necessary or desirable to schedule the time to complete the objective as three consecutive days. Accordingly, an available period of three consecutive days may be determined, or perhaps a period of three days allocated to a lower priority objective may be determined, and the time period may be allocated to the determined time period. In another embodiment, allocating the time period to achieve the objective may be based on an amount of time to achieve the objective and the amount of time the resource may be used.

Determining a useable resource may be accomplished in a variety of ways. For example, in one embodiment, determining the resource useable to achieve the objective may include receiving a user input indicating the resource useable to achieve the objective. For example, a user may input a name of a usable resource using a user interface. As another example, the user may select a useable resource from a drop-down menu or a list.

In another embodiment, determining the resource useable to achieve the objective may include determining the resource useable to achieve the objective from a message. For example, a message associated with the objective may explicitly state a resource required to achieve the objective (e.g. "You will need to address this with Mike," "you will need to take the van," "the meeting is at Burger King on $4^{th}$ Street," etc.). In another embodiment, a message associated with the objective may infer a resource required to achieve the objective. For example, the message may be associated with an objective including a meeting located at a remote location. Thus, it may be inferred that a useable resource to achieve the objective is a vehicle to drive to the remote location.

In another embodiment, determining the resource useable to achieve the objective may include determining the resource useable to achieve the objective from the subject or name of the objective. For example, if the objective includes a "9 a.m. teleconference," it may be inferred that a useable resource is a telephone. As another example, if the objective includes a "100 page paper on fractals," it may be inferred that a useable resource is a computer. As yet another example, if the objective includes a "10 a.m. meeting with Randy," it may be inferred that a useable resource is Randy.

In another embodiment, determining the resource useable to achieve the objective may include determining the resource useable to achieve the objective based on at least one rule. For example, one or more rules may indicate that if the objective equals one or more of A, B, or C, etc., the useable resources include X, Y, and Z. Of course, other techniques including a look-up table, etc. may also be employed.

In another embodiment, determining the resource useable to achieve objective may include determining the resource useable to achieve the objective based on information associated with another objective. In one embodiment, the information associated with the other objective may include information associated with at least one resource useable to achieve the other objective. In another embodiment, the information associated with the other objective may include a name of the resource useable to achieve the other objective. In one embodiment, the other objective may include a previously achieved objective. As an option, the multiple objectives may be dependent on one another (e.g. achievement of one objective requires achievement of another, etc.). In such embodiment, the aforementioned dependency may be used to identify related objectives and thus additional relevant resources. Of course, the above dependency may take any form such as a simple link or a more complex hierarchical data structure.

In a similar manner, multiple resources may be dependent on one another (e.g. use of one resource may require use of another, etc.). Such may be the case where a particular thing (e.g. tool, computing resource, etc.) requires a particular person to operate the same. It may also be the case where a particular person requires a particular thing or place to deliver the required resource. It may also be the case where a particular place requires a particular person to provide access, supervision, guidance, etc. In such embodiment, the aforementioned dependency may be used to identify additional required resources. Of course, the above dependency may take any form such as a simple link or a more complex hierarchical data structure.

In one embodiment, determining the available time period when the resource useable to achieve the objective is available may include utilizing a schedule. For example, a schedule indicating resource availability may be accessible such that the resource availability may be determined. In one embodiment, the schedule indicating resource availability may include a user calendar (e.g. a user required for a meeting, etc.). In another embodiment, the schedule indicating resource availability may include a vehicle use schedule. In another embodiment, the schedule indicating resource availability may include a tool use/availability schedule. In another embodiment, the schedule indicating resource availability may include a room use/availability schedule. In still another embodiment, the availability may be determined by querying the resource (e.g. a relevant database, an owner or responsible entity, etc.).

Once the resource availability is determined, a time to achieve the objective may be determined and/or allocated. In one embodiment, allocating the time period to achieve the objective may include blocking off the time period to achieve the at least one objective in a calendar. In another embodiment, time may also be blocked off in a resource use/availability schedule, such that the resource is reserved.

More illustrative information will now be set forth regarding various optional architectures and features with which the foregoing techniques discussed in the context of any of the present or previous figure(s) may or may not be implemented, per the desires of the user. For instance, various optional examples and/or options associated with the objective of operation 702, the determining of operation 704, the determining of operation 706, the allocating of operation 708, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 8:
FIG. 8 shows an interface for scheduling time associated with an objective, in accordance with another embodiment.

FIG. 8 shows an interface 800 for scheduling time associated with an objective, in accordance with another embodiment. As an option, the interface 800 may be implemented in the context of the architecture and environment of FIGS. 1-7 or any subsequent Figure(s). Of course, however, the interface 800 may be implemented in any desired environment. It should also be noted that the aforementioned definitions may apply during the present description.

In operation, the interface 800 may be utilized to send, receive, and/or read email messages (or any type of messages for that matter). In one embodiment, an email may be received by an application associated with the interface 800 and the email may be automatically examined to determine if an objective is defined in the email. Additionally, in one embodiment, the email may be automatically examined to determine if a resource is needed or desired to achieve the objective. In various embodiments, the resource may be defined in the email, or may be inferred from the email. In another embodiment, the user may have the ability to define a resource for achievement of the objective. The aforementioned resource definition may be achieved utilizing: an object with a predetermined format (e.g. inclusive of relevant parameters, etc.), a combination of one or more menu option selections, and/or a more freeform technique (e.g. filling in a field with natural language that is later manually/automatically parsed, etc.).

In one embodiment, once a resource is identified, a schedule 802 associated with the resource may be accessed to determine the availability of the resource. In various embodiments, this may be accomplished automatically and/or manually. The schedule 802 associated with the resource may be a schedule stored on a local system or a remote system accessible over a network. In one embodiment, accessing the schedule may require user authentication in the form of a user name and/or password.

In various embodiments, the schedule 802 associated with the resource may or may not be displayed simultaneously with the interface 800. For example, the schedule 802 may be displayed in an integrated way with the interface 800 and allow for interaction therewith. In cases where there is a person or entity managing the resource, the interface 800 may even possibly allow for communication (e.g. via instant messaging, texting, VOIP phone call, email, etc.) with such person or entity to inquire further about any particular details involving scheduling of the desired resource.

In one embodiment, once the resource availability is determined, a schedule of a user associated with the objective may be cross referenced to determine a time period to achieve the objective. In other words, any overlap between availability may be identified and presented for automatic or manual selection and/or acceptance of proposed timeframes. This time period may then be documented in the form of a blocked or scheduled period in a calendar of the user.

If, for some reason, the resource later becomes unavailable, a notification of the user may be initiated and the above process may be repeated as required. Such unavailability may involve resource inoperability, another person's use of the resource going over an allotted time, a higher-prioritized/ranked person requesting the scheduled timeslot, etc. (and the aforementioned notification may indicate the same). In various embodiments, such notification may be multi-modal (e.g. call, IM, e-mail), which may allow for a user to be alerted more effectively of any change, etc.

Figure 9:
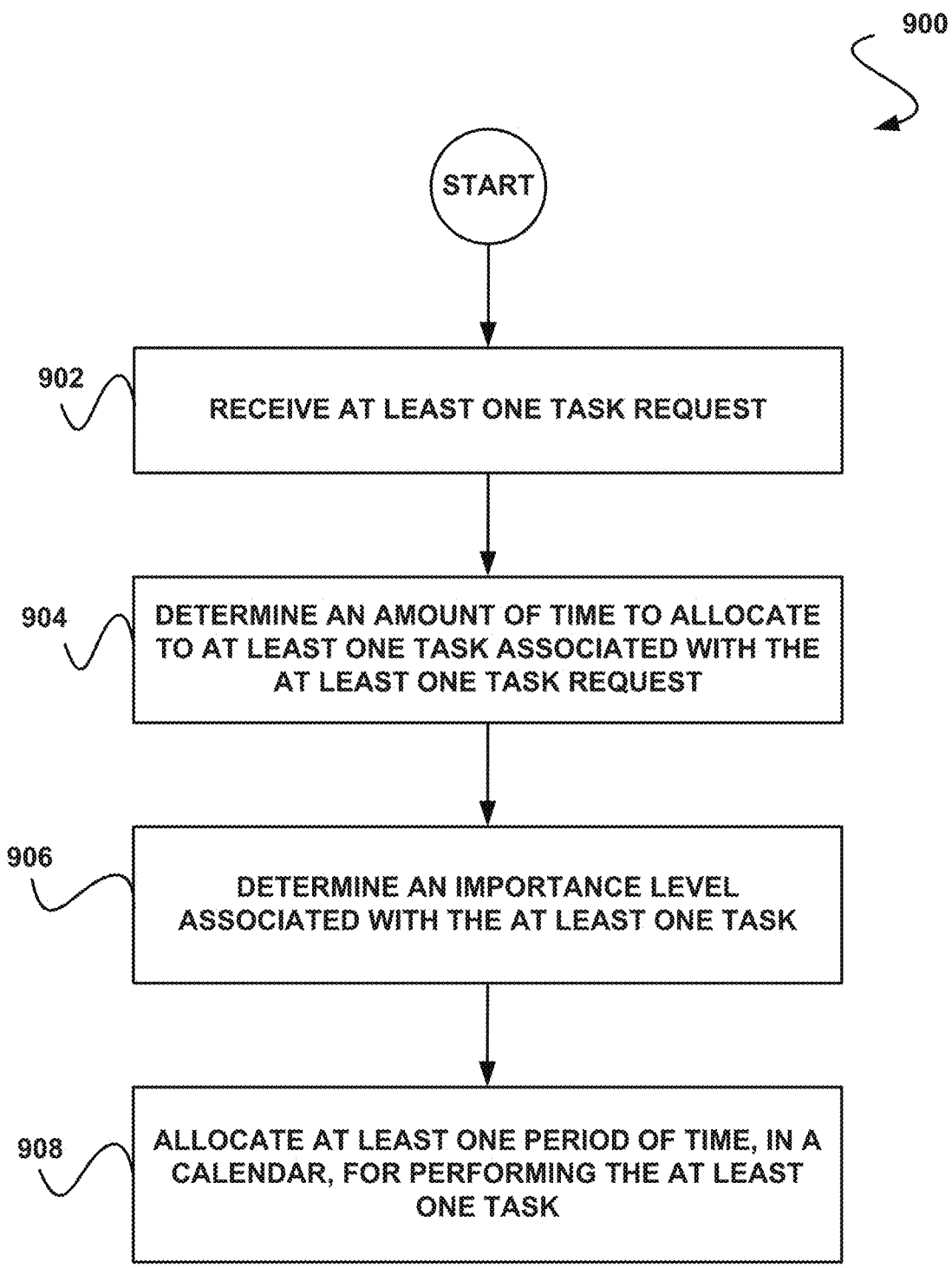
FIG. 9 shows a method for performing at least one task, in accordance with another embodiment.

FIG. 9 shows a method 900 for performing at least one task, in accordance with another embodiment. As an option, the method 900 may be implemented in the context of the architecture and environment of FIGS. 1-8 or any subsequent Figure(s). Of course, however, the method 900 may be carried out in any desired environment. It should also be noted that the aforementioned definitions may apply during the present description.

As shown, at least one task request is received. See operation 902. Additionally, an amount of time to allocate to at least one task associated with the at least one task request is determined. See operation 904. Further, an importance level associated with the at least one task is determined. See operation 906. In addition, at least one period of time is allocated, in a calendar, for performing the at least one task. See operation 908.

In the context of the present description, a task request refers to any request, demand, or suggestion to at least partially perform a task. In various embodiments, the task request may include a meeting request, work request, an activity request, phone call request, an appointment request, and/or any other type of task request. In one embodiment, an objective request may be received. In this case, the objective request may include a request, demand, or suggestion to achieve any type of objective.

The calendar may include any type of calendar, such as a personal calendar or a publicly accessible calendar. In one embodiment, the calendar may include a calendar capable of being accessed via a social media website. In one embodiment, the calendar may be capable of being stored in memory of a computer system associated with the social media website.

In one embodiment, allocating of the period of time may be based, at least in part on the determined amount of time to allocate to the task and the importance level associated with the at least one task. For example, higher priority tasks may take the place of lower priority tasks, depending on a schedule of a user, as indicated by the calendar. In one embodiment, allocating the period of time, in the calendar, for performing the task may include determining whether another allocated time period associated with another task in the calendar is capable of being moved, cancelled, or postponed. In various embodiments, determining whether the other allocated time period associated with the other task in the calendar is capable of being moved, cancelled, or postponed, may depend on a deadline, due date, resource availability, an importance level, and other factors.

In one embodiment, determining whether another allocated time period associated with another task in the calendar is capable of being moved, cancelled, or postponed may include determining whether the other task is of an importance level that is lower than the importance level associated with the at least one task. For example, if it is determined that the other task is of an importance level that is lower than the importance level associated with the current task, it may then be determined that the time period associated with the other task in the calendar is capable of being moved, cancelled, or postponed.

In another embodiment, allocating the period of time in the calendar for performing the at least one task may include blocking off the time period in the calendar, based on at least one rule. In various embodiments, the rules may include rules inferred based on user action or inaction, rules defined by a user, and/or default rules that may be automatically applied.

In various embodiments, determining the amount of time to allocate to the task may be accomplished in a variety of ways, including receiving a user input indicating the amount of time to allocate to the task, determining the amount of time to allocate to the task from a message, and determining the amount of time to allocate to the task based on at least one rule, etc. Furthermore, in various embodiments, the task request may be received in a variety of ways, including receiving the task request in a message, and receiving the task request at an application interface associated with the calendar, etc.

As an option, the calendar including one or more scheduled tasks may be displayed. In various embodiments, the scheduled tasks may be displayed in a list layout, a calendar view, as pop-ups on a calendar, and/or any in any other manner capable of displaying the scheduled tasks.

More illustrative information will now be set forth regarding various optional architectures and features with which the foregoing techniques discussed in the context of any of the present or previous figure(s) may or may not be implemented, per the desires of the user. For instance, various optional examples and/or options associated with the task request of operation 902, the determining of operation 904, the determining of operation 906, the allocating of operation 908, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 10:
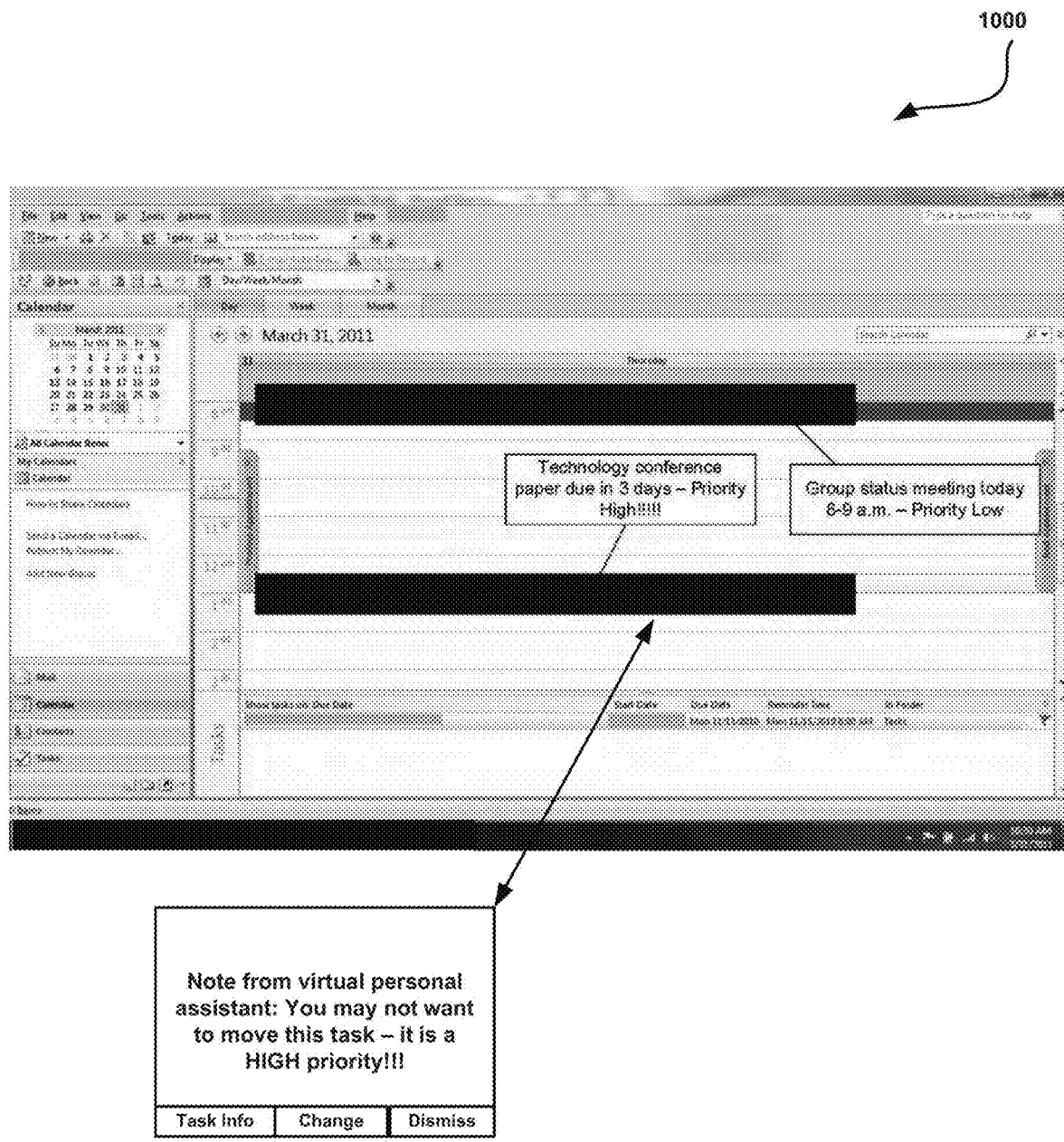
FIG. 10 shows an interface for displaying automatically scheduled objectives, in accordance with another embodiment.

FIG. 10 shows an interface 1000 for displaying automatically scheduled objectives, in accordance with another embodiment. As an option, the interface 1000 may be implemented in the context of the architecture and environment of FIGS. 1-9 or any subsequent Figure(s). Of course, however, the interface 1000 may be implemented in any desired environment. It should also be noted that the aforementioned definitions may apply during the present description.

As shown, the interface 1000 may be utilized to display automatically scheduled tasks and objectives. In one embodiment, the interface 1000 may be utilized to view daily, weekly, monthly, and yearly tasks and objectives. Additionally, in one embodiment, user defined tasks and allotted time may be capable of being input and displayed coincidently with automatically defined tasks and automatically allotted times, using the interface 1000.

In one embodiment, the user may have the ability to shift, delete, update, and/or modify scheduled objectives, utilizing the interface 1000. In one embodiment, a virtual personal assistant may be associated with the calendar. In various embodiments, the virtual personal assistance may take the form of a dialogue box, a pop-up window, a portion of the interface 1000, and/or a variety of other forms. In one embodiment, the virtual personal assistant and software associated therewith, may be capable of automatically scheduling the tasks and objectives, determining the importance level, updating status, modifying the scheduled calendar tasks, generating and applying rules inferred from user action or explicitly defined by the user, making suggestions, generating and displaying alerts, an/or performing scheduling tasks etc. that may otherwise be performed by a human personal assistant.

Figure 11:
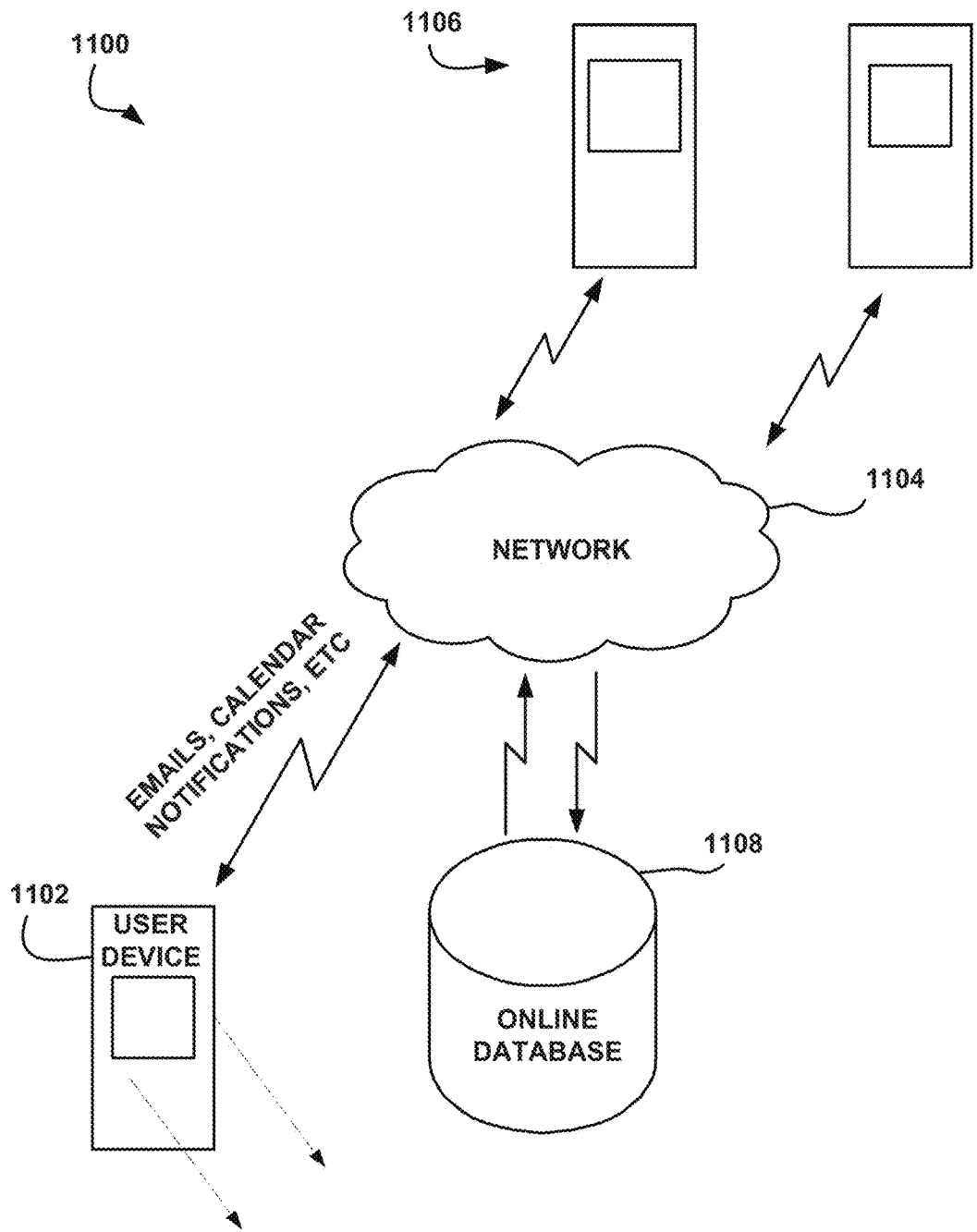
FIG. 11 shows a system for implementing a virtual personal assistant, in accordance with another embodiment.

FIG. 11 shows a system 1100 for implementing a virtual personal assistant, in accordance with another embodiment. As an option, the system 1100 may be implemented in the context of the architecture and environment of FIGS. 1-10 or any subsequent Figure(s). Of course, however, the system 1100 may be implemented in any desired environment. It should also be noted that the aforementioned definitions may apply during the present description.

As shown, a user device 1102 is provided. The user device 1102 may be capable of communicating with multiple other devices 1106 over one or more networks 1104. Furthermore, the user device 1102 and the devices 1106 may be capable of communicating with one or more online databases 1108. The user device 1102 and the devices 1106 may include any type of device including a mobile device (e.g. a mobile phone, a PDA, a laptop computer, a handheld computer, a tablet computer, etc.) or a desktop device (e.g. a television, a computer, etc.).

In various embodiments, the user device 1102, the devices 1106, and/or the online databases 1108, may include computer code capable of implementing a virtual personal assistant module. In one embodiment, the virtual personal assistant and computer code associated therewith, may be capable of automatically scheduling tasks and objectives, determining importance level associated with the tasks and objectives, updating status associated with the tasks and objectives, modifying calendar tasks, generating and applying rules inferred from user action or explicitly defined by a user, making suggestions to a user, generating and displaying alerts, and otherwise performing scheduling tasks etc. that may be performed by a human personal assistant.

Thus, in one embodiment, an intelligent personal assistant module may be implemented by a user utilizing the user device 1102 to help manage task scheduling etc., and otherwise help manage work and personal items for the user. In one embodiment, the personal assistant module may include an add-on that may integrate with existing e-mail applications, task applications, and/or calendar applications. In one embodiment, computer code associated with the virtual personal assistant module may be capable of learning personal and work habits of a user, skills and/or weaknesses of a user, desires of a user, likes and dislikes of a user, and other characteristics of a user. In various embodiments, this information may be automatically learned or explicitly taught by a user by interacting with an interface associated with the virtual personal assistant in a discussion-type format.

In one embodiment, computer code associated with the virtual personal assistant may assist a user by suggesting user actions or responses, and/or automating responses associated with external stimuli. In one embodiment, the virtual personal assistant may allow corporate or workgroup integration, such that a user may assign and track objectives, goals, and tasks across an enterprise while, also servicing each individual. It should be noted that, although in the context of the present description, the virtual personal assistant may be said to be capable of performing tasks, etc., it should be appreciated that any computer code associated with the virtual personal assistant, any other software module, and/or an operating system may equally perform these tasks, etc.

In one embodiment, the virtual personal assistant may function over Web-hosted e-mail, task, and/or calendar services. In another embodiment, the virtual personal assistant may integrate into instant messaging platforms and location services, in order to gather user information (e.g. by user actions, incoming messages, etc.), becoming even more intelligent, and helpful, as more information is acquired. Over time, the virtual personal assistant may function to learn the preferences and characteristics of a user in order to automate certain tasks and objectives associated with both business and personal matters. In various embodiments, there may a virtual personal assistant for personal use, enterprise use, as well as an SMB version, etc.

In one embodiment, the virtual personal assistant may be capable of identifying and/or scheduling goals, objectives, and targets. Additionally, in one embodiment, each goal, objective, or target may include an indicator of importance, a timeline for completion, and/or an indication as to who would benefit from completion of the goal, objective, or target. In one embodiment, goals, objectives, or targets may be identified or defined, along with various other attributes. For example, upon definition, an importance indication (e.g. High, Medium, Low, etc.) may be identified or defined, an urgency indication (e.g. High. Medium, Low, etc.) including deadlines may be identified or defined, and an indication as to what completing the objective, etc. will achieve may be determined.

In one embodiment, the virtual personal assistant may be configured to ask one or more questions to a user when an objective is achieved or expired. For example, in various embodiments, when objectives are completed or have expired, the virtual personal assistance may ask a user questions such as: "How long did the task really take?"; "Was it important you completed the task?"; "If it was not important for you to complete the task, who should have done it?"; "How satisfied are you that you completed the task?"; "How well did you complete the task?"; "Did you have the right amount of time to complete the task?"; "If you were not allocated the correct amount of time to complete the task, did you need more or less, and by how much?"; "How enjoyable was the task?"; "How valuable was completing the task?"; "How interesting was it to complete the task?"; and/or various other questions associated with the objective.

In another embodiment, the virtual personal assistant may not necessarily ask all questions at once. Additionally, in one embodiment, the virtual personal assistant may learn patterns of the user and may ask questions based on the answer patterns of the user. Additionally, the virtual personal assistant may learn the type of questions that the user is likely to answer and may choose to ask the questions accordingly.

In one embodiment, objectives may be classified (e.g. into domains, etc.). For example, in one embodiment, objectives may be classified utilizing color coding and/or a hierarchy. In one embodiment, the classification may include a personal or business classification. In another embodiment, the classification may include multiple occupation classifications.

In one embodiment, a virtual personal assistant associated with a first user (e.g. a supervisor, etc.) may be capable of defining objectives and tasks for other users that report to the first user. In another embodiment, the other users may be able to accept or reject the defined objective. As an option, the first user may be capable of defining objectives and tasks for other users that report to the first user manually.

In one embodiment, measures or statistics may be defined and/or tracked for objectives. As an option, the measures or statistics may be utilized as a scorecard for determining a progress of objectives. In one embodiment, if an objective or task is assigned to others, the virtual personal assistant may send a reminder (e.g. via email, text message, phone, etc.) to remind a user automatically, if the objective or task assignment was not acknowledged in a timely fashion. For example, in one embodiment, there may be a default configurable expected response time beyond which reminders may be sent to users that received the object or task. In another embodiment, the virtual personal assistant may display a reminder to the sender of the objective to remind the user automatically, if the objective or task assignment was not acknowledged in a timely fashion.

In one embodiment, the virtual personal assistant may classify tasks in a hierarchy. For example, in one embodiment, tasks may be defined as primary tasks and sub-tasks. In one embodiment, emails may be defined as a sub-task.

Further, in one embodiment, the virtual personal assistant may scan emails for topics (e.g. using terminology, etc.). For instance, names of products, industry segments, organizations, customer names, suppliers, partners, names of people in these organizations, etc. may be automatically tagged with importance level tags. As an option, these tags may be utilized for identifying a level of importance for objectives.

In one embodiment, the virtual personal assistant may organize the time for a user and automatically schedule time to read and/or respond to email. Additionally, in one embodiment, automatically scheduling time to read and/or respond (e.g. processing email, etc.) to email may be based on the expected time that mail processing will take (e.g. based on a previous amount of time taken to process the email, based on an average amount of time taken to process the email, etc.). Such expected time may also be a function of a sender of each email, a number of emails, a category of each email, a presence and/or length of any attachment, etc.).

In another embodiment, the virtual personal assistant may monitor and/or track how a user has utilized time. For example, the virtual personal assistant may monitor actions by the user while the user is using the user device 1102, and log the time when the user is not using the user device 1102 (or an associated device). In one embodiment, the virtual personal assistant may display questions to the user when the user returns to the user device 1102. For example, the virtual personal assistant may ask the user, "What did you do?" In this way, the virtual personal assistant may learn details associated with the habits of the user. In one embodiment, the virtual personal assistant may present the user with an interface to answer the question and/or a list of predetermined answers that the user may select.

In one embodiment, a user may be associated with multiple user devices (e.g. a phone and computer, a PDA and computer, etc.). As an option, the virtual personal assistant may track usage on all devices associated with the user, transparently to the user. In this way, all user action on the associated devices may be logged. In one embodiment, a virtual personal assistant may be stored and run locally on all of the associated devices. In another embodiment, the virtual personal assistant and/or the user action log may be stored on in a centralized location (e.g. a network server, distributed servers, a network cloud, etc.).

In another embodiment, the virtual personal assistance may classify the monitored user actions and/or the user actions indicated explicitly by the user. For instance, in one embodiment, the virtual personal assistant may classify actions performed by the user as shown in the hierarchy of Table 1.

TABLE 1

Business
  Authoring
    Programs
    Document
  Meeting
    Internal
      Team
      Peers
    External
      Customer
  Presentation
  Training
  Personal development
Personal
  Exercise
    Squash
  Have fun
    Watch a movie
  Family time
  Vacation In one embodiment, the user actions may not necessarily be classified as strictly hierarchical and orderly as shown in Table 1. For example, in one embodiment, the virtual personal assistant may tag the user actions based on content and/or context.

Additionally, in one embodiment, individual emails may be sub-tasks of checking and processing e-mail and automatic clues as to what to do with email may be presented to the user in an intuitive manner. For instance, a user may have one or more commonly used folders. In one embodiment, the virtual personal assistant may suggest a destination folder for emails. For example, in one embodiment, the virtual personal assistant may provide a one click suggestion or a short key to provide a suggested folder for the email.

In another embodiment, suggested destination folders for messages may be presented upon a right click of a mouse. In another embodiment, suggested destination folders for messages may be presented on a tool bar associated with a user interface. For example, in various embodiments, suggested destination folders for messages may be presented on a tool bar associated with an email application interface, a calendar application interface, an instant messaging application interface, and any other interface. In another embodiment, suggested destination folders for messages may be presented by a single click on tool bar or a keyboard sequence. Further, in another embodiment, emails may be sorted, ordered, prioritized, etc. based on suspected importance.

In one embodiment, the virtual personal assistant may utilize more than one technique of processing tasks and prioritization. As an option, the user may be either able to individually select the processing and prioritization technique, or the virtual personal assistant may select the technique for the user.

In one embodiment, the virtual personal assistant may anticipate and learn the behavior of a user, as well as the correct level of interactivity with user. For example, if the user declines to answer questions, the virtual personal assistant may ask the user less questions in the future. If the user is answering all of the questions asked by the virtual personal assistant, the virtual personal assistant may gradually ask a few more questions.

In one embodiment, the virtual personal assistant may begin by asking several task related questions (e.g. 2-3 questions about a task, etc.), and the user may be very diligent in responding to these. Accordingly, in the future, the virtual personal assistant may ask about more tasks or ask additional questions. Also, the virtual personal assistant may automatically modify or add triggers for asking questions (e.g. if the user does X ask Y, etc.).

In one embodiment, the questions to the user may be facilitated utilizing indicators or icons associated with gestures. For example, in one embodiment a toolbar may be displayed including one or more short-keys or buttons with descriptive icons or buttons.

In one embodiment, the virtual personal assistant may include one or more triggers for triggering questions to ask a user. In various embodiments, the triggers may include statistical triggers (e.g. if X then use trigger Y, etc.), or triggers that are always on. Additionally, in one embodiment, the user may be capable of configuring triggers and/or of erasing the history of triggers. In one embodiment, access to trigger configuration may be allowed under an advanced settings tab.

In one embodiment, the virtual personal assistant may continuously recalibrate and/or update assumptions associated with the user. In another embodiment, the virtual personal assistant may periodically recalibrate and/or update assumptions associated with the user. In one embodiment, recalibrating and/or updating assumptions may include asking questions, such as: "Am I bugging you too much?"; or "Would you rather I alert you only at fixed times of day?", etc. In one embodiment, the virtual personal assistant may recognize patterns such as sleep, lunch, evening, etc. and schedule alerts accordingly to avoid these times. In yet another embodiment, the aforementioned recalibrating and/or updating may be scheduled based on current user activity and/or a user calendar (e.g. prompt the user only during free periods, etc.).

In another embodiment, the virtual personal assistant may periodically alert a user about tactical issues and strategic issues. For example, in one embodiment, the virtual personal assistant may ask the user for initial guidance about when to suggest strategic advice (e.g. if major objectives going unaddressed, etc.). In another embodiment, the virtual personal assistant may accept the user preference as to when to ask these strategic based question and/or other questions (e.g. Monday morning, Friday afternoon, etc.).

In one embodiment, scheduling may be assisted by this assistant. For instance, activities such as checking and/or responding to mail may be scheduled in the calendar for a user automatically by the virtual personal assistant. In one embodiment, the activities may be scheduled in the calendar, based on user preference.

Additionally, in one embodiment, the virtual personal assistant may allow a user to define a service level agreement (SLA) for email. As an option, the virtual personal assistant may be capable of automatically tracking the SLA and may alert the user of potential SLA violations. In various embodiments, such SLA may vary for different recipients on an individual or a more aggregate basis [e.g. group, hierarchy, classification (work/personal), etc.].

In one embodiment, the virtual personal assistant may be capable of determining which times of day and locations a user is most effective at performing specific actions or tasks. For example, the virtual personal assistant may determine the circumstances where a user is most effective at e-mails, meetings, presentations, producing documents, producing presentations, writing code, etc. and automatically schedule the tasks accordingly.

In one embodiment, tasks and objectives may also be defined for organizations. Additionally, in one embodiment, a user may define an organization structure. Further, as an option, a user may define which users are able to view score-cards and lists of tasks within the organization. In another embodiment, the virtual personal assistant may suggest personnel who may be able to perform certain activities. For instance, when a task is defined, the virtual personal assistant may ask a user whether the user is the only person that can perform this task. In an embodiment where tasks and/or objectives requires input/work product from multiple persons in an organization and such input/work product need not be provided serially, scheduling among such people may utilize the techniques disclosed herein for optimizing completion of the tasks and/or objectives.

In another embodiment, a topic may be determined from a message or task. If the topic is related topic is related to topic X, the virtual personal assistant may determine that a first user has asked a second user in the past to deal with that topic. Accordingly, the virtual personal assistant may ask the first user whether to assign the task to the second user.

In one embodiment, a rule engine may be utilized and the implementation of triggers and suggestions may be handled by rules. As an option, the information learned may be input to the rule engine. In one embodiment, the rules may be visible and customizable. In another embodiment, the reasons/rationale for creating the rules may be automatically entered into as a comment in the rules engine.

Additionally, in one embodiment, the virtual personal assistant may be capable of tracking a location of the user. For example, in one embodiment, location services associated with a user device may be utilized to track the location of the user (e.g. utilizing GPS, triangulation, etc.). In another embodiment, the location of the user may be determined and/or tracked based on the specific device the user is using. For example, the location of specific user devices may be known and utilized to determine location based on use by the user.

In another embodiment, the virtual personal assistant may utilize various sources of presence and location detection to determine user presence and/or location. For instance, the virtual personal assistant may receive information from IM clients about the presence of individuals. Further, the actual location of a user may be deduced through APIs and/or web services exposed by a Telecom broadband access provider (e.g. a wireless/mobile carrier, etc.).

Figure 12:
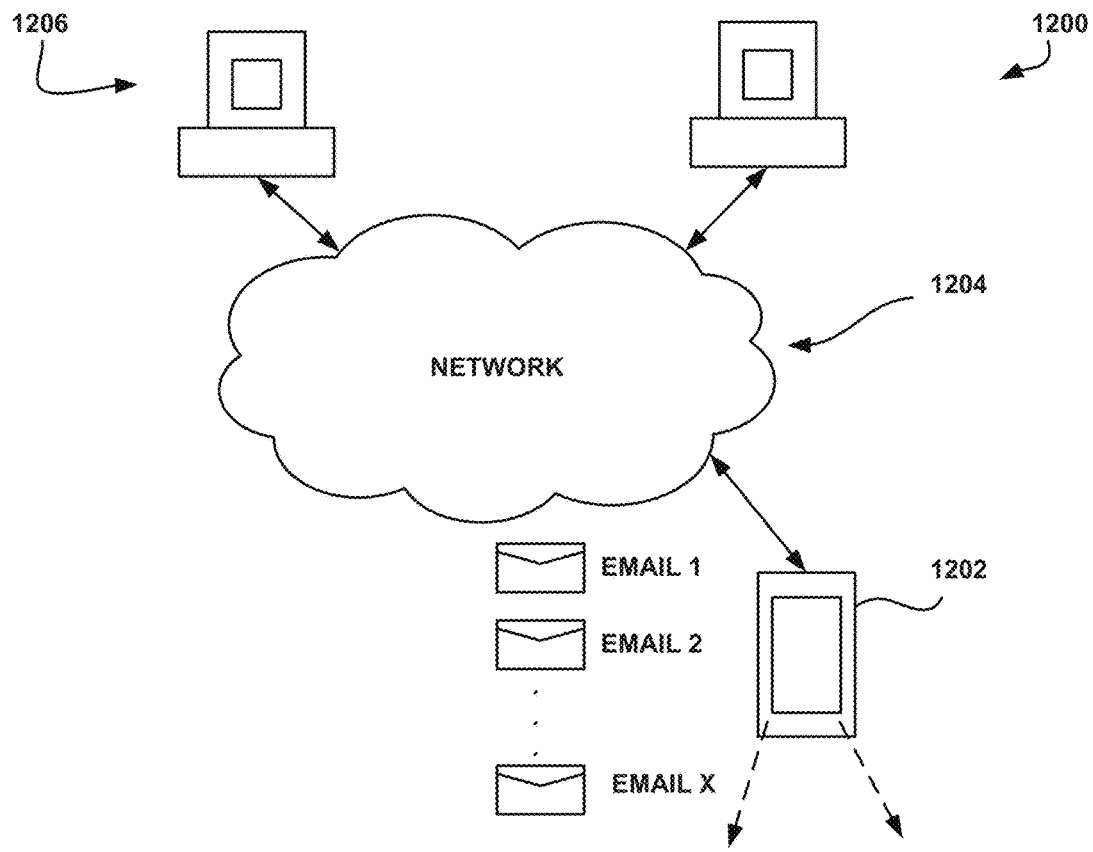
FIG. 12 shows a system for implementing a virtual personal assistant, in accordance with another embodiment.

FIG. 12 shows a system 1200 for implementing a virtual personal assistant, in accordance with another embodiment. As an option, the system 1200 may be implemented in the context of the architecture and environment of FIGS. 1-11 or any subsequent Figure(s). Of course, however, the system 1200 may be implemented in any desired environment. It should also be noted that the aforementioned definitions may apply during the present description.

As shown, a user device 1202 is provided. The user device 1202 may be capable of communicating with multiple other devices 1206 over one or more networks 1204. Furthermore, the user device 1202 and the devices 1206 may be capable of communicating with one or more online databases. The user device 1202 and the devices 1206 may include any type of device including a mobile device (e.g. a mobile phone, a PDA, a laptop computer, a handheld computer, a tablet computer, etc.) or a desktop device (e.g. a television, a computer, etc.).

In various embodiments, the user device 1202, the devices 1206, and/or the online databases, may include computer code capable of implementing a virtual personal assistant module. In one embodiment, the virtual personal assistant and computer code associated therewith, may be capable of automatically scheduling tasks and objectives, determining an importance level associated with the tasks and objectives, updating a status associated with the tasks and objectives, modifying calendar tasks, generating and applying rules inferred from user action or explicitly defined by a user, making suggestions to a user, generating and displaying alerts, and otherwise performing scheduling tasks, etc. that may be performed by a human personal assistant.

In one embodiment, the virtual personal assistant may be capable of identifying a high-level objective/task and automatically scheduling time for a user to execute that task. For example, a user may need to author a paper. The virtual personal assistant associated with the user may identify the task, determine the time required to complete the task, determine the importance of the task, and/or identify a deadline for the task.

In one embodiment, the virtual personal assistant may then allocate time automatically on a calendar of the user in order to complete the task. Additionally, in one embodiment, when the deadline has been reached, the virtual personal assistant may ask the user whether the task was completed. As an option, if the task has not been completed, the virtual personal assistant may ask the user how much time is still required in order to complete the task. As another option, the virtual personal assistant may then secure such time in the calendar of the user and/or alert the user if there is a problem assigning additional time for completion of the task.

In another embodiment, the virtual personal assistant may determine whether a user is doing what was intended, based on the task information and/or scheduling, and use this information to recalibrate the effectiveness of the time allocation, as well as to reschedule/redesign how the user is spending time. In one embodiment, this may be accomplished by determining the key tools required in order to achieve specific tasks and to determine whether these tools are being used to complete a task. In various embodiments, the tools may include desktop applications or devices (e.g. phones or mobile phone, etc.), specific documents involved in as inputs, intermediary products, or outputs of the work, activity, or task.

In another embodiment, the virtual personal assistant may automatically handle scheduling or calendar requests in a flexible manner. For example, users may need time in order to complete important tasks, however, their day may be filled up with many meetings. Once the calendar is full with meetings, canceling the meetings becomes difficult. Thus, it becomes exceedingly difficult to complete the important time consuming tasks.

It would be desirable to block out time on a calendar of a user to deal with these important tasks. However, this blocks out fixed timeslots. Accordingly, the virtual personal assistant may consider both the importance, and the overall constraints of time for tasks blocked by the calendar in order to schedule tasks in a more flexible manner.

In one embodiment, the virtual personal assistant may be capable of indicating that one or more time slots are occupied when a user attempts to schedule a task, etc. As an option, before the virtual personal assistant responds with an indication that the time slots are occupied, the virtual personal assistant may examine constraints on the already scheduled tasks and determine if any of the already scheduled tasks may be moved or canceled.

For example, in one embodiment, the virtual personal assistant may accommodate meeting requests even if time is blocked out for an important long-running task, as long as the task can be rescheduled and original constraints associated with the task are met. In this way, time associated with a user may be managed by defining the constraints and importance and balancing the two, as opposed to only blocking a time slot without concern for importance and/or constraints. Furthermore, in one embodiment, the virtual personal assistant may decline new meeting requests that conflict with the constraints of the long term important tasks. For example, the virtual personal assistant may consider the urgency of the existing tasks that are scheduled to be more important than the meeting. This offers flexibility to both meet long term and short term needs.

In the context of one possible example, a particular long-running task with a medium importance may have a deadline in 8 hours and require 5 full hours of work to complete. In such case (and assuming the next 8 hours are unscheduled), any meeting requests during such 8 hour period may be accepted unless/until the aggregate of any such meeting requests exceeds 3 hours. Exceptions may be made if any meeting request(s) that do not meet the above criteria have a higher priority (e.g. high importance), assuming that the user has been notified of such exception and accepts.

In one embodiment, the virtual personal assistant may present email filing suggestions. For example, in one embodiment, the email filing suggestions may be based on previous user actions and/or previous email filing rules. As an option, email may be textually scanned and semantic details may be extracted. In one embodiment, the semantic details may be compared with rules created that describe how previous email of a similar set of semantics has been handled.

In one embodiment, after identifying and examining email header information, initial information, or the entire email, the user may be presented with an option to select from a toolbar, etc. to allow one click access to perform an action previously performed on a similar email (e.g. such as moving the email to a particular folder, etc.). In one embodiment, the virtual personal assistant may identify multiple options for a next action.

Further, in one embodiment, a user may be presented with a default one click button and/or a drop down list with other available actions. As an option, a specific sender may have a default action. In another embodiment, mailing lists and/or distribution lists may be considered when automatically filing or suggesting filing for emails. For instance, if a user receives an email that is also distributed to a mailing list, a folder may be automatically suggested for the email. In another embodiment, the email may automatically be filed to the suggested folder. Furthermore, in one embodiment, filing may include deletion.

In another embodiment, email may be automatically prioritized based on threads or conversations. Additionally, in one embodiment, priority may be determined based on past behavior patterns. For example, a user may receive a set of correspondence on a single topic. Instead of manually determining which of the messages in the thread need to be read first and whether or not the messages include all the unique conversations, this may be achieved automatically utilizing the virtual personal assistant or code associated therewith. For example, the virtual personal assistant may identify messages that contain unique content and the messages not identified as having unique content may be automatically suppressed.

In one embodiment, the threads may be visually grouped together such that the first item in the thread presented contains the most current, pertinent, complete information. In another embodiment, the threads may be sorted based on apparent priority. In one embodiment, apparent priority may be determined by the order in which a previous message was processed.

For example, in one embodiment, when a user elects to handle/address a first message before handling/addressing a second message, priority may be inferred. Additionally, in various embodiments, priority may be associated with a sender, distribution lists recipients, subject matter, and/or keywords, etc. In one embodiment, information associated with a message may be utilized to group messages based on semantic similarity. In another embodiment, every time an item is selected for processing out of order, a counter may increase the apparent priority of the item.

In another embodiment, upon scanning, reading, and/or processing incoming messages, the semantic similarity groups may be determined, the predicted apparent priority derived from historic usage information, and the order of the threads may be grouped based on this semantic priority. Of course, in various embodiments, any ordering of messages may occur, based on threads, that minimize the amount of information presented and/or that implements prioritization based on actions of the user (e.g. in some cases, rather than rules defined by the user explicitly, etc.).

In one embodiment, the virtual personal assistant, or computer code associated therewith, may utilize an organizational hierarchy to determine prioritization of tasks. For example, in one embodiment, the virtual personal assistant may implement a rule that the more senior the person that sends a message or delegates a task, the more likely that the message and/or the task should be assigned a high priority. In one embodiment, an exception to this rule may be when the message is sent to a distribution list. In that case, in one embodiment, the apparent priority of the message may not be higher, but rather lower.

In another embodiment, the virtual personal assistant may automatically allocate time for a user to work on received messages (e.g. in an inbox, etc.), based on a past experience of processing messages, as well as the actual content of the inbox and/or the number of new messages present. In one embodiment, the virtual personal assistant may determine how long it should take to read and deal with each message. Using this information, the virtual personal assistant may determine a total time to process the messages. As an option, the determined time may be scheduled in the calendar to allow processing of the messages.

In one embodiment, the virtual personal assistant may allow templates to be utilized for rule definition, importance determination, scheduling determination, and other information. For example, the templates may include a time management template including rules. As another example, the templates may be based on existing time management systems (e.g. a getting things done [GTD] system, a Franklin Covey system, etc.). As another example, the templates may include templates for specific professions including project managers, engineers, attorneys, doctors, nurses, accountants, and/or various other professions. Similarly, the templates may include templates for specific hierarchies within organizations including CEO, CFO, project manager, etc.

In one embodiment, the specific profession templates may include general scheduling rules and definitions specific to that profession. For example, an attorney template may include a rule indicating that a court appearance is a higher priority than a client meeting, such that the two activities may be scheduled appropriately. Similarly, a doctor template may include a rule indicating that a heart surgery has a higher priority than a routine check-up, etc. Of course, as noted above, any number of rules may be implicitly or explicitly defined for determining importance and/or a hierarchy of tasks and/or messages.

Figure 13:
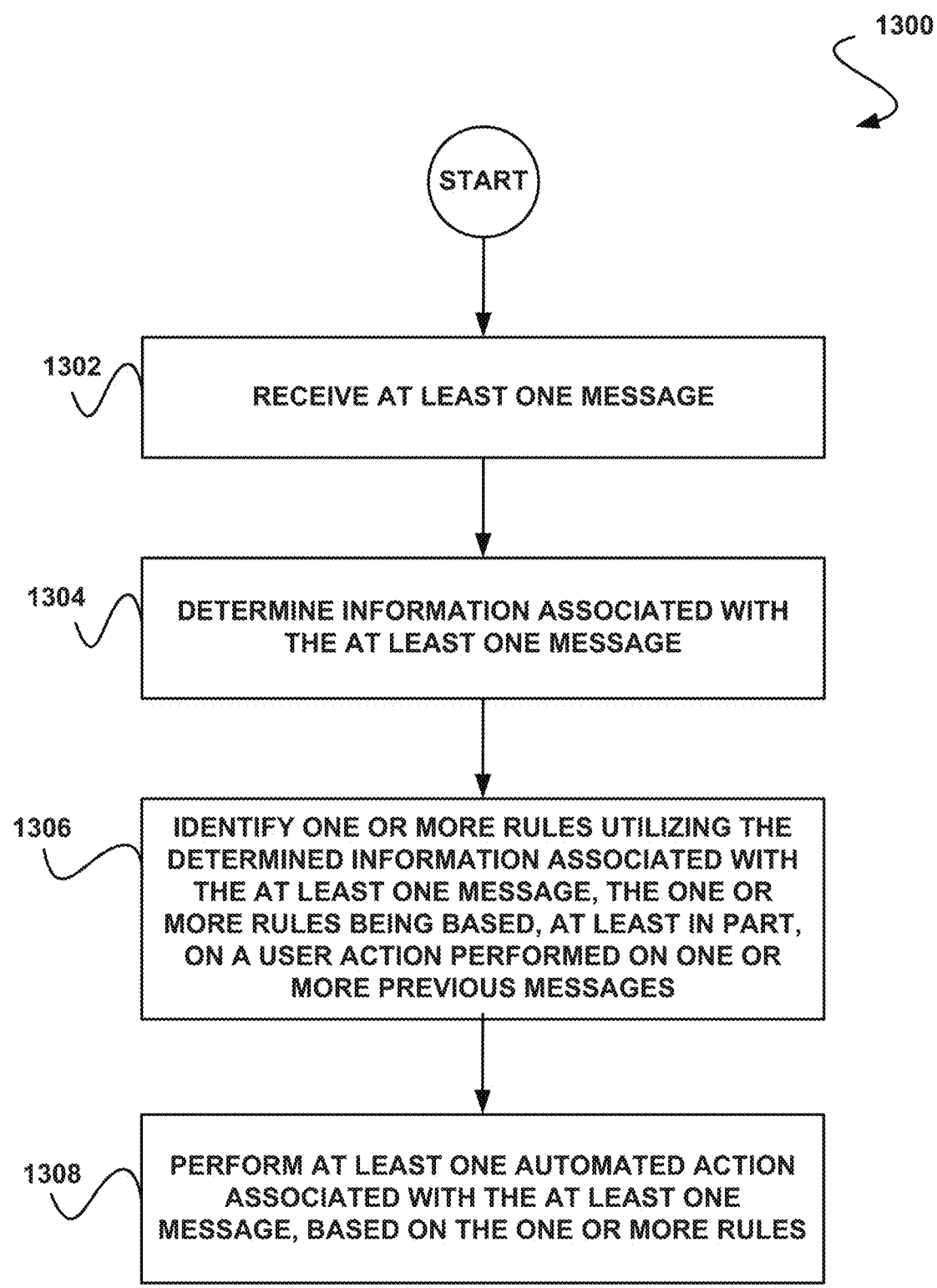
FIG. 13 shows a method for performing rule-based actions on messages, in accordance with another embodiment.

FIG. 13 shows a method 1300 for performing rule-based actions on messages, in accordance with another embodiment. As an option, the method 1300 may be implemented in the context of the architecture and environment of FIGS. 1-12 or any subsequent Figure(s). Of course, however, the method 1300 may be carried out in any desired environment. It should also be noted that the aforementioned definitions may apply during the present description.

As shown, at least one message is received. See operation 1302. Further, information associated with the at least one message is determined. See operation 1304. Additionally, one or more rules are identified utilizing the determined information associated with the at least one message, the one or more rules being based, at least in part, on a user action performed on one or more previous messages. See operation 1306. Still yet, at least one automated action associated with the at least one message is performed, based on the one or more rules. See operation 1308.

In various embodiments, the message may include an email, a text message, a phone message, on-line posted message, and/or any other type of message. Furthermore, the automated action may include any action associated with the at least one message. For example, in one embodiment, performing the at least one automated action associated with the at least one message may include storing the at least one message in a folder. In various embodiments, the folder may include a low priority folder, a medium priority folder, a normal priority folder, a high priority folder, a user created mail folder, a deleted folder, and/or any other type of folder. Of course, any automated action may be utilized, such as forwarding the message to other entities, distributing the message to the user in a multi-modal fashion (e.g. via email, text, phone, etc.), initiating an automatic reply, triggering a workflow, etc.

Further, the information associated with the message may include any information associated with the message. For example, in one embodiment, the information associated with the message may include header information associated with the message. In various embodiments, the header information may include size information, sender information, domain name information, origin location information, IP address information, recipient information, priority and importance information, and/or any other information capable of being included in a header.

In another embodiment, the information associated with the message may include information extracted from a body of the message. In various embodiments, the information extracted from the body of the message may include keywords, phrases, names, importance information, location information, time frame information, deadline information, resource information, objective information, and/or any other information capable of being included in the body of the message. In another embodiment, the information associated with the message may include initial information associated with the message. In yet another embodiment, the information may include sender signature information.

Further, the rules identified utilizing the determined information may include any user defined, default, and/or user action inferred rule. For example, in one embodiment, the one or more rules may be generated based on the user action performed on the one or more previous messages. The user action performed on the previous messages may include any user action. For example, in one embodiment, the user action performed on the previous messages may include moving the one or more previous messages to a folder.

In another embodiment, the user action performed on the one or more previous messages may include deleting the one or more previous messages. In another embodiment, the user action performed on the one or more previous messages may include responding to the one or more previous messages. In yet another embodiment, the user action performed on the one or more previous messages may include responding to the one or more previous messages within a predetermined period of time. For example, a user may have responded to a message from a particular sender or with a particular subject very rapidly. This may be an indication that messages associated with the sender or the subject is a priority to the user.

However, in another embodiment, the user action performed on the one or more previous messages may include never responding to the one or more previous messages. For example, a user may not have responded to a message from a particular sender or with a particular subject for a long period of time. This may be an indication that messages associated with the sender or the subject is a not priority (or a low priority) to the user. Accordingly, in one embodiment, the automated action associated with the at least one message may include assigning a priority to such messages and/or prioritizing or grouping the messages based on the automatically established priority.

In various embodiments, the automated action may be initiated automatically and/or may be user initiated. For example, in one embodiment, performing of the at least one automated action may be initiated by a user via a tool bar. As an option, the tool bar may include a tool bar associated with a message application (e.g. an instant message application, an email application, etc.). In another embodiment, the performing of the at least one automated action may be capable of being initiated by a user utilizing a mouse. For example, in one embodiment, a right click of the mouse may display at least one action option to the user. In this case, the user may have the ability to select the at least one action option to initiate the automatic action.

More illustrative information will now be set forth regarding various optional architectures and features with which the foregoing techniques discussed in the context of any of the present or previous figure(s) may or may not be implemented, per the desires of the user. For instance, various optional examples and/or options associated with the message of operation 1302, the determining of operation 1304, the identifying of operation 1306, the performing of operation 1308, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 14:
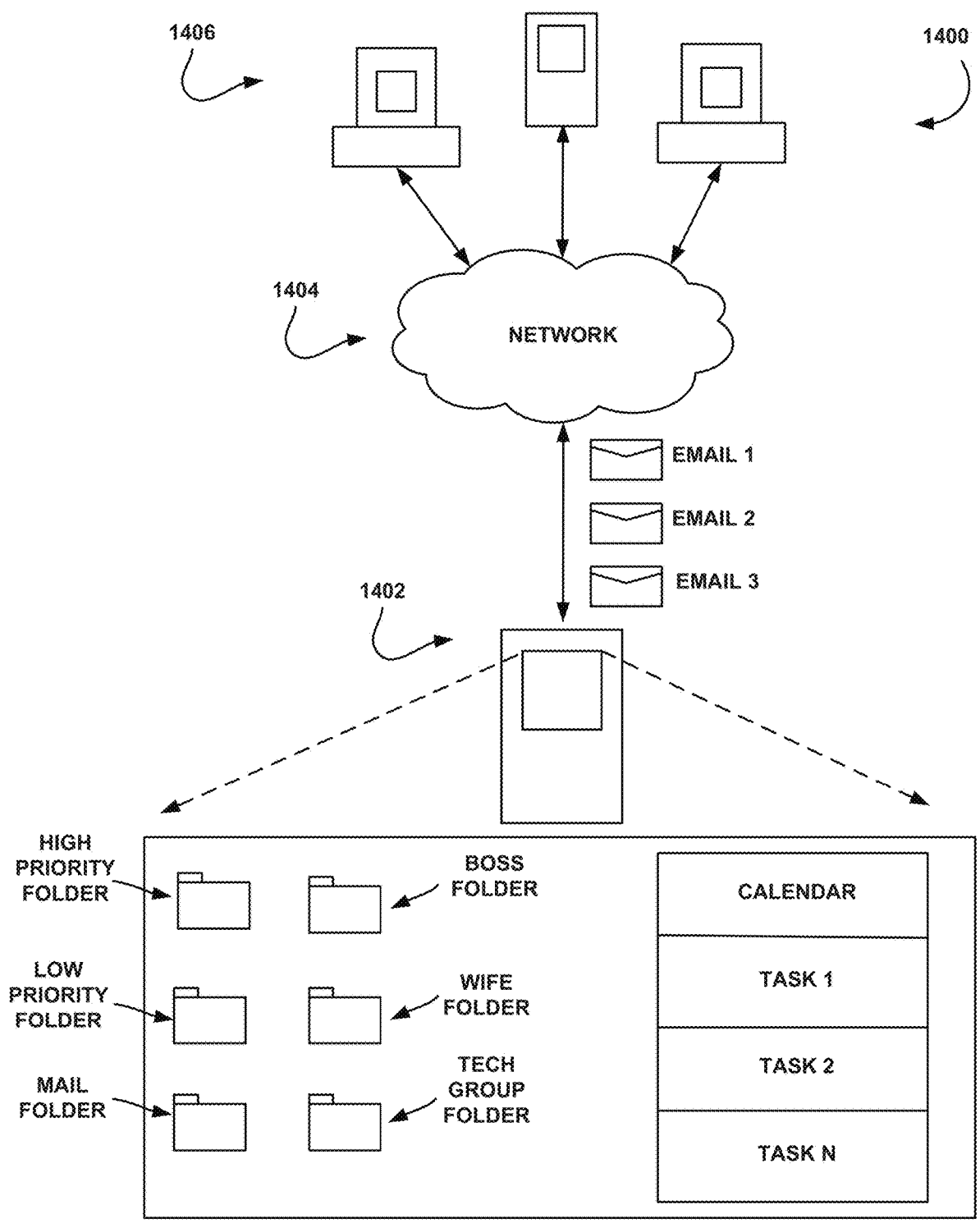
FIG. 14 shows a system for performing rule-based actions on messages, in accordance with another embodiment.

FIG. 14 shows a system 1400 for performing rule-based actions on messages, in accordance with another embodiment. As an option, the system 1400 may be implemented in the context of the architecture and environment of FIGS. 1-13 or any subsequent Figure(s). Of course, however, the system 1400 may be implemented in any desired environment. It should also be noted that the aforementioned definitions may apply during the present description.

As shown, a user device 1402 is provided. The user device 1402 may be capable of communicating with multiple other devices 1406 over one or more networks 1404. Furthermore, the user device 1402 and the devices 1406 may be capable of communicating with one or more online databases. The user device 1402 and the devices 1406 may include any type of device including a mobile device (e.g. a mobile phone, a PDA, a laptop computer, a handheld computer, a tablet computer, etc.) or a desktop device (e.g. a television, a computer, etc.).

The user device 1402 and/or an application associated therewith may be capable of receiving messages, analyzing messages, prioritizing messages, categorizing messages, and/or assigning time for processing messages in a calendar. In operation, the user device 1402 may receive one or more messages (e.g. emails, instant messages, text messages, etc.). In one embodiment, a software engine may then analyze the messages to determine a priority or an importance level associated with the messages. In another embodiment, the software engine may analyze the messages to determine a proper category for the messages.

In another embodiment, the messages may be categorized into folders. For example, in one embodiment, received messages may be analyzed and automatically placed in one or more folders based on one or rules. In another embodiment, categorizing options may be capable of being automatically displayed to a user. For example, recommended folder options may be displayed on a toolbar (e.g. a fixed toolbar, a floating toolbar, etc.), base on an analysis of one or more messages. In another embodiment, recommended folder options may be displayed to a user upon scrolling over a message with a pointer (or finger on a touch screen, etc.) or by right clicking on the message. In another embodiment, recommended folder options may be displayed in a window, upon analysis of the message.

In another embodiment, the software engine may group the messages according to a category (e.g. a subject, etc.) and a priority. For example, the one or more messages with the same subject may be received. These messages may be prioritized based on content, and/or additional information (e.g. time received, sender information, receiver information, etc.). The messages with a higher priority may then be displayed or presented in a prioritized manner (e.g. highest priority first, etc.).

It should be noted that, in the present embodiment (as well as with all of the others disclosed herein), any application search function/tool used to identify messages, task, calendar items, contacts, etc. may allow a user to search based on any of the criteria otherwise utilized (e.g. for performing automated functions, etc.). Thus, any information/feedback that is manually inputted/automatically generated may also be utilized as searchable metadata that can be used to more effectively search for desired messages, task, calendar items, contacts, etc. Just by way of example, any prioritization that is inferred/inputted in connection with messages may be used in the context of a search, in order to find all messages with a certain desired priority. Of course, such search function/tool may include any desired mechanism for searching including, but not limited to a sorting tool adapted for sorting objects based on the aforementioned criteria for searching purposes, a tool for entering criteria via a field or menu option(s) for the purpose of outputting objects that meet such criteria, etc.

Figure 15:
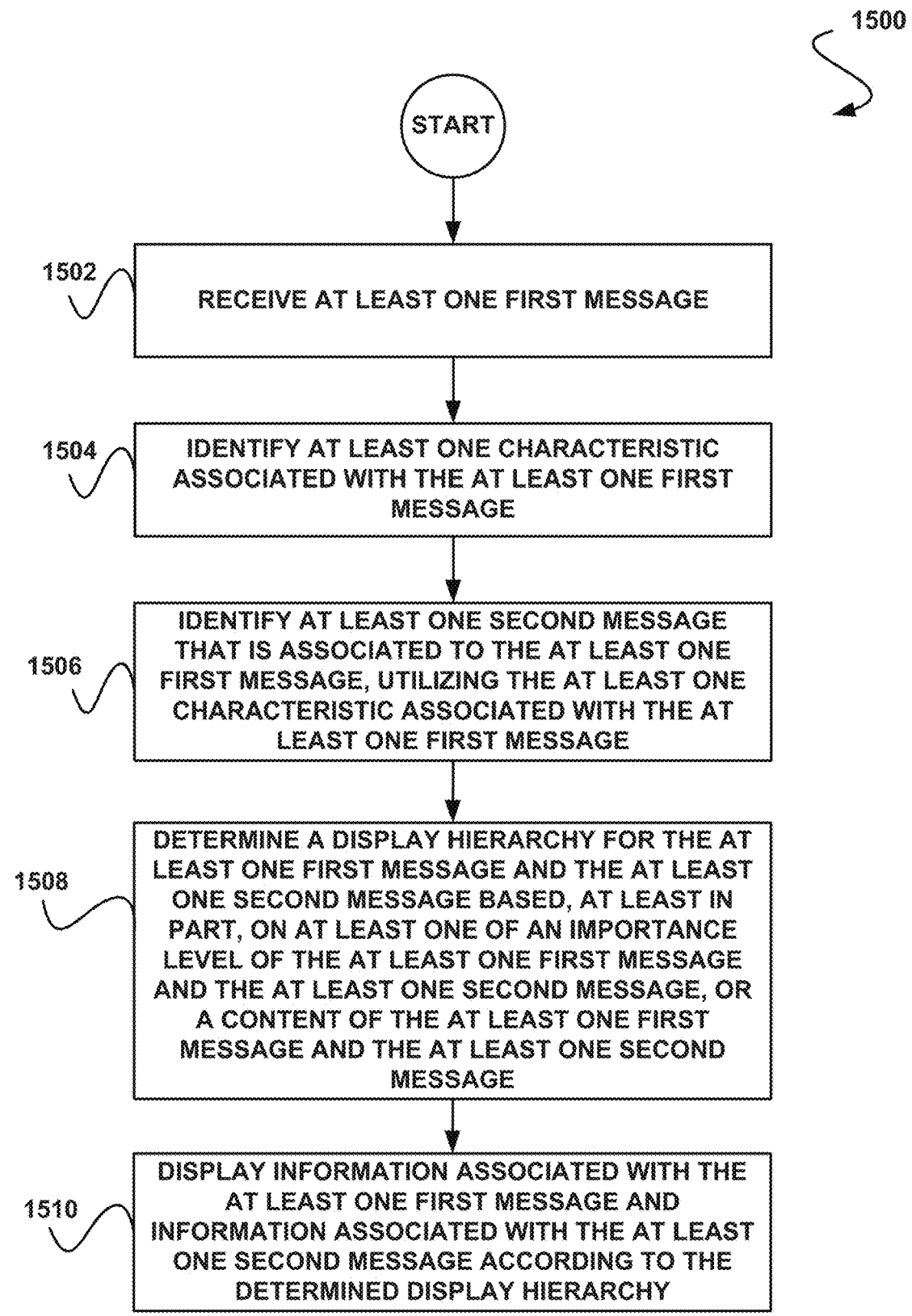
FIG. 15 shows a method for displaying information associated with a message according to a determined display hierarchy, in accordance with another embodiment.

FIG. 15 shows a method 1500 for displaying information associated with a message according to a determined display hierarchy, in accordance with another embodiment. As an option, the method 1500 may be implemented in the context of the architecture and environment of FIGS. 1-14 or any subsequent Figure(s). Of course, however, the method 1500 may be carried out in any desired environment. It should also be noted that the aforementioned definitions may apply during the present description.

As shown, at least one first message is received. See operation 1502. The message may include any type of message, such as an email, a text message, an instant message, a phone message, on-line post, etc.

Additionally, at least one characteristic associated with the at least one first message is identified. See operation 1504. Further, at least one second message that is associated with the at least one first message is identified, utilizing the at least one characteristic associated with the at least one first message. See operation 1506. The characteristic associated with the first message may include any characteristic associated with a message. For example, in various embodiments, the characteristic associated with the first message may include a subject of the first message, a subject header associated with the first message, at least one keyword associated with the first message, a sender of the first message, a priority of the first message, one or more words included in the first message, a subject, and/or various other characteristics (e.g. the fact that they are in the same thread, one message includes the other, etc.).

The second message may include any message associated with the first message. For example, in one embodiment, the at least one second message may include at least one previously received message such that the previously received message is received prior to receiving the at least one first message. In another embodiment, the second message may include a more recent message than the first message.

In one embodiment, identifying the second message that is associated with the first message, utilizing the at least one characteristic associated with the first message, may include comparing the characteristic associated with the first message with data associated with the second message. For example, in one embodiment, a subject header of the first message may be compared to a subject header of the second message. In another embodiment, one or more keywords of the first message may be compared to one or more keywords of the second message. In another embodiment, sender information of the first message may be compared to sender information of the second message.

As shown further, a display hierarchy for the first message and the second message is determined based, at least in part, on at least one of an importance level of the first message and the second message, or a content of the first message and the a second message. See operation 1508. Furthermore, information associated with the first message and information associated with the second message is displayed according to the determined display hierarchy. See operation 1510.

In one embodiment, determining the display hierarchy for the first message and the second message may be based on the importance level of the first message and the second message and the content of the first message and the second message. Additionally, in one embodiment, the importance level of the first message and the second message may be indicated by the first message and the second message. For example, in one embodiment, the first message and/or the second message may include a priority or importance indicator. In another embodiment, the first message and/or the second message may include one or more words indicative of priority or importance. For example, the importance level of the first message and the second message may be determined by the content of the first message and/or the second message. The display hierarchy may determine an order to display the information associated with the first message and information associated with the second message.

More illustrative information will now be set forth regarding various optional architectures and features with which the foregoing techniques discussed in the context of any of the present or previous figure(s) may or may not be implemented, per the desires of the user. For instance, various optional examples and/or options associated with the message of operation 1502, the identifying of operation 1504, the identifying of operation 1506, the determining of operation 1508, the displaying of operation 1510, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 16:
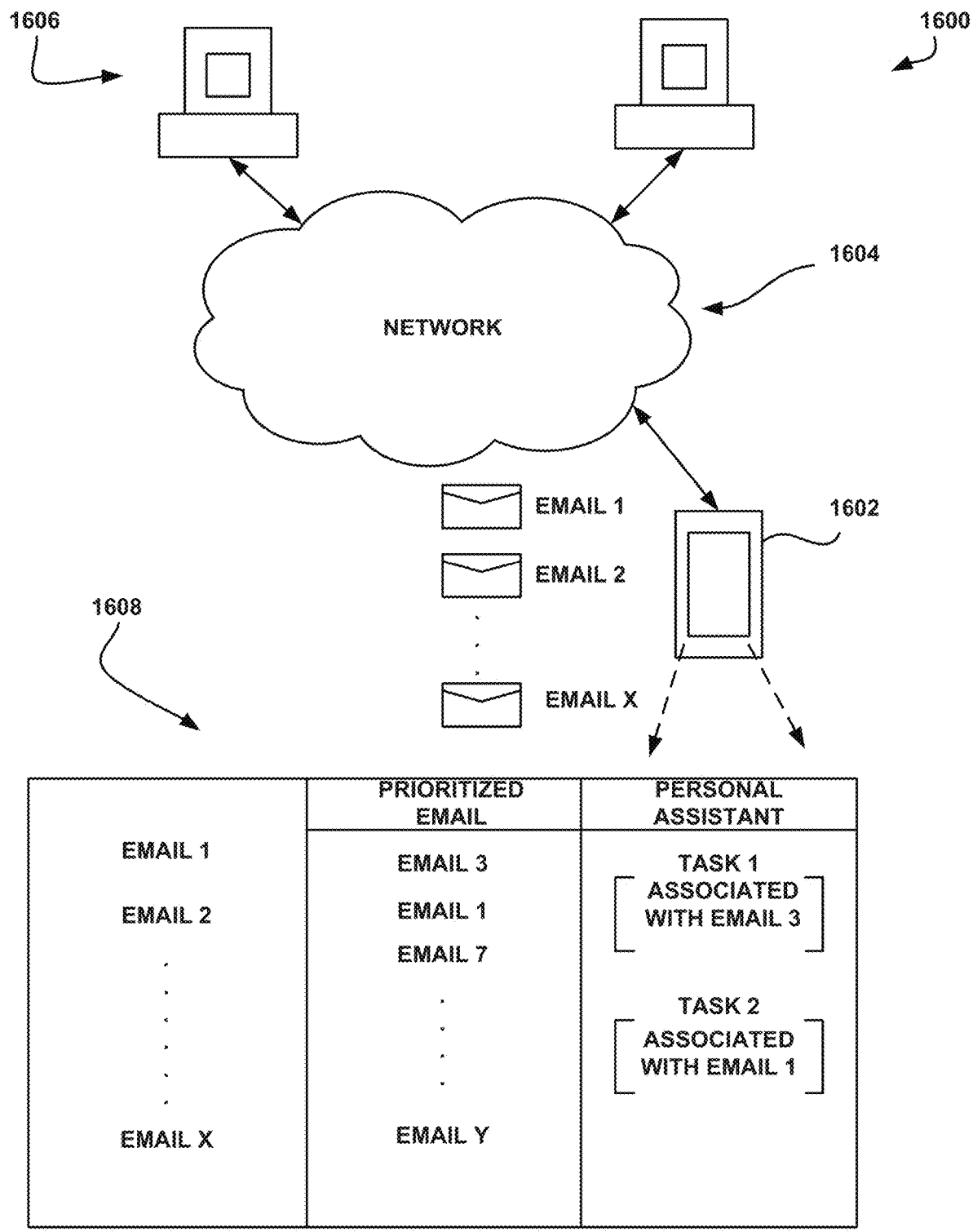
FIG. 16 shows a system for displaying information associated with a message according to a determined display hierarchy, in accordance with another embodiment.

FIG. 16 shows a system 1600 for displaying information associated with a message according to a determined display hierarchy, in accordance with another embodiment. As an option, the system 1600 may be implemented in the context of the architecture and environment of FIGS. 1-15 or any subsequent Figure(s). Of course, however, the system 1600 may be implemented in any desired environment. It should also be noted that the aforementioned definitions may apply during the present description.

As shown, a user device 1602 is provided. The user device 1602 may be capable of communicating with multiple other devices 1606 over one or more networks 1604. Furthermore, the user device 1602 and the devices 1606 may be capable of communicating with one or more online databases. The user device 1602 and the devices 1606 may include any type of device including a mobile device (e.g. a mobile phone, a PDA, a laptop computer, a handheld computer, a tablet computer, etc.) or a desktop device (e.g. a television, a computer, etc.).

The user device 1602 and/or an application associated therewith may be capable of receiving messages, analyzing messages, prioritizing messages, categorizing messages, and/or assigning time for processing messages in a calendar. In operation, the user device 1602 may receive one or more messages (e.g. emails, instant messages, text messages, etc.). In one embodiment, a software engine may then analyze the messages to determine a priority or an importance level associated with the messages. In another embodiment, the software engine may analyze the messages to determine a proper category for the messages.

In one embodiment, the software engine may group the messages according to a category (e.g. a subject, etc.) and a priority. For example, the one or more messages with the same subject may be received. These messages may be prioritized based on content, and/or additional information (e.g. time received, sender information, receiver information, etc.). The messages with a higher priority may then be displayed or presented in a prioritized manner (e.g. highest priority first, etc.).

In one embodiment, two or more messages associated with the same subject, sender, or other characteristic may be received at the user device 1602. These messages may then be analyzed by the software engine to determine an importance level of a particular message, based on content, an explicit priority indication, an implicit priority, and/or various other characteristics. The software engine may then determine a display hierarchy for the message based on the importance level and/or the content of the messages.

Furthermore, information associated with the messages may be displayed according to the determined display hierarchy (e.g. on an interface 1608, etc.). In various embodiments, the information associated with the messages that may be displayed may include a sender name, a sender address or phone number, one or more recipient names, one or more recipient addresses or phone numbers, a date and/or time sent, a date and/or time received, a subject associated with the message, a priority associated with the message, a size of the message, an indication of an attachment associated with the message, an indication of a task or meeting request associated with the message, and/or any other information associated with the message.

Figure 17:
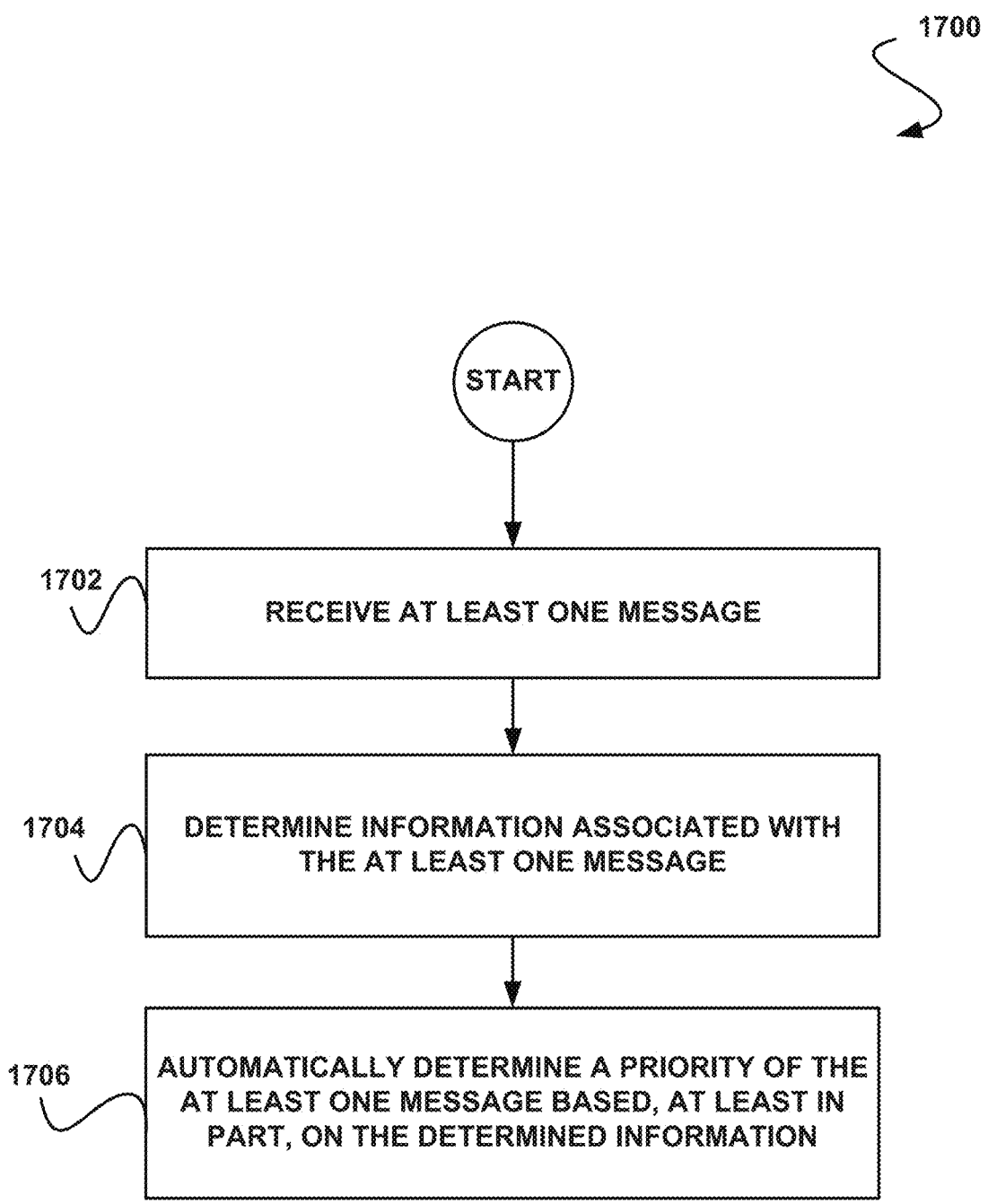
FIG. 17 shows a method for prioritizing messages, in accordance with another embodiment.

FIG. 17 shows a method 1700 for prioritizing messages, in accordance with another embodiment. As an option, the method 1700 may be implemented in the context of the architecture and environment of FIGS. 1-16 or any subsequent Figure(s). Of course, however, the method 1700 may be carried out in any desired environment. It should also be noted that the aforementioned definitions may apply during the present description.

As shown, at least one message is received. See operation 1702. Further, information associated with the at least one message is determined. See operation 1704. The information associated with the message may include any information, such as a sender of the message, message content, keywords in the message, an explicit priority indicator associated with the message, a subject of the message, a time associated with the message, a geographical origin associated with the message, header information associated with the message, information extracted from a body of the message, and/or any other information associated with the message. A priority of the at least one message is automatically determined based, at least in part, on the determined information. See operation 1706.

In one embodiment, the determined information may include a sender of the message. As an option, the priority of the message may be determined based on the sender of the message. For example, an organizational structure may be utilized to determine a priority to associate with individuals in an organization. In this case, individuals higher in the organizational hierarchy may be associated with higher priority messages. In other words, the priority of the message may increase as a sender rank in the organizational hierarchy increases. Similarly, the priority of the message may decrease as a sender rank in the organizational hierarchy decreases.

In one embodiment, the priority of the message may be determined based on a hierarchy list. As noted above, the hierarchy list may include an organization hierarchy list. In other embodiments, the hierarchy list may include a user defined hierarchy list, or a hierarchy list automatically generated based on user action (e.g. based on a user responding to certain messages and not others, etc.). In one embodiment, the automatically generated hierarchy list may be capable of being modified by the user.

In one embodiment, the priority of the message may be determined based on comparing the determined information associated with the message to list information associated with the hierarchy list. For example, the determined information may include sender information and the sender information may be compared to the list information to determine a priority. In another embodiment, the determined information may include subject matter information. In this case, the subject matter information may be compared to a hierarchical list of subjects to determine a priority. Of course, any information associated with the message may be determined and compared to a manually defined or automatically defined hierarchy list.

In another embodiment, the message may be placed in, or moved to, a folder, based on the determined priority. In one embodiment, the folder may include one of a low priority folder, a normal priority folder, or a high priority folder. In another embodiment, the folder may include a user created mail folder.

In one embodiment, determining the information associated with the message may include determining whether the message was sent to a plurality of recipients. As an option, if it is determined that the at least one message was sent to a plurality of recipients, it may be determine that the message is a low priority. In this way, messages sent to distribution lists, irrespective of the sender, may be allocated a lower priority. Of course, any number of rules may be adjusted for specific circumstances.

Further, in one embodiment, it may be determine whether the message is associated with an objective. If the message is associated with an objective, in one embodiment, an importance level may be assigned to the objective, based on the determined priority. Additionally, in one embodiment, at least one period of time may be allocated, in a calendar, for performing the objective.

More illustrative information will now be set forth regarding various optional architectures and features with which the foregoing techniques discussed in the context of any of the present or previous figure(s) may or may not be implemented, per the desires of the user. For instance, various optional examples and/or options associated with the message of operation 1702, the determining of operation 1704, the determining of operation 1706, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 18:
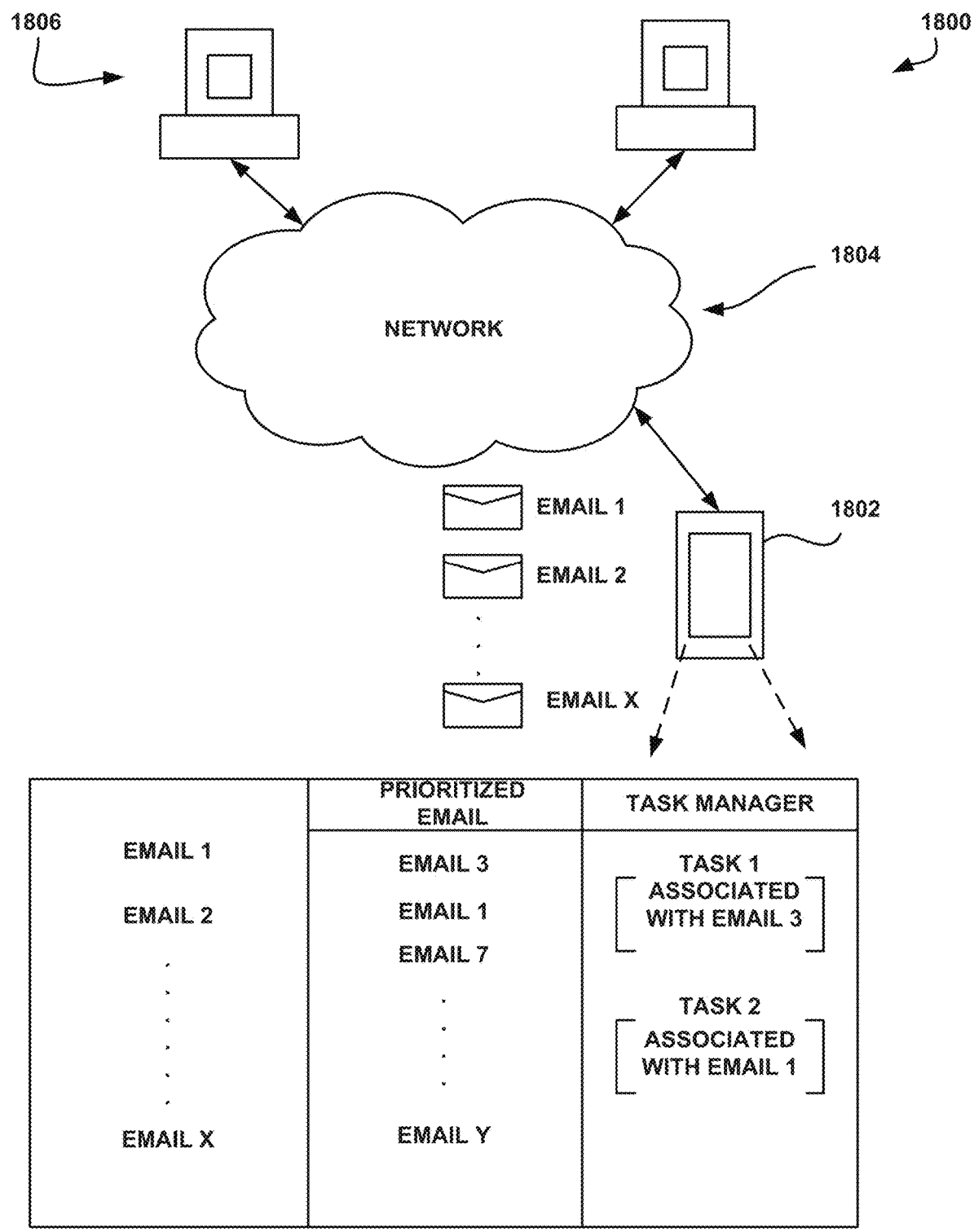
FIG. 18 shows a system for prioritizing messages, in accordance with another embodiment.

FIG. 18 shows a system 1800 for prioritizing messages, in accordance with another embodiment. As an option, the system 1800 may be implemented in the context of the architecture and environment of FIGS. 1-17 or any subsequent Figure(s). Of course, however, the system 1800 may be implemented in any desired environment. It should also be noted that the aforementioned definitions may apply during the present description.

As shown, a user device 1802 is provided. The user device 1802 may be capable of communicating with multiple other devices 1806 over one or more networks 1804. Furthermore, the user device 1802 and the devices 1806 may be capable of communicating with one or more online databases. The user device 1802 and the devices 1806 may include any type of device including a mobile device (e.g. a mobile phone, a PDA, a laptop computer, a handheld computer, a tablet computer, etc.) or a desktop device (e.g. a television, a computer, etc.).

The user device 1802 and/or an application associated therewith may be capable of receiving messages, analyzing messages, prioritizing messages, categorizing messages, and/or assigning time for processing messages in a calendar. In operation, the user device 1802 may receive one or more messages (e.g. emails, instant messages, text messages, etc.).

In one embodiment, a software engine may then analyze the messages to determine a priority or an importance level associated with the messages. For example, the software engine may determine information associated with a message. The information associated with the message may include any information, such as a sender of the message, message content, keywords in the message, an explicit priority indicator associated with the message, a subject of the message, a time associated with the message, a geographical origin associated with the message, header information associated with the message, information extracted from a body of the message, and/or any other information associated with the message.

Using at least some of this information, a priority of the at least one message may be automatically determined. In various embodiments, the determined priority may be utilized to display the messages in order of priority, route messages to folders, schedule tasks, and/or implement various other actions described herein. For example, in one embodiment, a message associated with a task may be received, the message and/or the task may be prioritized, and time to complete the task may automatically be scheduled in a calendar associated with a user. Furthermore, alerts, reminders, and suggestions, etc. may be capable of being displayed to the user. In one embodiment, the user may have the ability to provide information associated with the completion and/or scheduling of the task as a feedback mechanism to the software engine.

In various embodiments, the prioritization may be displayed in a special "viewing pane" that may replace a conventional time-of-receipt-ordered list of messages, as a function of a "view selection" or the like. In other embodiments, the prioritized list of messages may be displayed in a special "viewing pane" that may be displayed simultaneously with the conventional time-of-receipt-ordered list of messages (e.g. in a side-by-side manner or the like, etc.). In still additional embodiments, the prioritization may not necessarily result in a re-ordering of a list of the messages, but rather simply some sort of other annotation (e.g. flagged, color-coded, forwarded via a different protocol such as SMS or voice, etc.).

Still yet, in one embodiment, the prioritized list of messages may include only a subset of all messages (e.g. unopened messages, messages that have been received since a predetermined time/date such as the last execution of a message application or a predetermined time/date, messages related to a particular subject such as work, etc.), as a function of a manual selection or an automated algorithm. In various embodiments, the aforementioned predetermined time/date may be a single day (e.g. a current day, etc.) or selected timeframe, etc.

In still additional embodiments, the prioritization may be applied separately against different spans of time. For example, a current day may be prioritized and presented, separate from the prioritization of a previous day, and so forth. In such case, messages received during a present day may be reordered in a first re-ordered/prioritized group, messages received during a previous day may be reordered in a second group of messages where the second group is listed after the first group, messages received the day before yesterday may be reordered in a third group of messages where the third group is listed after the second group, and so forth.

Of course, such prioritization may also be provided as a function of any other criteria (e.g. a time of day, a device with which messages are being viewed/accessed, a protocol with which the message was received (e.g. SMS vs. email vs. voice mail, etc.), a status of the user (e.g. on vacation, in a meeting, etc.), etc.

Figure 19:
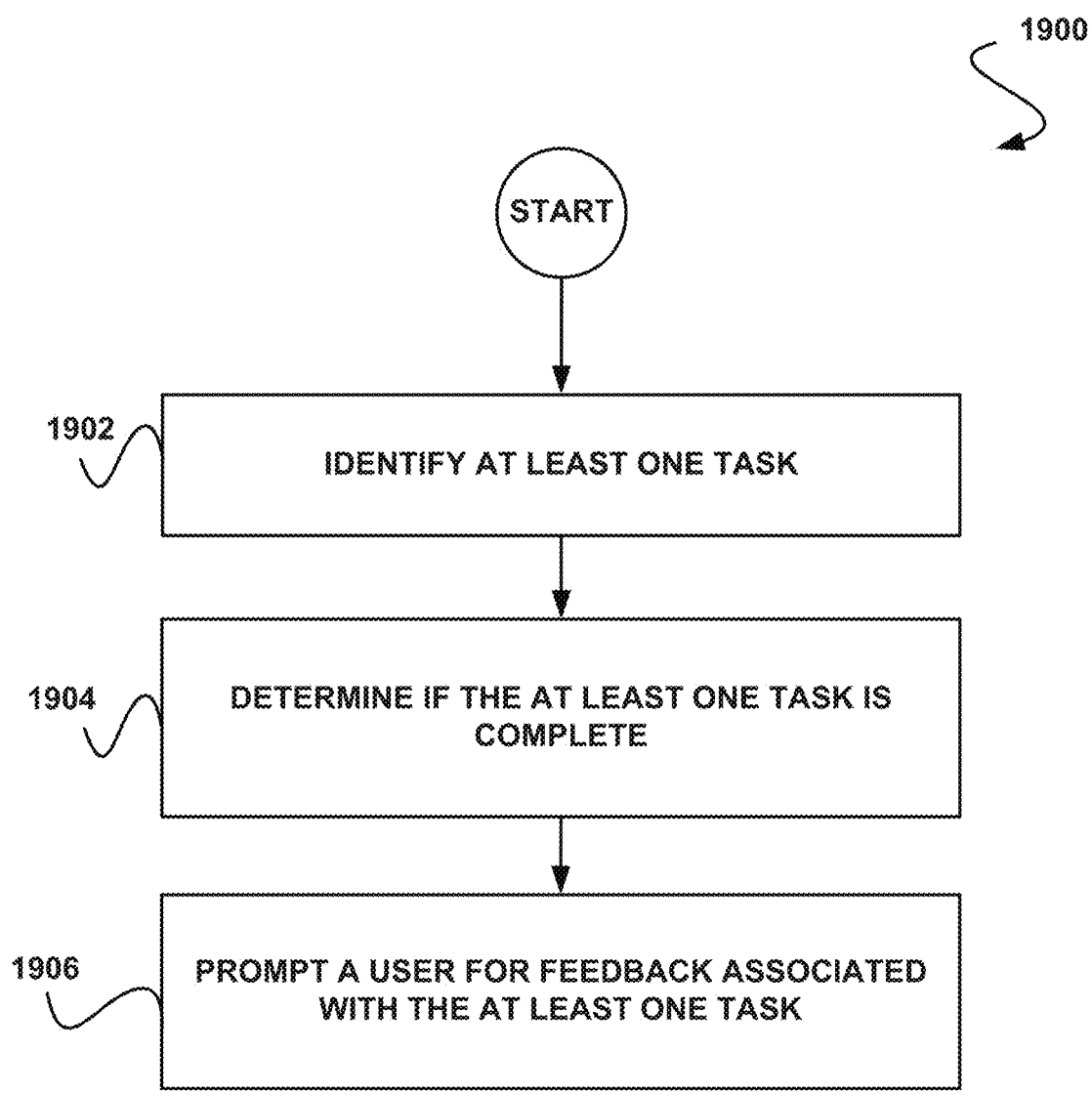
FIG. 19 shows a method for prompting a user for feedback associated with a task, in accordance with another embodiment.

FIG. 19 shows a method 1900 for prompting a user for feedback associated with a task, in accordance with another embodiment. As an option, the method 1900 may be implemented in the context of the architecture and environment of FIGS. 1-18 or any subsequent Figure(s). Of course, however, the method 1900 may be carried out in any desired environment. It should also be noted that the aforementioned definitions may apply during the present description.

As shown, at least one task is identified. See operation 1902. In various embodiments, the task may be identified in a message, defined by a user, identified in a calendar, inferred from text, and/or otherwise identified.

Further, it is determined if the at least one task is complete. See operation 1904. In one embodiment, determining if the task is complete may include receiving user input indicating the task is complete. In another embodiment, determining the task is complete may include receiving a message indicating the task is complete.

In another embodiment, determining the task is complete may include automatically monitoring the task and automatically identifying a completion of the task based on the monitoring. In another embodiment, identifying completion of the task may include identifying completion of the task based on an expiration of a deadline or completion time frame associated with the task. In another embodiment, identifying the completion of the task may include identifying the beginning of another task that is indicative of a completion of the original task.

As shown further, a user is prompted for feedback associated with the at least one task. See operation 1906. The user may be prompted for feedback in a variety of ways.

For example, in one embodiment, the user may be prompted for feedback utilizing one or more windows. In another embodiment, the user may be prompted for feedback utilizing an audio prompt. In another embodiment, a user may be prompted for feedback utilizing one or more pop-ups (e.g. a pop-up dialog box, window, etc.). In another embodiment, a user may be prompted for feedback utilizing a message (e.g. an email, a text message, etc.). In another embodiment, a user may be prompted for feedback utilizing a toolbar.

In one embodiment, computer code associated with a virtual personal assistant may prompt the user for feedback associated with the task. As an option, the virtual personal assistant code may prompt the user for feedback associated with the task utilizing one or more questions associated with a scheduling of the task. For example, the prompt may include asking a user whether the user had enough time scheduled to perform a scheduled task. As another example, the prompt may include asking a user whether the user was happy with the time frame scheduled. As another example, the prompt may include asking a user to provide information as to how to better schedule the task.

In another embodiment, the virtual personal assistant code may prompt the user for feedback associated with the task utilizing one or more questions associated with a completion time of the task. For example, the prompt may include asking a user whether the completion time was adequate to perform a scheduled task. As another example, the prompt may include asking a user whether the user needs additional time to perform a scheduled task.

In another embodiment, the virtual personal assistant code may prompt the user for feedback associated with the at least one task utilizing one or more questions associated with the at least one task. For example, the prompt may include asking a user whether the user enjoyed completing the task. As another example, the prompt may include asking a user whether the user whether the task should have been delegated to a different person. As another example, the prompt may include asking a user whether the user how the user feels the task was completed (e.g. poorly, well, extraordinarily well, etc.).

In another embodiment, the virtual personal assistant code may prompt the user for feedback associated with the task utilizing one or more questions associated with at least one assumption associated with the one task. For example, the prompt may include asking a user whether a priority assumption associated with the task was accurate. As another example, the prompt may include asking a user whether a deadline assumption associated with the task was accurate. As another example, the prompt may include asking a user whether an estimated completion time associated with the task was accurate.

The virtual personal assistant code may prompt the user in a variety of ways. For example, in various embodiments, the virtual personal assistant code may include a pop-up dialog box, a window, an animation, audio capability, a toolbar, and/or any other capability for prompting a user and receiving a user response. Furthermore, in various embodiments, the prompt associated with the virtual personal assistant (and/or the virtual personal assistant itself) may be capable of being minimized, closed, and/or presented for a predetermined amount of time. In one embodiment, the predetermined amount of time may be modified, based on user interaction.

Further, in one embodiment, the virtual personal assistant code may be operable to allocate time for completion of the task, based on previous user action. In another embodiment, the virtual personal assistant may be operable to allocate time for completion of the one task, based on a response to the prompting. In one embodiment, at least one aspect of the prompting may be based, at least in part, on previous user action. In another embodiment, the at least one aspect of the prompting may be based, at least in part, on an amount of questions previously answered by the user. In yet another embodiment, the at least one aspect of the prompting may be based, at least in part, on a type of questions previously answered by the user.

More illustrative information will now be set forth regarding various optional architectures and features with which the foregoing techniques discussed in the context of any of the present or previous figure(s) may or may not be implemented, per the desires of the user. For instance, various optional examples and/or options associated with the task of operation 1902, the determining of operation 1904, the prompting of operation 1906, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 20:
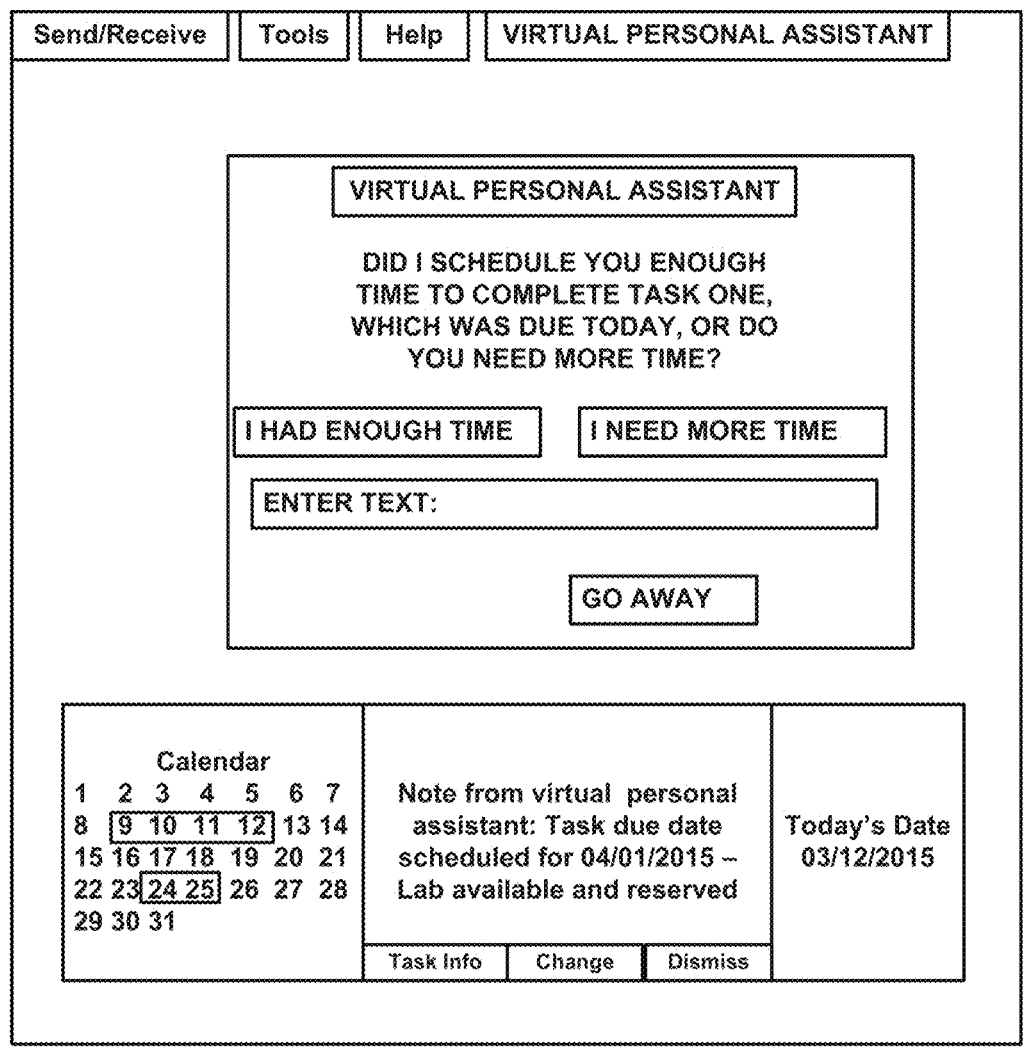
FIG. 20 shows an interface for prompting a user for feedback associated with a task, in accordance with another embodiment.

FIG. 20 shows an interface 2000 for prompting a user for feedback associated with a task, in accordance with another embodiment. As an option, the interface 2000 may be implemented in the context of the architecture and environment of FIGS. 1-19 or any subsequent Figure(s). Of course, however, the interface 2000 may be implemented in any desired environment. It should also be noted that the aforementioned definitions may apply during the present description.

In operation, the interface 2000 may be utilized to prompt a user for feedback associated with a variety of automated operations, including task scheduling, task prioritization, message prioritization, the grouping of messages, the placement of messages and/or any other questions related to objectives, messages, time, and calendar items, etc. The user may be prompted utilizing a variety of techniques, as described with reference to some of the preceding figures. Furthermore, in various embodiments, the user may have the ability to respond to the prompt by entering text, selecting a one click button, selecting from a list (e.g. a drop down list, etc.), using an audible input, and/other any other response technique.

In one embodiment, the interface 2000, or portions of the interface 2000, may be associated with a virtual personal assistant module. For example, a virtual personal assistant module may include computer code for prompting the user. In one embodiment, the virtual personal assistant or computer code associated therewith, may include additional functionality (e.g. some functionality described herein, etc.).

In one embodiment, the virtual personal assistant module may include computer code capable of causing the virtual personal assistant to display recommendations to a user, based on acquired knowledge and intelligence. For example, when a person returns from an activity (e.g. a personal activity, etc.), the virtual personal assistant may ask the user to what degree did the user enjoy the vacation (i.e. to what degree such an activity bring the user satisfaction, etc.). If the activity gave the user satisfaction, the virtual personal assistant may ask the user whether the user should engage in that activity again, if the user had not done so after a predetermined period of time. Of course, the prompt could be for any leisure activity or work activity.

In another embodiment, the virtual personal assistant may calibrate a level of interactivity, bases on user response (e.g. in order not to pester the user, etc.). For example, rather than using pre-defined or fixed policies for prompting a user, the virtual personal assistant may automatically adjust to the user preference and determine the level of interactivity, taking cues from the user. For instance, the user might scoff at a message explicitly (e.g. by clicking "go away," etc.) or implicitly (e.g. by disregarding, minimizing, putting another window in front of the virtual personal assistant, closing the dialog box/window/pop-up/balloon, etc.).

In another embodiment, the virtual personal assistant may be utilized to route incoming communications based on user availability. For example, email messages, text messages, phone calls (e.g. VoIP calls, etc.), or any other incoming communication may be routed, based on user availability.

Figure 21:
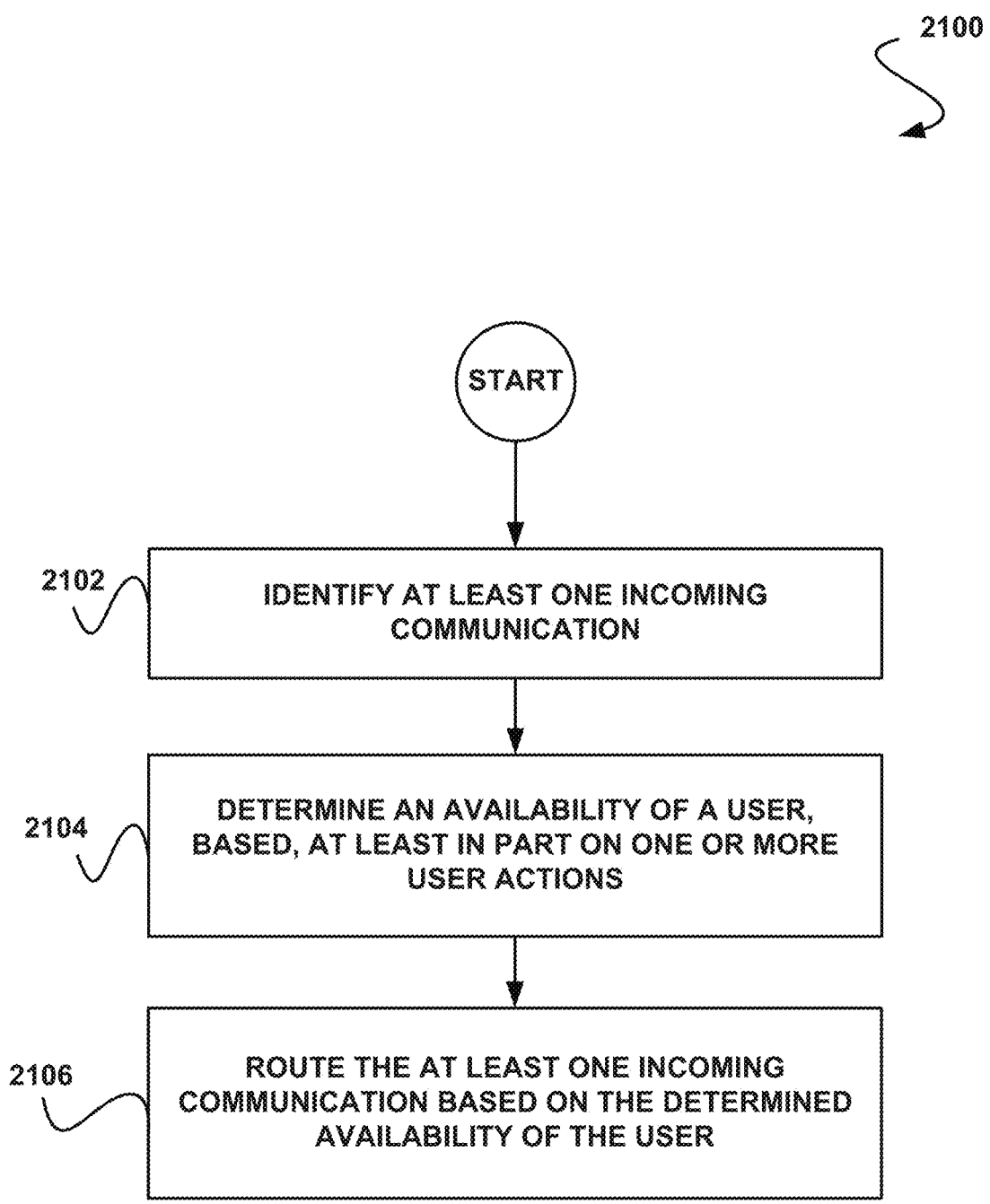
FIG. 21 shows a method for availability based communication routing, in accordance with another embodiment.

FIG. 21 shows a method 2100 for availability based communication routing, in accordance with another embodiment. As an option, the method 2100 may be implemented in the context of the architecture and environment of FIGS. 1-20 or any subsequent Figure(s). Of course, however, the method 2100 may be carried out in any desired environment. It should also be noted that the aforementioned definitions may apply during the present description.

As shown, at least one incoming communication is identified. See operation 2102. In various embodiments, the incoming communication may include an email, an instant message, a VoIP call, an SMS text message, an MMS text message, a phone call, and/or any other communication.

Additionally, an availability of a user is determined based, at least in part on one or more user actions. See operation 2104. The user actions may include any user action, past, present, and future.

For example, in one embodiment, determining the availability of the user may be based on one or more current user actions. In various embodiments, the one or more current user actions may include current typing, mouse movement, talking, phone actions, texting, operation of certain applications, and/or various other user actions. In other embodiments, availability may be determined from a posted on-line status, an IM presence, an indication whether the user is on-line, an indication whether the user is logged into a system, etc.

In another embodiment, determining the availability of the user may be based on one or more past (and/or ongoing) user actions. For example, in various embodiments, the one or more past (and/or ongoing) user actions may include playing a media file, running an application, and/or various other user actions. In this way, a user may be deemed unavailable if the user is in the middle of running an application or a media file (e.g. a video, music, a game, etc.).

In another embodiment, determining the availability of the user may be based on one or more future user actions. For example, the one or more future user actions may include actions associated with events in a calendar. In one embodiment, determining the availability of the user may be based on a calendar associated with the user. For instance, a calendar may indicate an unavailability of the user at a certain future time span. Conversely, such calendar may indicate an availability of the user at another particular future time span.

As shown further, the at least one incoming communication is routed based on the determined availability of the user. See operation 2106. For example, in one embodiment, routing the incoming communication may include routing the incoming communication to a folder when it is determined that the user is not available. In one embodiment, the communication may be scanned for content and the communication may be routed to a specific folder based on the content. In another embodiment, an importance level or priority of the communication may be determined and the communication may be routed to a specific folder based on the importance.

In various embodiments, the folder may include individual folders which are only accessible by a single user. In other embodiments, the folder may include group folders (e.g. destinations, wall posts, etc.) which are accessible only by multiple users (e.g. via a log-in process, etc.). Of course, any folder (e.g. public folders/posts, etc.) is contemplated.

In another embodiment, routing the incoming communication may include routing the incoming communication to a temporary holding area when it is determined that the user is not available. In various embodiments, the holding area may include storage, a folder, or any other holding area. In such embodiment, the storage of the incoming message may or may not be transparent to a sender of the incoming communication.

In another embodiment, any communications in the holding area may be capable of being sent to an original destination when it is determined the user is available. In various embodiments, the original destination may include an inbox, a phone, a specific folder, a computer, and/or any other original destination. In one embodiment, if it determined that the user is available when an incoming communication is present, the incoming communication may be sent to the destination.

As an option, an indicator/notice/alert may be presented to the user upon the user becoming available, where such indicator/notice/alert may indicate that the incoming message was received during the user's unavailability, that the incoming communication was held in the temporary holding area, etc. In some embodiments, such indicator/notice/alert may include various statistics as to such incoming communication (e.g. number of communication(s), sender of such communication(s), time of arrival and/or length of time the incoming message was held, etc.). In still other embodiments, such indicator/notice/alert may be sent by the same or different protocol with which the incoming communication was received.

While, in the previous embodiments, the message is routed based on user availability, it should be noted that, in other embodiments, the incoming communication may be routed based on other criteria in addition to (or instead of) such user availability. For example, the incoming communication may be routed based on importance level, priority, information associated with incoming communication or a related incoming communication, rules, resource availability, time to achieve a related task, etc., as set forth in the other embodiments disclosed herein.

More illustrative information will now be set forth regarding various optional architectures and features with which the foregoing techniques discussed in the context of any of the present or previous figure(s) may or may not be implemented, per the desires of the user. For instance, various optional examples and/or options associated with the communication of operation 2102, the determining of operation 2104, the routing of operation 2106, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 22:
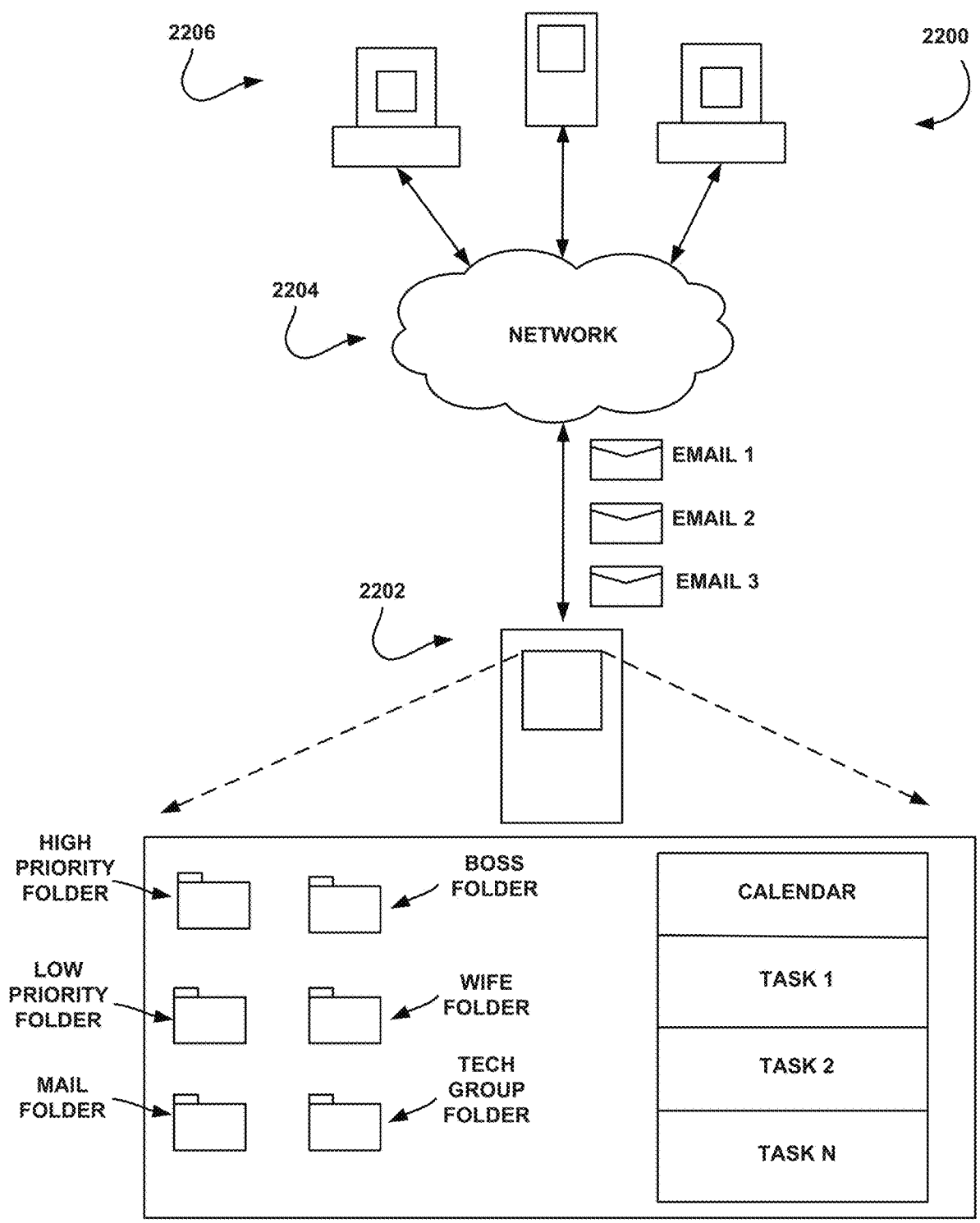
FIG. 22 shows a system for availability based communication routing, in accordance with another embodiment.

FIG. 22 shows a system 2200 for availability based communication routing, in accordance with another embodiment. As an option, the system 2200 may be implemented in the context of the architecture and environment of FIGS. 1-21 or any subsequent Figure(s). Of course, however, the system 2200 may be implemented in any desired environment. It should also be noted that the aforementioned definitions may apply during the present description.

As shown, a user device 2202 is provided. The user device 2202 may be capable of communicating with multiple other devices 2206 over one or more networks 2204. Furthermore, the user device 2202 and the devices 2206 may be capable of communicating with one or more online databases. The user device 2202 and the devices 2206 may include any type of device including a mobile device (e.g. a mobile phone, a PDA, a laptop computer, a handheld computer, a tablet computer, etc.) or a desktop device (e.g. a television, a computer, etc.).

In one embodiment, software associated with the user device 2202 may identify an incoming communication, such as a phone call, a VoIP call, a text message, an email, and/or any other communication. Additionally, software associated with the user device 2202 may determine an availability of a user, based, at least in part on one or more user actions associated with the user device. Additionally, software associated with the user device 2202 may route the at least one incoming communication based on the determined availability of the user.

The user device 2202 and/or an application associated therewith may be capable of receiving messages, analyzing messages, prioritizing messages, categorizing messages, and/or assigning time for processing messages in a calendar. In operation, the user device 2202 may receive one or more messages (e.g. emails, instant messages, text messages, etc.).

In one embodiment, a software engine associated with the user device 2202 may be utilized to control presence status (e.g. available, unavailable, etc.) for instant messaging applications and other similar applications (e.g. email, etc.), based on the needs of the user. In another embodiment, a software engine associated with the user device 2202 may be utilized to automatically control a status of an automatic response to incoming alerts and/or communications.

For example, the software engine associated with the user device 2202 may determine that the user is busy working on something and/or is under pressure to complete a task based on an impending deadline. In this case, in one embodiment, the status of availability of the user may be unavailable to various forms of communications (e.g. such as instant messaging, etc.). In this way, the user is not distracted by incoming communication.

In one embodiment, if the level or frequency of incoming messages surpasses a predetermined threshold, any blocking of incoming communications may be automatically lifted in order to help deal with potential emergency situations. Furthermore, in this case, the user availability may be changed to an available status.

In another embodiment, a software engine associated with the user device 2202 may function to consolidate a view of how personal time is spent by integrating information from many sources (e.g. various communication sources, various scheduling sources, etc.). In one embodiment, the consolidation may include corporate PBX systems, systems that handle conferencing, online devices, data associated with computer usage (e.g. which applications and sites are being used, etc.). In one embodiment, the time spent on each activity may be classified into tasks and longer term goals.

In various embodiments, the user device 2202, the devices 2206, and/or the online databases 2208, may include computer code capable of implementing a virtual personal assistant module. In one embodiment, the virtual personal assistant and computer code associated therewith, may be capable of automatically scheduling tasks and objectives, determining importance level associated with the tasks and objectives, updating status associated with the tasks and objectives, modifying calendar tasks, generating and applying rules inferred from user action or explicitly defined by a user, making suggestions to a user, generating and displaying alerts, and otherwise performing scheduling tasks etc. that may be performed by a human personal assistant.

In various embodiments, the aforementioned rules may be configured to vary based on a time of day, a device with which a message is being viewed/accessed, a status of the user (e.g. on vacation, in a meeting, etc.), etc. For example, a first set of rules may be configured for use when a user is in a vehicle, such that only the highest priority messages are delivered via a text-to-speech framework using a vehicular communication assembly that is coupled to a mobile device of the user. Further, a second set of rules (or a variation of the first set of rules) may be configured for use when a user is on vacation, such that only messages from certain entities (e.g. top clients, important patients, etc.) are allotted time for review, while others are archived and/or forwarded to others (e.g. administrator, etc.), etc.

Figure 23:
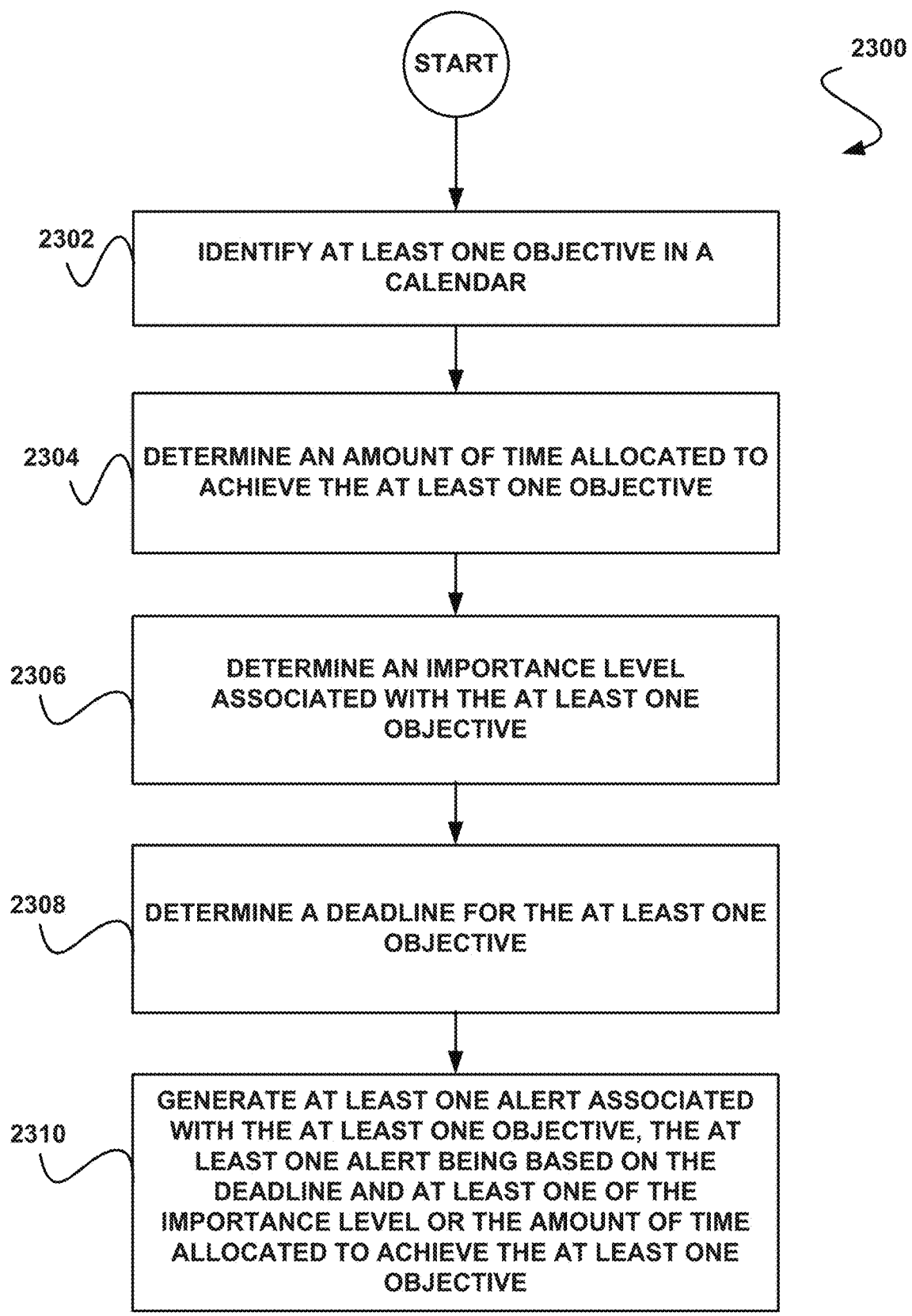
FIG. 23 shows a method for generating objective alerts, in accordance with another embodiment.

FIG. 23 shows a method 2300 for generating objective alerts, in accordance with another embodiment. As an option, the method 2300 may be implemented in the context of the architecture and environment of FIGS. 1-22 or any subsequent Figure(s). Of course, however, the method 2300 may be carried out in any desired environment. It should also be noted that the aforementioned definitions may apply during the present description.

As shown, at least one objective in a calendar is identified. See operation 2302. Additionally, an amount of time allocated to achieve the at least one objective is determined. See operation 2304. Further, an importance level associated with the at least one objective is determined. See operation 2306. Still yet, a deadline for the at least one objective is determined. See operation 2308.

In addition, at least one alert associated with the at least one objective is generated. See operation 2310. The at least one alert is based on the deadline and at least one of the importance level or the amount of time allocated to achieve the at least one objective. In one embodiment, the deadline for objective may be determined based, at least in part, on both the amount of time to achieve the objective and the importance level associated with the objective.

In one embodiment, identifying the objective may include receiving a user input indicating the objective. In another embodiment, identifying the objective may include identifying the objective from at least one message. Of course, the objective may be identified in any number of ways described herein.

Further, in one embodiment, determining the amount of time allocated to achieve the objective may include determining the amount of time allocated to achieve the objective from the calendar. In another embodiment, determining the amount of time allocated to achieve the objective may include receiving user input indicating the amount of time allocated to achieve the objective.

Additionally, in one embodiment, determining the importance level associated with the objective may include receiving a user input indicating the importance level associated with the objective. In another embodiment, determining the importance level associated with the objective may include determining the importance level associated with the objective from a calendar. For example, a calendar may include an indicator of importance, such as a keyword or indicator.

Further, in various embodiments, the alert generated may include any type of alert, such as a pop-up window, a pop-up balloon, an audio alert, an animation, a message, and/or any other type of alert. Additionally, in various embodiments, the alert may include text, animations, pictures, and/or other information. In one embodiment, the at least one alert may be based on the deadline and the importance level. In another embodiment, the alert may be based on the deadline and the amount of time allocated to achieve the objective. In another embodiment, the alert may be based on the deadline, the importance level, and the amount of time allocated to achieve the one objective.

In one embodiment, the alert may be capable of being displayed on one or more different occasions. For example, the alert may be displayed on multiple of occasions to continue to alert the user. In one embodiment, the frequency of displaying the alert may be based, at least in part, on the importance level associated with the one objective. In another embodiment, the frequency of displaying the alert may be based, at least in part, on the amount of time allocated to achieve the objective. In yet another embodiment, the frequency of displaying the alert may be based, at least in part, on a status of completion associated with the objective.

In various embodiments, the alert may include a simple notification that minimally identifies the related objective. In other embodiments, any of the information disclosed herein in connection with the objective may be displayed with the alert. In still other embodiments, the alert may include a first amount of objective-related information and a second additional amount of objective-related information may be displayed in response to a user selection associated with the alert.

More illustrative information will now be set forth regarding various optional architectures and features with which the foregoing techniques discussed in the context of any of the present or previous figure(s) may or may not be implemented, per the desires of the user. For instance, various optional examples and/or options associated with the identifying of operation 2302, the determining of operation 2304, the determining of operation 2306, the determining of operation 2308, the generating of operation 2310, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 24 shows an interface 2400 for displaying objective alerts, in accordance with another embodiment. As an option, the interface 2400 may be implemented in the context of the architecture and environment of FIGS. 1-23 or any subsequent Figure(s). Of course, however, the interface 2400 may be implemented in any desired environment. It should also be noted that the aforementioned definitions may apply during the present description.

In operation, the interface 2400 may display alerts including a variety of information. For example, in one embodiment, an alert associated with an objective and/or a determined deadline may be generated. In another embodiment, the alert may include a reminder.

In another embodiment, the alert may include an update associated with the objective. In another embodiment, the alert may include a status associated with the achievement of the objective. In another embodiment, the alert may include an indicator indicating the amount of time remaining to achieve the objective. In another embodiment, the alert may include an indicator indicating a status of the objective (e.g. pending, complete, expired, etc.). In an embodiment where there exists a large number of alerts that are persistent and/or highly frequent, such alerts may be prioritized similar to that in a manner messages/incoming communications may be prioritized.

In one embodiment, the interface 2400 may be automatically displayed as a reminder for tasks and activities. In some cases, reminders may be utilized to remind a user a fixed time period before an activity should begin or end, based on how the user configures them. The user may then dismiss and disregard the reminder, or snooze the reminder for a period of time. However, some tasks have hard deadlines, for instance a birthday, or the end of a quarter, etc. Other deadlines are affected by external constraints. For example, a deadline of a task requested by a supervisor of a user might have been pushed back or moved up in time.

In one embodiment, reminders may have multiple levels of alerts. Furthermore, in one embodiment, the frequency of the alerts may be automatically adjusted. For example, it may be automatically determined to discontinue reminding, based on user actions, user inactions, deadlines, etc.

In one embodiment, the reminders and alerts may be initiated by a virtual personal assistant module. For example, in one embodiment, the virtual personal assistant may display alerts associated with tasks automatically scheduled by the virtual personal assistant. In one embodiment, the alerts may be utilized to prompt the user for a response. In this case, the alert may have the capability of receiving text and/or user input. Further, in one embodiment, the alerts may be utilized in the context of task scheduling.

Figure 25:
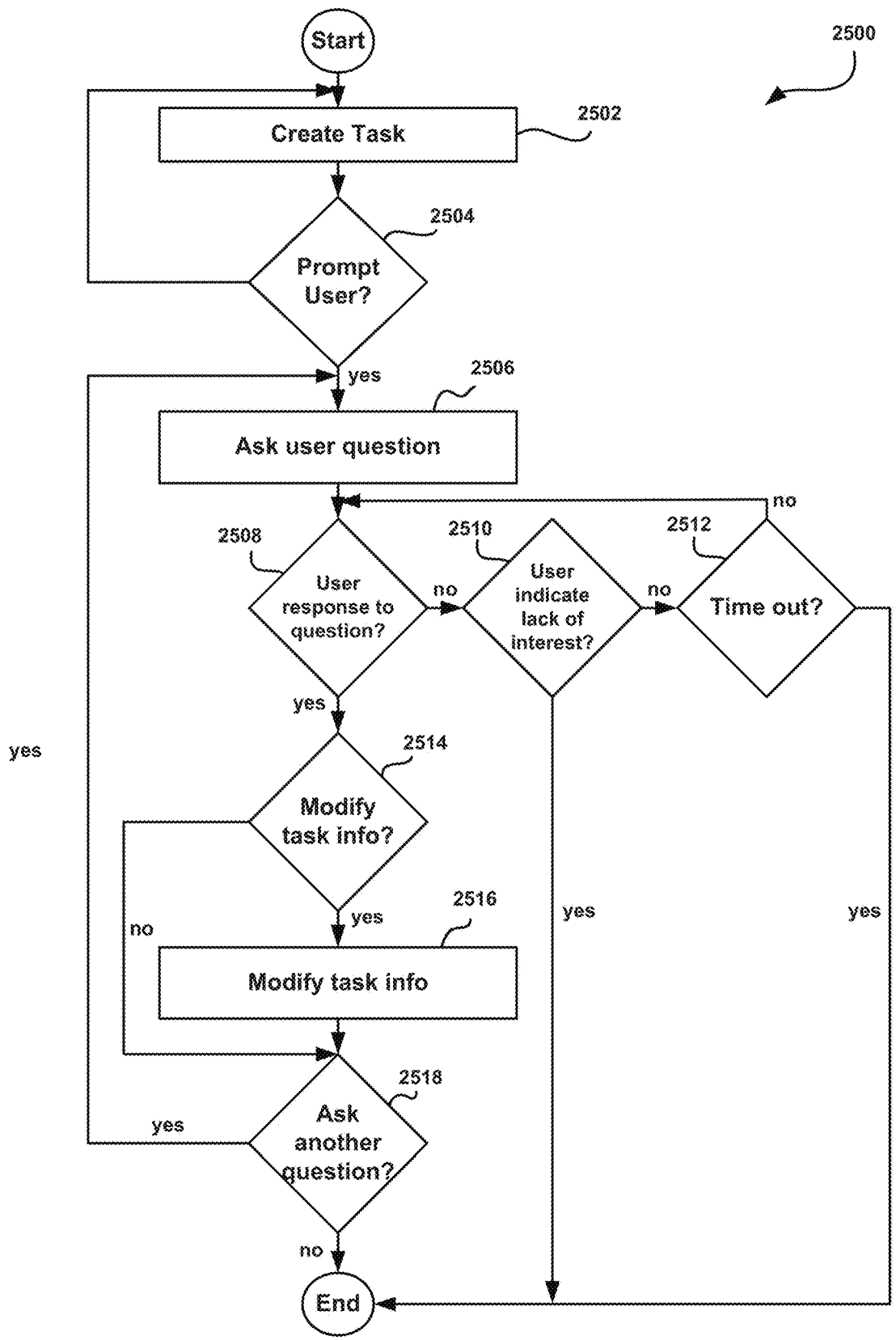
FIG. 25 shows a method for modifying task information based on user input, in accordance with another embodiment.

FIG. 25 shows a method 2500 for modifying task information based on user input, in accordance with another embodiment. As an option, the method 2500 may be implemented in the context of the architecture and environment of FIGS. 1-24 or any subsequent Figure(s). Of course, however, the method 2500 may be carried out in any desired environment. It should also be noted that the aforementioned definitions may apply during the present description.

As shown, a task is automatically created. See operation 2502. It is then determined whether to prompt a user associated with the task. See decision 2504.

The determination to prompt the user may be based on many different factors. For example, in one embodiment, the user may be prompted if any assumption was automatically made during the task creation process. For example, an assumption associated with an importance level may have been made, an assumption associated with a deadline may have been made, an assumption associated with a completion time may have been made, an assumption as to the focus of the task may have been made, and/or various other assumptions.

In another embodiment, a user may be prompted by default. In another embodiment, the determination to prompt the user may be based on whether the user has shown an interest in responding to prompts in the past. If it is determined to prompt the user, the user is asked one or more questions. See operation 2506.

The questions may be asked utilizing any number of user interfaces (e.g. a pop-up window, a dialogue box, audio questions, etc.). Furthermore, the questions may include any questions that may prompt a response. For example, in various embodiments, the questions may include asking questions to more accurately define or schedule the task such as: "What is the actual importance level?"; "How long will the task actually take?"; "What is the actual subject matter of the task?"; "Should this task be delegated?"; etc.

If the user responds to a question, the response may be utilized to modify and/or refine task information (e.g. in a schedule, a calendar, etc.). See decisions and operations 2508, 2514, and 2516. It is then determined whether to ask another question. See decision 2518.

If the user does not respond to a question, it is determined if the user indicates a lack of interest, or if the prompt times out. See decisions 2510 and 2512. Lack of interest may be indicated in a variety of ways, including closing a prompt, dismissing a prompt, minimizing a prompt, and otherwise indicating a lack of interest. If the user chooses not to answer any questions, the task may remain scheduled as is, with all current assumptions, etc. present.

Figure 26:
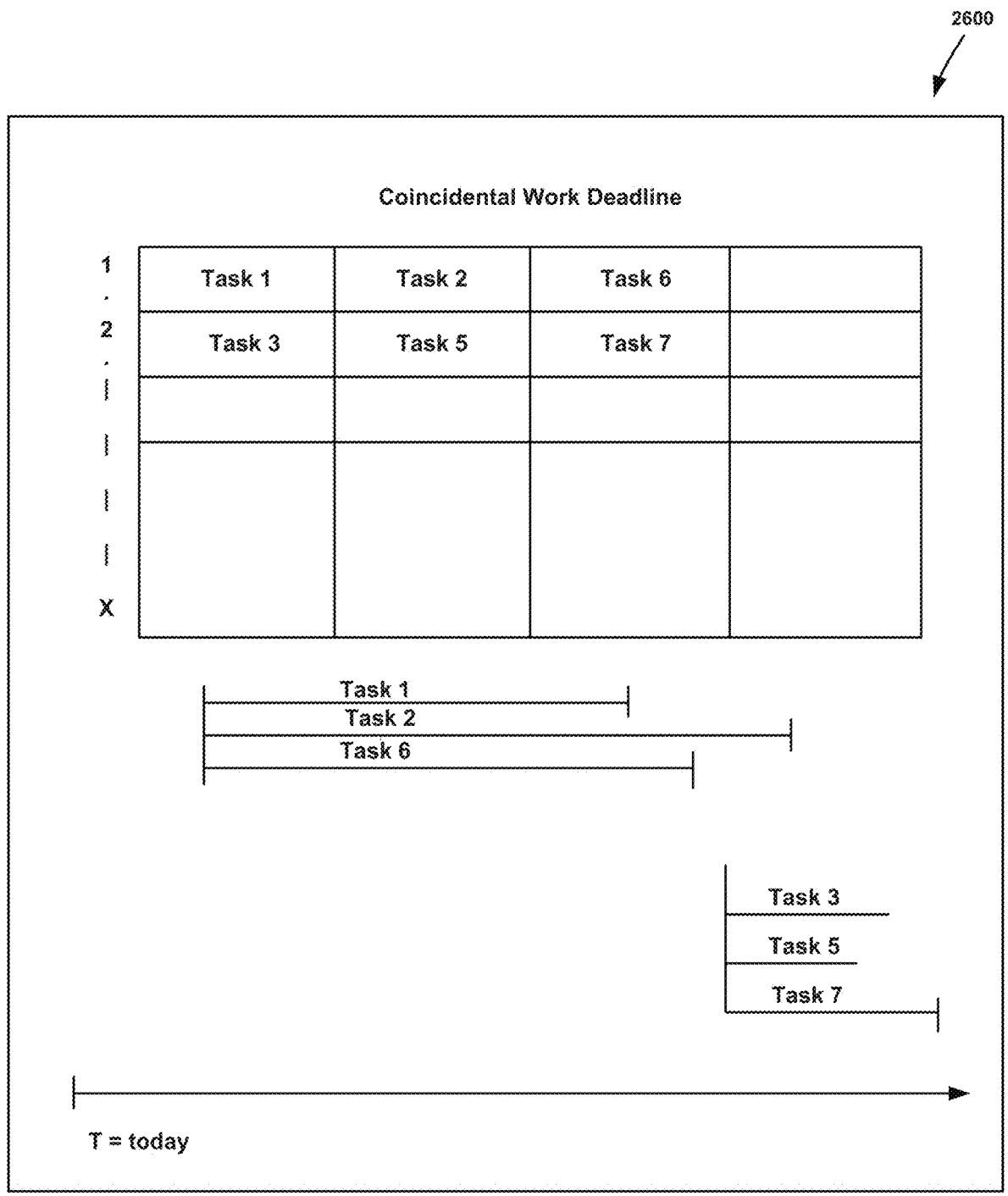
FIG. 26 shows an interface for displaying scheduled tasks, in accordance with another embodiment.

FIG. 26 shows an interface 2600 for displaying scheduled tasks, in accordance with another embodiment. As an option, the interface 2600 may be implemented in the context of the architecture and environment of FIGS. 1-25 or any subsequent Figure(s). Of course, however, the interface 2600 may be implemented in any desired environment. It should also be noted that the aforementioned definitions may apply during the present description.

As shown, scheduled tasks and/or time lines may be displayed to a user utilizing the interface 2600. In operation, tasks may not necessarily be automatically scheduled based on the order received, but rather based on importance and other factors, such as time to complete, etc. In one embodiment, tasks may be scheduled coincidently, if the task is such that this may occur.

For example, some meetings that require little involvement from a user may be scheduled at the same time as a task including responding to emails. As another example, driving to a meeting or an event may be scheduled coincidently with a conference call, listening to voicemail, listening to a seminar, and/or any various other tasks. In various embodiments, the user may be able to display different views of scheduled tasks, such as a calendar view, a timeline view, a list view, etc.

Figure 27:
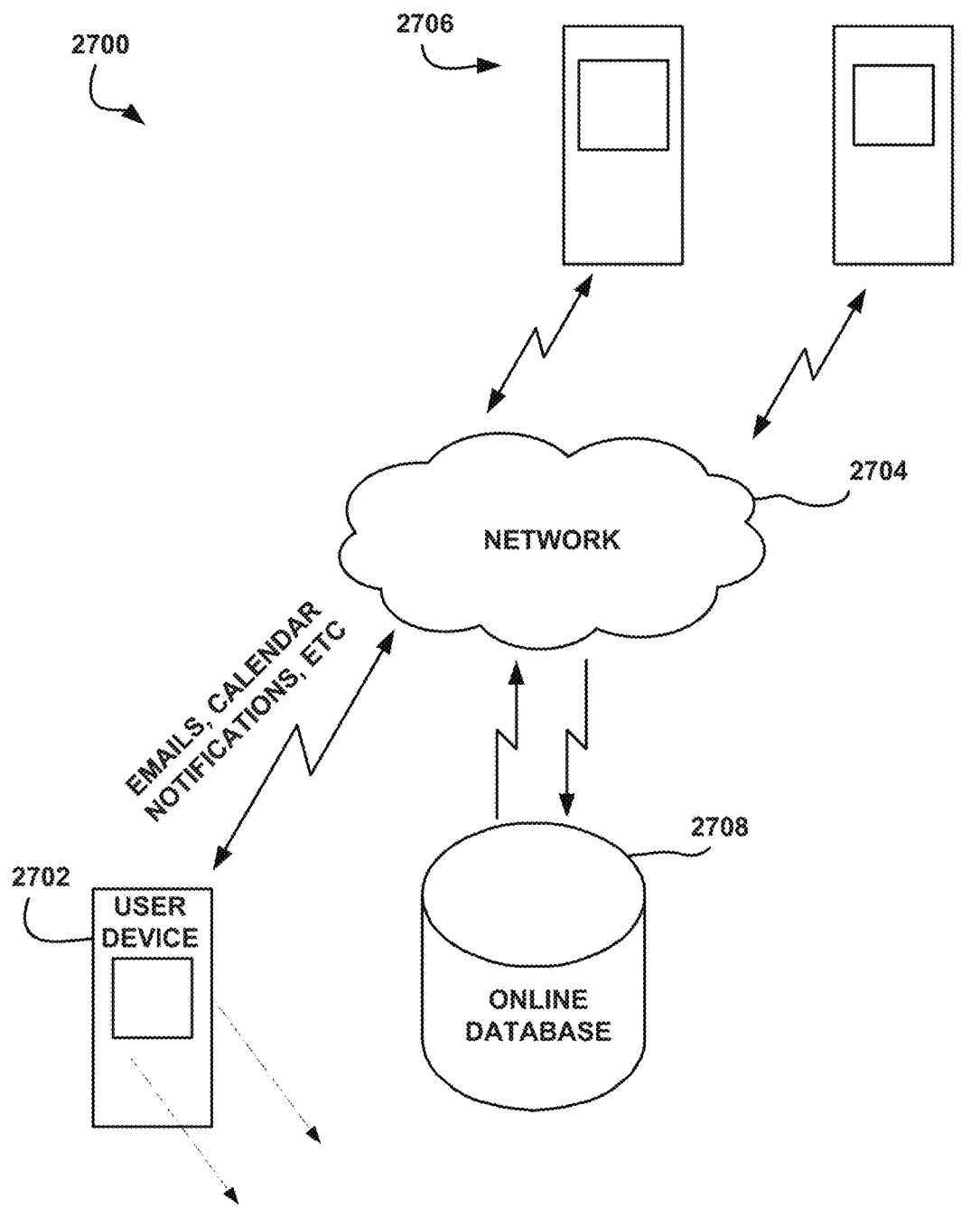
FIG. 27 shows a system for implementing a virtual personal assistant, in accordance with another embodiment.

FIG. 27 shows a system 2700 for implementing a virtual personal assistant, in accordance with another embodiment. As an option, the system 2700 may be implemented in the context of the architecture and environment of FIGS. 1-26. Of course, however, the system 2700 may be implemented in any desired environment. It should also be noted that the aforementioned definitions may apply during the present description.

As shown, a user device 2702 is provided. The user device 2702 may be capable of communicating with multiple other devices 2706 over one or more networks 2704. Furthermore, the user device 2702 and the devices 2706 may be capable of communicating with one or more online databases 2708. The user device 2702 and the devices 2706 may include any type of device including a mobile device (e.g. a mobile phone, a PDA, a laptop computer, a handheld computer, a tablet computer, etc.) or a desktop device (e.g. a television, a computer, etc.).

In various embodiments, the user device 2702, the devices 2706, and/or the online databases 2708, may include computer code capable of implementing a virtual personal assistant module. In one embodiment, the virtual personal assistant and computer code associated therewith, may be capable of automatically scheduling tasks and objectives, determining importance level associated with the tasks and objectives, updating status associated with the tasks and objectives, modifying calendar tasks, generating and applying rules inferred from user action or explicitly defined by a user, making suggestions to a user, generating and displaying alerts, and otherwise performing scheduling tasks etc. that may be performed by a human personal assistant.

In one embodiment, at least one objective may be received at the user device 2702. Additionally, an amount of time to allocate to the objective may be determined by the virtual personal assistant. Further, an importance level associated with the objective may be determined by the virtual personal assistant. Still yet, at least one period of time may be allocated by the virtual personal assistant, in a calendar, for achieving the one objective.

In one embodiment, it may be determined whether two or more objectives may be parallelized. For example, in some cases, a two or more tasks may be scheduled coincidently because a user may be able to achieve the objectives coincidently (e.g. driving and a teleconference, etc.). In another embodiment, the virtual personal assistant may determine that two objectives may not be scheduled and/or accomplished coincidently (e.g. skiing and taxes, etc.).

In one embodiment, the virtual personal assistant may be configured to implement a zero inbox strategy. For example, all email and or message received by the user device 2702 or an application on the user device 2702 may be automatically analyzed and handled. In various embodiments, the handling may include automatic task scheduling, routing of messages to folders, automatic task delegation, automatic responses to messages, automatic deletion of messages, and/or various other automated actions.

Furthermore, in one embodiment, the virtual personal assistant may be capable of configuring access to a user calendar, etc. For example, the virtual personal assistant may be programmed to know (e.g. by a user, admin, etc.), or may automatically infer (e.g. based on an organization chart, etc.), which individuals may have access to a particular user calendar. The virtual personal assistant may then implement accessibility rules accordingly. In one embodiment, access to a first user calendar by a second user may require authentication (e.g. input of a user name and password, etc.). In another embodiment, access to a calendar of a user may be limited to specific groups, such as working groups, departments, etc.

In various embodiments, the virtual personal assistant may be stored on the user device 2702, the devices 2706, and/or the online databases 2708. Furthermore, in various embodiments, data associated with user preferences, settings, and rules, etc. may be stored on the user device 2702, the devices 2706, and/or the online databases 2708. For example, in one embodiment, user data (e.g. preferences, settings, and rules, etc.) may be stored on the online databases 2708 or a network cloud, such that the user may utilize the virtual personal assistant on a plurality of devices and learned data may be stored in a centralized location.

Additionally, in one embodiment, each user may have a user profile that includes user preferences and other user data. As an option, the user profile may be stored on the online databases 2708 or a network cloud, such that the user may utilize a plurality of devices to access user specific data.

In various embodiments, user preference data may include any data inferred from user action, explicitly taught (e.g. by a user, etc.), or any other data. For example, in one embodiment, the user preferences may be associated with appliances (e.g. household appliances, televisions, security systems, etc.). In this case, the user preference data may include setting preferences. In one embodiment, location information associated with a user or the user device 2702, or pairing information (e.g. via a Bluetooth connection, near-field connection, infra-red connection, etc.) may be utilized detect one or more appliances such that alerts including preference settings may be displayed to the user. In one embodiment, setting information may be automatically transferred to the appliance (e.g. via a Bluetooth connection, near-field connection, infra-red connection, etc.).

In one embodiment, location information associated with a user or the user device 2702 may be utilized to suggest tasks to complete, such as tasks of opportunity. For example, the user may be driving in a car or walking down a street, near a venue associated with a task. The location of the user and/or the user device may be determined utilizing a GPS locator included in the device, triangulation, and/or any other technique. When it is determined that the user is near a venue associated with a task, the virtual personal assistant may present the user with a suggestion to complete the task, assuming the virtual personal assistant has determined an availability of the user, or that completing the task now is beneficial.

In another embodiment, the location information may be utilized to present the user with local activity or eating options. For example, the virtual personal assistant may have knowledge that the user enjoys golf. When the user is in a location of a golf course, and the user has available time, the virtual personal assistant may automatically suggest that the user play golf. In one embodiment, this suggestion may be the form an alert. Additionally, in one embodiment, the suggestion may include a map to the course, a price, available tee times, and/or any other information.

In one embodiment, the user may have the ability to respond to the virtual personal assistant (e.g. using an accept button, etc.) and the virtual personal assistant may automatically block out the time for the user. In another embodiment, the virtual personal assistant may present a number to call to book the tee time. In another embodiment, the virtual personal assistant may automatically dial the number to schedule the tee time. In another embodiment, the virtual personal assistant may use a text to voice module and schedule the tee time for the user. Of course, the virtual personal assistant may automatically suggest that the user partake in any number of activities, based on user preferences, such as dining at a specific restaurant, going to a movie, going to a play, shopping at a specific store, going to a bank, going grocery shopping, picking up dry-cleaning, and/or any other activity.

In yet another embodiment, the location information may be utilized to present the user with advertisements associated with a current location. For example, a user may be presented with an advertisement for nearby restaurants, shops, activities, and/or any other product or service, based on location. In one embodiment, the user may have the ability to click on the advertisement such that location information associated with the advertisement may be displayed.

In yet another embodiment, the location information may be utilized to present the user with contact locations associated with a current location. For example, a user may be in a location near an address of a friend. Accordingly, the virtual personal assistant may send an alert to the user suggesting a visit to the friend.

In some embodiments, the aforementioned advertisements (or any suggested opportunities/tasks) may be conditionally delivered/displayed based on a current time (as well as location) of the user (as well as scheduled calendar events). For example, if the virtual personal assistant determines that the user has arrived to a scheduled location visit at least 15 minutes early, advertisements (or any suggested opportunities/tasks) associated with the user's preferences or profile may be delivered/displayed.

For instance, if 1) the time available (before a scheduled event) allows for enjoyment of a cup of coffee (which a user profile indicates the user enjoys), 2) a coffee shop is within a predetermined distance, and (optionally) 3) such coffee shop is advertisement a special on the user's favorite coffee; a relevant advertisement (and map) may be displayed to the user (in the form of an alert, etc.). Still yet, if 1) the time available (after a scheduled event) allows for dinner, 2) four known friends are located (or are planned to be located in the vicinity), 3) a restaurant with an outdoor patio (that is known to be a shared favorite amongst the friends) has a promotion that applies to groups of 5 or more, and 4) weather permits for outdoor dining; a relevant advertisement (and map) may be displayed to the user (and possibly to the entire group of 5). Event still, if 1) the time available (before a scheduled event) allows time to meet a friend who is scheduled to attend an outdoor musical event within two miles (that both the user and friend share a common interest in), 2) the user is known to be on a train in the vicinity, and 3) the weather permits; a relevant suggestion (and map) may be displayed to the user (in the form of an alert, etc.). Still yet, in various embodiments, an initial prompt may first be communicated to the user, which may, in turn, be used to initiate a communication with others To this end, impromptu tasks of opportunity may be suggested/advertised to the user, based on a variety of factors.

It should be noted that the advertisements (or any suggested opportunities/tasks) may be driven by the virtual personal assistant (in the form of suggestions) and/or the product/service provider (in the form of promotions/advertisements). In the case of the latter, an advertisement campaign strategy interface may be provided for allowing the product/service provider to determine in which situations which people (with certain profile characteristics) are provided with a promotion/advertisement.

To this end, advertisements (or any suggested opportunities/tasks) may be provided to the user as a function of any combination of one or more of the following criteria (and possibly others):
  a user's planned schedule;
  known past behavior/habits, or interests in possible future behavior;
  environmental conditions (e.g. weather, traffic, etc.);
  general user interests/disinterests (e.g. or any profile information, etc.);
  user restrictions;
  a current time of day (e.g. in relation to typical eating times, before/after working hours, etc.);
  any resources that a user current has at their disposal (e.g. vehicle, particular clothing, etc.); and
  an identity, number, current/planned location, and classification/interests of socially/professionally networked individuals.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
at least one non-transitory memory storing instructions;
a display; and
one or more processors in communication with the at least one non-transitory memory and the display, wherein the one or more processors execute the instructions to:
allow a user to define a list of user-defined important senders;
receive an e-mail that includes event-related information for a particular event, the event-related information including a date and a time identified in a body of the e-mail;
identify the event-related information of the e-mail;
in response to the receipt of the e-mail and based on the identified event-related information, automatically perform a calendar-related action for the particular event, the calendar-related action including a display of a calendar event on a calendar displayed via the display such that the calendar event becomes part of the calendar;
identify information associated with the sender of the e-mail, in response to the receipt of the e-mail;
perform a comparison, utilizing the one or more processors, involving the information associated with the sender of the e-mail, and the list of user-defined important senders, to determine whether the information associated with the sender of the e-mail is on the list of user-defined important senders;
organize the e-mail in at least one of a single user-defined important sender(s) folder or a general folder, based on the comparison such that:
if the information associated with the sender of the e-mail is on the list of user-defined important senders, the e-mail is organized in the single user-defined important sender(s) folder and the general folder, and
if the information associated with the sender of the e-mail is not on the list of user-defined important senders, the e-mail is not organized in the single user-defined important sender(s) folder and is organized in the general folder, where the single user-defined important sender(s) folder is equipped to include a subset of e-mails in the general folder including e-mails from a plurality of the user-defined important senders for display utilizing a mobile device interface in the form of an inbox from which the e-mails from the plurality of the user-defined important senders are accessible to a recipient of the e-mails for being read; and
display a single user-defined important sender(s) folder-related alert or a general folder-related alert based on the comparison such that:
if the information associated with the sender of the e-mail is on the list of user-defined important senders, the e-mail is organized in the single user-defined important sender(s) folder and the general folder, and the single user-defined important sender(s) folder-related alert is displayed for the e-mail, and
if the information associated with the sender of the e-mail is not on the list of user-defined important senders, the e-mail is not organized in the single user-defined
important sender(s) folder and the single user-defined important sender(s) folder-related alert is not displayed for the e-mail, and the e-mail is organized in the general folder and the general folder-related alert is displayed for the e-mail;
wherein the apparatus is configured such that the single user-defined important sender(s) folder-related alert and the general folder-related alert are displayed via a common display, so that the single user-defined important sender(s) folder and the general folder can each be accessed via the common display.

2. The apparatus of claim 1, wherein the apparatus is configured such that the information associated with the sender of the e-mail is used to indicate a specific priority or importance level.

3. The apparatus of claim 2, wherein the apparatus is configured such that the specific priority or importance level is used to display the e-mails in order of priority, route e-mails to one or more folders, or schedule tasks.

4. The apparatus of claim 1, wherein the apparatus is configured such that the single important sender(s) folder includes a user created e-mail folder.

5. The apparatus of claim 1, wherein the apparatus is configured such that the alert is displayed in a same window of as an email application window.

6. The apparatus of claim 1, wherein the apparatus is configured such that the identifying information associated with the sender of the e-mail includes identifying a sender identity of the e-mail.

7. A method, comprising:
at a mobile device includes a processor and non-transitory memory:
allowing a user to define a list of user-defined important senders;
receiving an e-mail that includes event-related information for a particular event, the event-related information including a date and a time identified in a body of the e-mail;
identify the event-related information of the e-mail;
in response to the receipt of the e-mail and based on the identified event-related information, automatically perform a calendar-related action for the particular event, the calendar-related action including a display of a calendar event on a calendar displayed via the display such that the calendar event becomes part of the calendar;
identifying information associated with the sender of the e-mail, in response to the receipt of the e-mail;
performing a comparison, executed by the processor, involving the information associated with the sender of the e-mail, and the list of user-defined important senders, to determine whether the information associated with the sender of the e-mail is on the list of user-defined important senders;
organizing the e-mail in at least one of a single user-defined important sender(s) folder or a general folder, based on the comparison such that:
if the information associated with the sender of the e-mail is on the list of user-defined important senders, the e-mail is organized in the single user-defined important sender(s) folder and the general folder, and
if the information associated with the sender of the e-mail is not on the list of user-defined important senders, the e-mail is not organized in the single user-defined important sender(s) folder and is organized in the general folder, where the single user-defined important sender(s) folder is equipped to include a subset of e-mails in the general folder including e-mails from a plurality of the user-defined important senders for display utilizing a mobile device interface in the form of an inbox from which the e-mails from the plurality of the user-defined important senders are accessible to a recipient of the e-mails for being read; and displaying a single user-defined important sender(s) folder-related alert or a general folder-related alert based on the comparison such that:
  if the information associated with the sender of the e-mail is on the list of user-defined important senders, the e-mail is organized in the single user-defined important sender(s) folder and the general folder, and the single user-defined important sender(s) folder-related alert is displayed for the e-mail, and
  if the information associated with the sender of the e-mail is not on the list of user-defined important senders, the e-mail is not organized in the single user-defined important sender(s) folder and the single user-defined important sender(s) folder-related alert is not displayed for the e-mail, and the e-mail is organized in the general folder and the general folder-related alert is displayed for the e-mail;
wherein the single user-defined important sender(s) folder-related alert and the general folder-related alert are displayed via a common display, so that the single user-defined important sender(s) folder and the general folder can each be accessed via the common display.

8. A system, comprising:
processor means for:
receiving an e-mail that includes event-related information for a particular event, the event-related information including a date and a time identified in a body of the e-mail;
identifying the event-related information of the e-mail;
in response to the receipt of the e-mail and based on the identified event-related information, automatically performing a calendar-related action for the particular event, the calendar-related action including a display of a calendar event on a calendar displayed via the display such that the calendar event becomes part of the calendar;
identifying information associated with a sender of the e-mail, in response to a receipt of the e-mail;
performing a comparison involving the information associated with the sender of the e-mail, and a list of user-approved important senders, to determine whether the information associated with the sender of the e-mail is on the list of user-approved important senders; and
organizing the e-mail in at least one of a single user-approved important sender(s) folder or a general folder, based on the comparison such that:
  if the information associated with the sender of the e-mail is on the list of user-approved important senders, the e-mail is organized in the single user-approved important sender(s) folder and the general folder, and
  if the information associated with the sender of the e-mail is not on the list of user-approved important senders, the e-mail is not organized in the single user-approved important sender(s) folder and is organized in the general folder, where the single user-approved important sender(s) folder is equipped to include a subset of e-mails in the general folder including e-mails from a plurality of the user-approved important senders for display utilizing a mobile device interface in the form of an inbox from which the e-mails from the plurality of the user-approved important senders are accessible to a recipient of the e-mails for being read; and display means for displaying a single user-approved important sender(s) folder-related alert or a general folder-related alert based on the comparison such that:
  if the information associated with the sender of the e-mail is on the list of user-approved important senders, the e-mail is organized in the single user-approved important sender(s) folder and the general folder, and the single user-approved important sender(s) folder-related alert is displayed for the e-mail, and
  if the information associated with the sender of the e-mail is not on the list of user-approved important senders, the e-mail is not organized in the single user-approved important sender(s) folder and the single user-approved important sender(s) folder-related alert is not displayed for the e-mail, and the e-mail is organized in the general folder and the general folder-related alert is displayed for the e-mail:
wherein the system is configured such that the single user-approved important sender(s) folder-related alert and the general folder-related alert are displayed via a common display, so that the single user-approved important sender(s) folder and the general folder can each be accessed via the common display.

9. An apparatus, comprising:
at least one non-transitory memory storing instructions;
a display; and
one or more processors in communication with the at least one non-transitory memory and the display, wherein the one or more processors execute the instructions to:
  receive at least one message including an e-mail that includes event-related information for a particular event, the event-related information including a date and a time identified in a body of the e-mail;
  identify the event-related information of the e-mail;
  in response to the receipt of the e-mail and based on the identified event-related information, automatically perform a calendar-related action for the particular event, the calendar-related action including a display of a calendar event on a calendar displayed via the display such that the calendar event becomes part of the calendar;
  determine information associated with the at least one message, in response to the receipt of the e-mail;
  identify one or more rules utilizing the determined information associated with the at least one message, the one or more rules being based, at least in part, on a user action performed on one or more previous messages;
  perform at least one automated action associated with the at least one message, based on the one or more rules;
  allow a user to define a list of user-defined important senders;
  identify additional information associated with the sender of the e-mail, in response to the receipt of the e-mail;
  perform a comparison involving the additional information associated with the sender of the e-mail, and the list of user-defined important senders, to determine whether the information associated with the sender of the e-mail is on the list of user-defined important senders;
  organize the e-mail in at least one of a single user-defined important sender(s) folder or a general folder, based on the comparison such that:

if the information associated with the sender of the e-mail is on the list of user-defined important senders, the e-mail is organized in the single user-defined important sender(s) folder and the general folder, and if the information associated with the sender of the e-mail is not on the list of user-defined important senders, the e-mail is not organized in the single user-defined important sender(s) folder but is still organized in the general folder, where the single user-defined important sender(s) folder is equipped to include a subset of e-mails in the general folder including e-mails from a plurality of the user-defined important senders for display utilizing a mobile device interface in the form of an inbox from which the e-mails from the plurality of the user-defined important senders are accessible to a recipient of the e-mails for being read; and display a single user-defined important sender(s) folder-related alert or a general folder-related alert based on the comparison such that:

if the information associated with the sender of the e-mail is on the list of user-defined important senders, the e-mail is organized in the single user-defined important sender(s) folder as well as the general folder, and the single user-defined important sender(s) folder-related alert is displayed for the e-mail, and if the information associated with the sender of the e-mail is not on the list of user-defined important senders, the e-mail is not organized in the single user-defined important sender(s) folder and the single user-defined important sender(s) folder-related alert is not displayed for the e-mail, and the e-mail is organized in the general folder and the general folder-related alert is displayed for the e-mail;

wherein the apparatus is configured such that the single user-defined important sender(s) folder-related alert and the general folder-related alert are displayed via a common display, so that the single user-defined important sender(s) folder and the general folder can each be accessed via the common display.

10. The apparatus of claim 1, wherein the apparatus is configured such that the single user-defined important sender(s) folder-related alert and the general folder-related alert are simultaneously displayed via the common display.

11. The apparatus of claim 1, wherein the apparatus is configured such that the information associated with the sender of the e-mail includes a sender e-mail address of the sender of the e-mail.

12. The apparatus of claim 1, wherein the apparatus is configured such that event description information is identified in the body of the e-mail that describes the particular event, and the displayed calendar event includes at least a portion of the event description information.

13. The apparatus of claim 1, wherein the apparatus is configured such that, in response to receipt of an other e-mail and based on other event-related information that includes an indication of an acceptance of a calendar event request that was previously caused to be sent via the apparatus for an other particular event, automatically perform an other calendar-related action for the other particular event.

14. The apparatus of claim 13, wherein the apparatus is configured such that the other calendar-related action includes automatic display of the acceptance of the calendar event request on the calendar displayed via the display when the calendar is accessed.

15. The apparatus of claim 13, wherein the apparatus is configured such that the other calendar-related action includes automatic storage of the acceptance of the calendar event request for the calendar, for being displayed in response to user input.

16. The apparatus of claim 1, wherein the apparatus is configured such that the calendar event is displayed simultaneously with the e-mail.

17. The apparatus of claim 1, wherein the apparatus is configured such that the calendar event is displayed in an email application window.

18. The apparatus of claim 1, wherein the apparatus is configured such that, for the calendar event displayed on the calendar as a proposed calendar event, the calendar event is displayed as being accepted on the calendar as an actual calendar event in response to receiving user input.

19. The apparatus of claim 18, wherein the apparatus is configured such that event description information is identified in the body of the e-mail that describes the particular event, and the displayed proposed calendar event indicates at least a portion of the event description information.

20. The apparatus of claim 18, wherein the apparatus is configured such that event description information is identified in the body of the e-mail that describes the particular event, and the displayed actual calendar event indicates at least a portion of the event description information.

21. The apparatus of claim 18, wherein the apparatus is configured such that the displayed actual calendar event is displayed only in response to receiving the user input.

22. The apparatus of claim 18, wherein the apparatus is configured such that the proposed calendar event is displayed on the calendar regardless as to whether the user input is received.

23. The apparatus of claim 1, wherein the apparatus is configured such that the event-related information is displayed via the single user-defined important sender(s) folder-related alert if the information associated with the sender of the e-mail is on the list of user-defined important senders.

24. The apparatus of claim 1, wherein the apparatus is configured such that the event-related information is displayed in a body of the e-mail.

25. The apparatus of claim 1, wherein the apparatus is configured such that the event-related information is displayed in a body of the e-mail without an attachment to the e-mail.

26. The apparatus of claim 1, wherein the apparatus is configured such that the single user-defined important sender(s) folder is user-defined by allowing the user to define the list of user-defined important senders.

27. The apparatus of claim 1, wherein the apparatus is configured such that the single user-defined important sender(s) folder is the only user-defined important sender(s) folder available on the apparatus.

28. The apparatus of claim 1, wherein the apparatus is configured such that no alert is generated when the e-mail including the event-related information is organized in the general folder.

29. The apparatus of claim 1, wherein the apparatus is configured such that a user setting is configured to receive input from the user so that no alert is generated when the e-mail including the event-related information is organized in the general folder.

30. The apparatus of claim 1, wherein the apparatus is configured such that at least one of:

the important senders are important by being prioritized;

the important senders are important by being prioritized over at least one other sender;

the important senders are important by being part of a group that is prioritized over at least one other group;

the list is user-defined by being the important senders being selected by a user;

the list is user-defined by being the important senders being determined by a user;

the calendar event becomes part of the calendar, by being displayed with other information displayed on the calendar;

the calendar event becomes part of the calendar, by being displayed simultaneously with other information displayed on the calendar;

the calendar event becomes part of the calendar, by being displayed at a particular day or time represented on the calendar;

the calendar event becomes part of the calendar, by being displayed at a particular day or time displayed on the calendar;

the in response to the receipt of the e-mail, includes in immediate response to the receipt of the e-mail;

the in response to the receipt of the e-mail, includes an indirect response to the receipt of the e-mail with at least one automatic operation thereafter;

the automatic performance in response to the receipt of the e-mail, includes an immediate automatic performance in response to the receipt of the e-mail;

the automatic performance in response to the receipt of the e-mail, includes an automatic performance after at least one intervening automatic operation after the receipt of the e-mail;

the automatic performance in response to the receipt of the e-mail, includes an automatic performance after at least one intervening automatic operation in response to the receipt of the e-mail;

the automatic performance in response to the receipt of the e-mail, involves at least one intervening automatic operation after the receipt of the e-mail and before the automatic performance;

the single user-defined important sender(s) folder is one of multiple single user-defined important sender(s) folders, where the multiple single user-defined important sender(s) folders each have a different priority;

the single user-defined important sender(s) folder is one of multiple single user-defined important sender(s) folders, where the multiple single user-defined important sender(s) folders each have a different priority that is greater than a lowest priority;

the single user-defined important sender(s) folder is one of multiple single user-defined important sender(s) folders, where the multiple single user-defined important sender(s) folders each have a different priority that is greater than a particular priority of the general folder;

the single user-defined important sender(s) folder and the general folder are simultaneously displayed via the common display;

the single user-defined important sender(s) folder and the general folder are accessible via different portions of the common display;

the single user-defined important sender(s) folder and the general folder are accessible via a same portion of the common display;

the single user-defined important sender(s) folder and the general folder can each be accessed via the common display by way of a same portion of the common display;

the single user-defined important sender(s) folder and the general folder can each be accessed via the common display by way of different portions of the common display;

the single user-defined important sender(s) folder-related alert is related to the single user-defined important sender(s) folder, by being associated with at least one e-mail that is organized in the single user-defined important sender(s) folder;

the single user-defined important sender(s) folder-related alert is related to the single user-defined important sender(s) folder, by alerting that at least one e-mail is organized in the single user-defined important sender(s) folder;

the general folder-related alert is related to the general folder-related, by being associated with at least one e-mail that is organized in the general folder-related; or the general folder-related alert is related to the general folder-related, by alerting that at least one e-mail that is organized in the general folder-related.

\* \* \* \* \*